(12) United States Patent
Tabata et al.

(10) Patent No.: US 6,960,994 B2
(45) Date of Patent: Nov. 1, 2005

(54) VEHICLE TIRE INFORMATION OBTAINING APPARATUS AND TIRE INFORMATION PROCESSING APPARATUS

(75) Inventors: Masaaki Tabata, Chiryu (JP); Kazuyoshi Wakabayashi, Kasugai (JP); Atsushi Ogawa, Toyota (JP); Takashi Doi, Toyota (JP); Hideki Kusunoki, Kishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 110 days.

(21) Appl. No.: 10/359,137

(22) Filed: Feb. 6, 2003

(65) Prior Publication Data

US 2003/0156021 A1 Aug. 21, 2003

(30) Foreign Application Priority Data

Feb. 18, 2002 (JP) ........................................ 2002-039866
Apr. 5, 2002 (JP) ........................................ 2002-103198

(51) Int. Cl.$^7$ ............................................. B60C 23/00
(52) U.S. Cl. ................... 340/442; 340/447; 73/146.5; 116/34 R
(58) Field of Search ................... 340/442, 445, 340/449, 451, 447; 73/1.46, 1.44, 1.57, 1.59, 152.1, 152, 146; 116/34 R, 34 A, 34 B; 254/93 R, 93 VA; 342/73–75, 82, 89, 98; 250/429; 152/152.1, 152, 415

(56) References Cited

U.S. PATENT DOCUMENTS

| | | | | |
|---|---|---|---|---|
| 4,311,985 A | * | 1/1982 | Gee et al. ..................... | 340/447 |
| 5,663,496 A | | 9/1997 | Handfield et al. .......... | 73/146.5 |
| 5,731,754 A | | 3/1998 | Lee, Jr. et al. .............. | 340/447 |
| 5,801,306 A | * | 9/1998 | Chamussy et al. ......... | 73/146.2 |
| 6,018,993 A | * | 2/2000 | Normann et al. .......... | 73/146.5 |
| 6,034,597 A | | 3/2000 | Normann et al. .......... | 340/442 |
| 6,087,930 A | | 7/2000 | Kulka et al. ................ | 340/447 |
| 6,181,241 B1 | | 1/2001 | Normann et al. .......... | 340/477 |
| 6,259,361 B1 | | 7/2001 | Robillard et al. ........... | 340/447 |
| 6,545,599 B2 | * | 4/2003 | Derbyshire et al. ........ | 340/442 |
| 2003/0058118 A1 | * | 3/2003 | Wilson ........................ | 340/679 |

FOREIGN PATENT DOCUMENTS

| | | | | |
|---|---|---|---|---|
| DE | 19921178 | | 11/2000 | |
| EP | 0793579 | * | 9/1997 | |
| EP | 1 108 568 A2 | | 6/2001 | ........... B60C/23/04 |
| JP | A2-197404 | * | 8/1990 | |
| JP | A8-505939 | * | 6/1996 | |
| JP | A9-210827 | * | 8/1997 | |
| JP | A10-504783 | * | 5/1998 | |
| JP | A11-20427 | * | 1/1999 | |
| JP | A 11-20428 | | 1/1999 | ........... B60C/23/02 |
| JP | A 11-78446 | | 3/1999 | ........... B60C/23/02 |
| JP | A 2000-142044 | | 5/2000 | ........... B60C/23/04 |
| JP | A 2000-203221 | | 7/2000 | ........... B60C/23/02 |
| WO | WO 96/15919 | * | 5/1996 | |
| WO | WO 99/08887 | * | 2/1999 | |

* cited by examiner

*Primary Examiner*—Jeffery Hofsass
*Assistant Examiner*—Jennifer Stone
(74) *Attorney, Agent, or Firm*—Oliff & Berridge, PLC

(57) ABSTRACT

A vehicle tire information obtaining apparatus for obtaining tire information relating to a mounted tire and a non-mounted tire of a vehicle. The apparatus includes: (a) tire state detectors which are provided in the respective tires and each of which detects a state of the corresponding tire; (b) transmitters which are provided in the respective tires and which transmit tire data sets, as the tire information, each containing at least one tire-state data element representative of the detected state of the corresponding tire; (c) a receiver which is provided in a body of the vehicle and which receives the tire data sets transmitted by the transmitters; and (d) a non-mounted-tire information separator which separates the tire data set transmitted from the non-mounted tire, from the tire data set transmitted from the mounted tire.

36 Claims, 25 Drawing Sheets

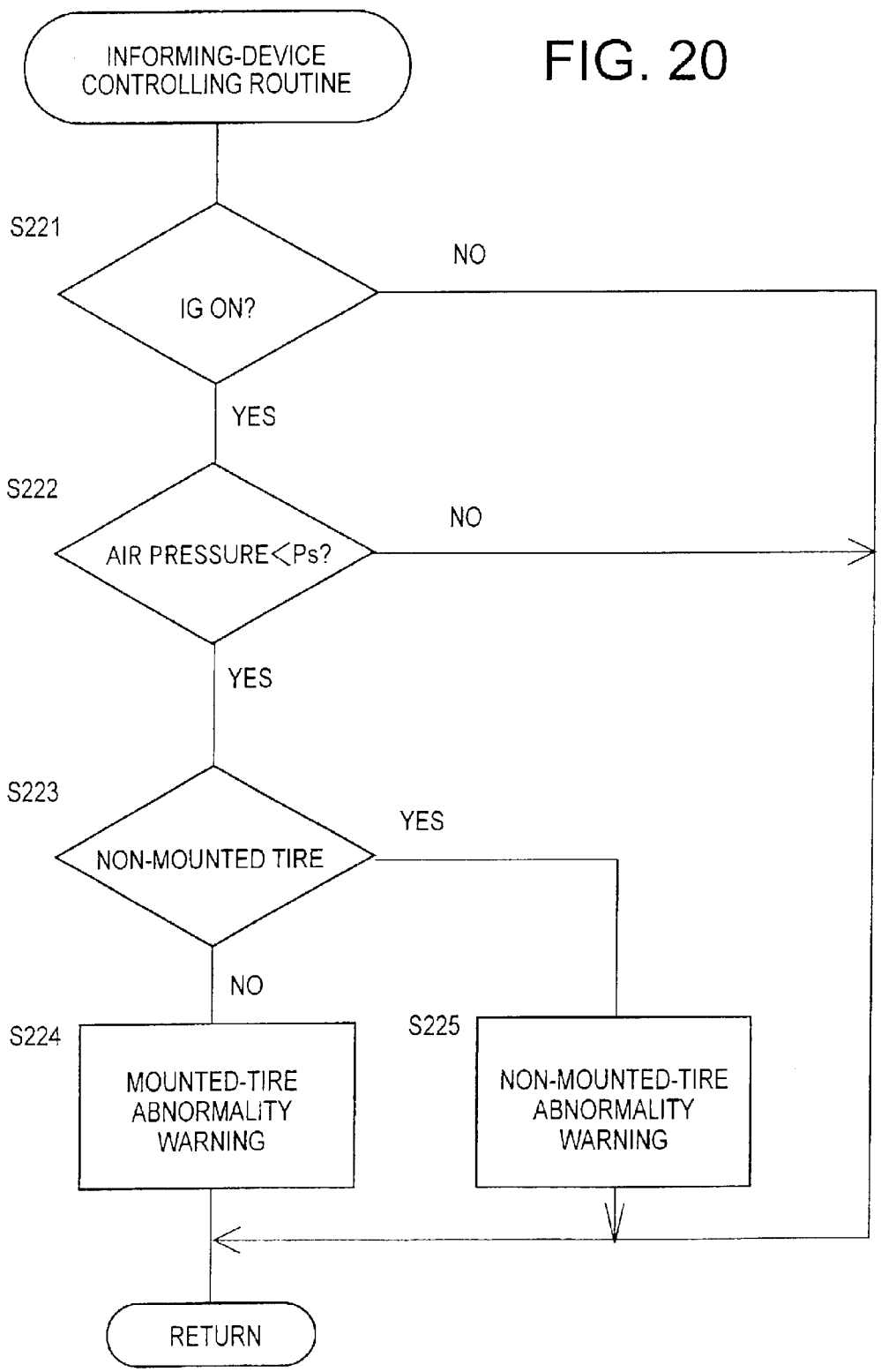

FIG. 21B
| ON | OFF |
|----|-----|
| OFF | ON |
| ON | ON |
FIG. 21C
| ON | OFF |
|----|-----|
| ON | ON |
FIG. 22A
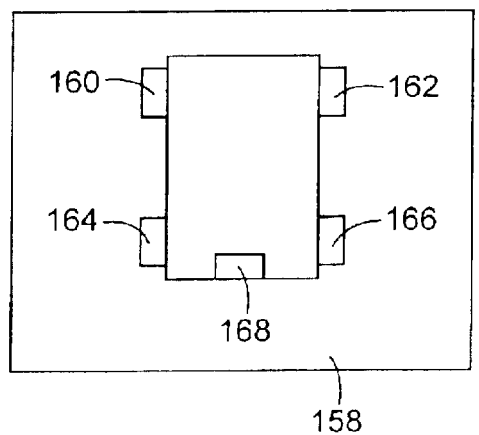
FIG. 22B
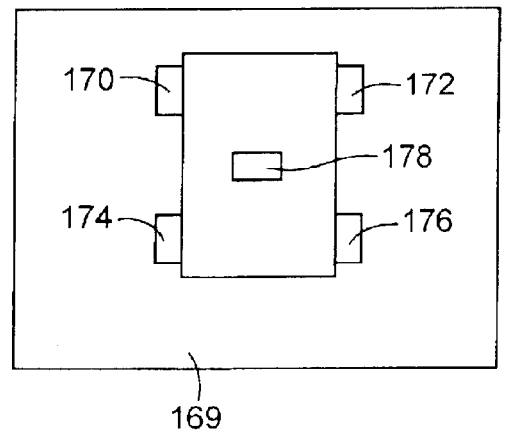

FIG. 23A
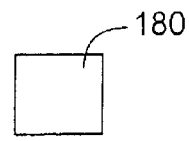
FIG. 23B
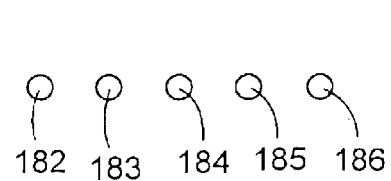
FIG. 24A
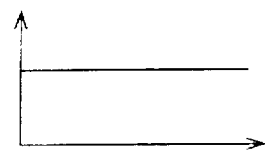
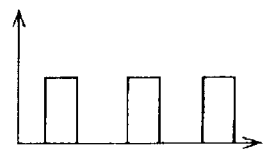
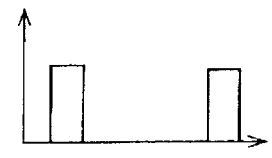
FIG. 24B  FIG. 24C  FIG. 24D

VEHICLE TIRE INFORMATION OBTAINING APPARATUS AND TIRE INFORMATION PROCESSING APPARATUS

This application is based on Japanese Patent Applications No. 2002-039866 filed in Feb. 18, 2002 and No. 2002-103198 filed in Apr. 5, 2002, the content of which is incorporated hereinto by reference.

BACKGROUND OF THE INVENTION

1. Field of the Invention

The present invention relates to a vehicle tire information obtaining apparatus for obtaining tire information relating to tires of a vehicle, and also to a vehicle tire information processing apparatus for processing the tire information.

2. Discussion of Related Art

JP-A-11-78446 discloses a vehicle tire pressure information obtaining apparatus for obtaining information indicative of air pressures of a plurality of tires of a vehicle which include a mounted tire mounted on an axle of the vehicle and a non-mounted tire carried by the vehicle. In this tire pressure information obtaining apparatus, the information coming from the non-mounted tire is not separated from the information coming from the mounted tire. Therefore, a warning device is activated not only when the air pressure indicated by the information of the mounted tire is lower than a predetermined minimum value but also when the air pressure indicated by the information of the non-mounted tire is lower than the predetermined minimum value. That is, in the conventional apparatus, the warning device is activated in the same manner irrespective of whether the information indicating the low pressure is originated from the mounted tire or the non-mounted tire.

SUMMARY OF THE INVENTION

It is therefore an object of the present invention to make the information of the non-mounted tire distinguishable or separable from the information of the mounted tire. This object may be achieved by a vehicle tire information obtaining apparatus or a vehicle tire information processing apparatus constructed according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A vehicle tire information obtaining apparatus for obtaining tire information relating to a plurality of tires of a vehicle which include a mounted tire mounted on an axle of the vehicle and a non-mounted tire carried by the vehicle, the apparatus comprising:

tire state detectors which are provided in the respective tires and each of which detects a state of a corresponding one of the tires;

transmitters which are provided in the respective tires and which transmit tire data sets, as the tire information, each containing at least one tire-state data element representative of the detected state of a corresponding one of the tires;

a receiver which is provided in a body of the vehicle and which receives the tire data sets transmitted by the transmitters; and a non-mounted-tire information separator which separates one of the tire data sets that has been transmitted from the non-mounted tire, from one of the tire data sets that has been transmitted from the mounted tire.

In the vehicle tire information obtaining apparatus of this mode (1) of the present invention, the tire data set transmitted from the non-mounted tire is separated from the tire data set transmitted from the mounted tire. For example, such a separation can be made by an arrangement in which the tire data set transmitted from the mounted tire is received by the receiver while the tire data set transmitted from the non-mounted tire is not received by the receiver, or by another arrangement in which the tire data set of the non-mounted tire as well as that of the mounted tire is received by the receiver in such a manner that permits the tire data set of the non-mounted tire to be distinguishable from that of the mounted tire, as in the apparatus described below in mode (39).

The non-mounted tire could be provided by a tire having a relatively high air pressure (e.g., a temporary spare tire which is carried by the vehicle and has not yet mounted on the axle of the vehicle) in some case, while could be provided by a tire having a relatively low air pressure (e.g., a regular tire which had been mounted on the axle of the vehicle and has been then dismounted from the axle due to a reduction in the air pressure) in other case. Where the temporary spare tire consists of a so-called "Tempa Tire" (trademark), the spare tire has smaller section width and overall diameter than those of a regular tire, in the interest of reducing a space required for the storage. For carrying the spare tire with the vehicle, the spare tire may be held inside or outside the vehicle body. The spare tire may be stored in a luggage space, engine room or other space inside the vehicle body. In case of a RV (recreational vehicle), for example, the spare tire may be hung on a rear wall of the vehicle body, stored in a floor of the body, or fixedly disposed under the body floor.

The term "mounted tire" or "non-mounted tire" may be interpreted to mean only a tire, or an assembly of a tire and a wheel. Each of the tire state detectors or each of the transmitters may be fixed to the tire, or alternatively, may be fixed to the wheel on which the tire is mounted.

(2) A vehicle tire information obtaining apparatus according to mode (1), wherein the non-mounted-tire information separator includes a non-mounted-tire information determining portion which automatically determines whether each of the tire data sets received by the receiver has been transmitted from the non-mounted tire or not.

In the vehicle tire information obtaining apparatus of this mode (2) of the invention, it is automatically determined whether each of the tire data sets received by the receiver has been actually transmitted from the non-mounted tire or not. The determination can be effected without a vehicle driver's operation of a manual switch, which operation is required in the apparatus disclosed in JP-A-11-78446. In other words, the determination can be effected even during running of the vehicle. It is noted that the determination as to whether each tire data set has been transmitted from the non-mounted tire is equivalent to a determination as to whether each tire data set has been transmitted from the mounted tire. This is because it can be determined that the tire data set has not been transmitted from the non-mounted tire if the same tire data set is determined to have been transmitted from the mounted tire. Further, the determination as to whether each tire data set has been transmitted from the non-mounted tire is equivalent to a distinction of the tire data set of the non-mounted tire from the tire data set of the mounted tire. Still further, the determination as to whether each tire data set has been transmitted from the non-mounted tire is equivalent to a determination as to whether the transmitter having transmitted the tire data set is provided in the non-mounted tire. This is because each tire data set relating to a corresponding one of the tires is transmitted from the transmitter provided in the corresponding tire.

(3) A vehicle tire information obtaining apparatus according to mode (1) or (2), wherein the non-mounted-tire information separator includes a non-mounted-tire information determining portion which determines whether each of the tire data sets received by the receiver has been transmitted from the non-mounted tire or not, on the basis of the each of the tire data sets received by the receiver.

Each of the tire data sets may include, in addition to the tire-state data element or elements, a data required to the transmission, an identification data representative of an identification of each tire, and other data elements, so that each tire data set consists of the plurality of data elements arranged in a predetermined pattern. In the apparatus of this mode (3), it is determined whether each tire data set has been actually transmitted from the non-mounted tire, on the basis of the tire data set, which commonly, has at least one element varying depending upon whether the tire date set is originated from the mounted tire or the non-mounted tire.

As a tire-state-related amount or value representative of a state of each tire, there are an air pressure of the tire, a temperature of the tire, a force applied to the tire (in a vertical, transverse or longitudinal direction of the vehicle), an amount indicative of a shape of the tire and an amount indicative of a motion of the tire. The wheel supporting the tire may be provided with an applied-force detector operable to detect the force applied to the tire, and a motion-amount detector operable to detect the motion amount of the tire, so that a data representative of the detected force and a data representative of the detected motion amount are transmitted as the tire-state data elements independently of or together with a data element representative of the tire air pressure and a data element representative of the tire temperature. The amount indicative of the shape of the tire may be provided by a radial dimension of the tire (e.g., a distance RH between an outer circumferential surface of the wheel and an inner circumferential surface of the tire), an axial width dimension of the tire (e.g., a distance RV between opposite sidewalls of the tire, or a distance between one of the sidewalls and a certain point of the wheel), or a volume of the tire. The axial width of the tire can be obtained from the distance between the sidewall and the certain point of the wheel. Each of the distances RH, RV can be measured by a non-contact-type sensor adapted to sense an optical path or a magnetic field which varies depending upon the distance. Further, an aspect ratio of the tire can be obtained from the radial dimension and the axial width dimension of the tire.

The state of each tire differs depending upon whether the tire is currently mounted on the axle or not. While the non-mounted tire is carried by the vehicle with substantially no force acting on the non-mounted tire, the mounted tire is mounted on the axle with a force acting on the mounted tire at least in the height or vertical direction. Thus, since the force acting on the mounted tire in the vertical direction is larger than the force acting on the non-mounted tire in the vertical direction, it is possible to know that the data indicative of the relatively large vertical force is originated from the mounted tire while the data indicative of the relatively small vertical force is originated from the non-mounted tire. As to the amount of the motion, too, there is a difference between the mounted tire and the non-mounted tire, since the mounted tire is rotated together with the axle while the non-mounted tire is held stationary. Thus, the tire data set of the non-mounted tire is distinguishable from that of the mounted tire, by taking account of the data representative of the amount of the motion of the tire. Further, the determination as to whether each tire data set is from the non-mounted tire can be made by seeing if the tire data set contains a data element or elements representing a periodic deformation of the tire. This is because the mounted tire tends to be elastically deformed in its part or entirety in a periodic manner while the non-mounted tire is not subjected to such a periodic deformation.

During running of the vehicle, the temperature of the mounted tire is increased, as shown in FIG. 7, due to heat generation caused by its periodic deformation and its frictional contact with a road surface. The elastic deformation and the friction force acting between the tire and the road surface tend to be increased, for example, as a result of acceleration, deceleration, turning or vertical vibration of the vehicle. On the other hand, the temperature of the non-mounted tire is held in a level corresponding to a temperature in a position (e.g., in the luggage space or outside the vehicle body) in which the non-mounted tire is fixedly disposed. The temperature in the luggage space might be somewhat increased or reduced as the time passes during running of the vehicle, but an amount of the change of the temperature is relatively small. Where the non-mounted tire is fixedly disposed outside the vehicle body, the temperature of the non-mounted tire is held in substantially a constant level corresponding to the ambient temperature, since the non-mounted tire is neither elastically deformed nor brought into contact with the road surface. Thus, it is possible to determine whether each tire data set is originated from the non-mounted tire or not, by seeing the tire temperature per se and/or the change in the tire temperature during running of the vehicle. It should be noted that a rate of the increase in the tire temperature is not always constant but rather variable due to variation in a running or operation condition of the vehicle. For example, the vehicle tends to be alternately started and stopped (accelerated and decelerated), wherein a frequency of the alternate running and stopping and a ratio between the running time and the stopping time are variable depending upon the running or operation condition of the vehicle. However, as shown in FIG. 7, it can be asserted at least that the temperature of the mounted tire tends to be increased as the time passes during running of the vehicle and that the rate of the increase in the temperature of the mounted tire is larger than that in the temperature of the non-mounted tire. Further, the temperature of the tire is not increased to an unlimited extent, but is eventually held in constant after having being increased to a certain level that is dependent on the running or operating condition of the vehicle. This certain level of the mounted tire is higher than that of the non-mounted tire. Namely, the temperature of the mounted tire is increased to a higher level at a higher rate, than the temperature of the non-mounted tire.

Where the non-mounted tire is disposed inside the vehicle body, a difference between the amounts of change of the temperature of the mounted and non-mounted tires is greater than that where the non-mounted tire is disposed outside the vehicle body. This is because the temperature of the non-mounted tire disposed inside the vehicle body is held in a level corresponding to a temperature inside the vehicle body while the temperature of the mounted tire is influenced by the external ambient (e.g., a wind, rain, snow, temperature of surface road).

The increase in the temperature of the tire per se leads to an increase in the temperature of an air within the tire and the consequent expansion of the air. The air pressure of the tire is thus increased with the increase in the tire temperature. The air pressure of the mounted tire is more easily increased and more changeable than that of the non-mounted tire. It is therefore possible to determine whether each tire data set is originated from the non-mounted tire, by seeing the air pressure per se and/or the change rate of the air pressure (i.e., the change amount of the air pressure during a certain length of time). Further, since a force is applied to the mounted tire in the longitudinal direction during acceleration or deceleration of the vehicle, the determination can be made also on the basis of the force applied to the tire in the longitudinal direction. With the force applied to the mounted tire in the vertical or longitudinal direction, a ratio between the distances RH, RV (e.g., the aspect ratio RH/RV) is changed. That is, the determination can be made based on the ratio between the distances RH, RV during running of the vehicle.

As is clear from the description as described above, the determination as to whether each tire data set is originated from the non-mounted tire can be effected in light of the fact that the difference between the temperatures of the mounted and non-mounted tires is increased as a result of running of the vehicle, namely, with increase in the running time and distance, or after the running time and distance have reached predetermined values.

Further, the determination can be effected also based on the identification data included in each tire data set. The identification data is usually utilized to check whether each tire data set received by the receiver has been transmitted from one of the tires of the vehicle in question. Such an identification data can be adapted to indicate whether each tire data set is originated from the non-mounted tire or not and also indicate from which one of the four wheels (front right and left wheels FR, FL and rear right and left wheels RR, RL) the mounted-tire data set is originated. When a spare tire is loaded as the non-mounted tire onto the vehicle, the identification data included in the tire data set of the spare tire may be adapted to be representative of the spare tire rather than of a regular tire, so that the tire data set of the spare tire can be correctly identified based on such an identification data. For example, a distance between the spare tire and the receiver disposed in the vehicle body is likely to be changed during installation of the spare tire on the vehicle body. In this instance, the tire data set transmitted from the spare tire is not received by the receiver when the distance is larger than a certain amount, while the same tire data set is received by the receiver when the distance is not larger than the certain amount. It is therefore possible to determine that the spare tire is represented by the identification data included in the tire data set exhibiting such a change arising from the change of the distance.

The distinction of the tire data set of the non-mounted tire from that of the mounted tire does not have to be made necessarily based on the same data element of the tire data set. For example, after the tire data set of the non-mounted tire is first distinguished from that of the mounted tire based on at least one of the tire-state data elements (such as the temperature data, the air pressure data, the shape data, the applied-force data and the motion amount data) rather than the identification data, the subsequent distinctions can be made based on the identification data of the non-mounted tire which has been memorized in the first distinction. That is, in this case, the first distinction of the data set of the non-mounted tire is made based on the tire-state data element, and the subsequent distinctions are made based on the identification data.

For the distinction of the tire data set of the non-mounted tire, the tire data sets of the tires can be checked individually from each other, for example, by checking if each of the tire data sets satisfies a condition required for the determination that the tire data set has been transmitted from the non-mounted tire. However, it is also possible to distinguish the tire data set of the non-mounted tire, by comparing the tire data sets with each other. In the latter case, the distinction of the tire data set of the non-mounted tire can be made, for example, on the basis of the quantitative data representative of the state of each tire, or on the basis of changes in the quantitative data. It is common that there is a large difference between a value indicated by the quantitative data of the mounted tire and that indicated by the quantitative data of the non-mounted tire.

The state of the tire (such as the tire temperature, the air pressure and the tire shape) is influenced by an environmental condition under which the tire is used. For example, the tire is deformed in a manner variable depending upon the environmental condition. That is, the environmental condition affects the deformation of the tire and the other physical states of the tire. The environmental condition tends to be changeable depending upon the running condition of the vehicle. As described above, the temperature of the tire is more increased where the frequency of the alternate acceleration and deceleration is relatively high, than where the frequency is relatively low. Thus, it can be asserted that the environmental condition is defined by at least one of the running condition of the vehicle, atmospheric pressure (which is influenced by an altitude and a weather), weather (e.g., rain, wind, humidity) and road surface condition (e.g., coefficient of friction of road surface, temperature at road surface). It is preferable to effect the determination as to whether each tire date set is from the non-mounted tire, by taking account of the influence of the environmental condition on the state of the tire.

(4) A vehicle tire information obtaining apparatus according to mode (2) or (3), wherein the above-described at least one tire-state data element, which represents the detected state of the corresponding one of the tires, includes at least one of a temperature data representative of a temperature of the corresponding tire, an air pressure data representative of an air pressure of the corresponding tire, a shape data representative of a shape of the corresponding tire, an applied-force data representative of a force applied to the corresponding tire, and a motion data representative of a motion of the corresponding tire, and wherein the non-mounted-tire information determining portion includes a tire-state-basis determining portion which determines whether each of the tire data sets received by the receiver has been transmitted from the non-mounted tire or not, on the basis of the above-described at least one tire-state data element which is contained in the each of the tire data sets.

In the vehicle tire information obtaining apparatus of this mode (4) of the invention, it is determined whether each tire data set has been transmitted from the non-mounted tire or not, on the basis of the tire-state data element or elements which are contained in the tire data. Since the mounted tire and the no-mounted tire differ from each other in the state of the tire which is represented by the tire-state data element or elements, the determination as to whether each tire data set is from the non-mounted tire or not can be effected based on the tire-state data element or elements.

(5) A vehicle tire information obtaining apparatus according to mode (4), wherein the above-described at least one tire-state data element includes the temperature data, and wherein the tire-state-basis determining portion of the non-mounted-tire information determining portion includes a tire-temperature-change-basis determining portion which determines whether each of the tire data sets received by the receiver has been transmitted from the non-mounted tire or not, on the basis of change of the temperature represented by the temperature data.

As is apparent from FIG. 7, the determination as to whether each tire data set has been transmitted from the non-mounted tire can be effected on the basis of change of the temperature of the corresponding tire. This arrangement is advantageous in that the tire data set of the non-mounted tire can be identified before the temperature is held in the constant level, namely, in a relatively early stage after an ignition switch of the vehicle has been turned on. For example, it can be determined that the tire data set has been transmitted from the non-mounted tire where the rate of the increase in the tire temperature is smaller than a predetermined amount. Further, it is also possible to compare the rates of the temperature increases in the respective tires, so that one of the tire data sets indicating the lowest increase rate can be determined to have been transmitted from the non-mounted tire. The change of the tire temperature may be represented by, for example, a derivative of the temperature with respect to time, a N-th derivative of the temperature with respect to time ($N \geq 2$), an average rate of the change during a relatively large length of time, or a pattern of the change. Since it is common that the vehicle is started and stopped in an alternated manner, it is preferable that the change of the tire temperature is represented by the average rate of the change during a large length of time.

(6) A vehicle tire information obtaining apparatus according to mode (4) or (5), wherein the above-described at least one tire-state data element includes the temperature data, and wherein the tire-state-basis determining portion of the non-mounted-tire information determining portion includes a temperature-difference-basis determining portion which determines whether each of the tire data sets received by the receiver has been transmitted from the non-mounted tire or not, on the basis of a difference between an ambient temperature and the temperature represented by the temperature data.

As shown in FIG. 11, it is common that a difference between the ambient temperature and the temperature of the non-mounted tire is smaller than a difference between the ambient temperature and the temperature of the mounted tire. It is noted that the difference between the ambient temperature and the temperature of the non-mounted tire is smaller where the non-mounted tire is disposed outside the vehicle body, than where the non-mounted tire is disposed in the luggage space of the vehicle.

(7) A vehicle tire information obtaining apparatus according to any one of modes (4)–(6), wherein the above-described at least one tire-state data element includes the motion data, and wherein the tire-state-basis determining portion of the non-mounted-tire information determining portion includes a tire-motion-basis determining portion which determines whether each of the tire data sets received by the receiver has been transmitted from the non-mounted tire or not, on the basis of the motion represented by the motion data.

The motion of the tire may be of any kind of motions such as a vibration of the tire, a rotation of the tire, an acceleration of the tire and a deceleration of the tire, for example. The vibration of the tire may be a vibration of the tire in a vertical, longitudinal or width direction of the vehicle while the tire is mounted on the axle of the vehicle. The motion-amount detector may detect a predetermined kind of motion of the tire, or may detect a compound movement of the tire which is constituted by two or more kinds of motions of the tire. Since there is a case where the motion of the tire is caused by a force applied to the tire, the motion of the tire can be detected also by the applied-force detector in such a case. In the apparatus of this mode (7), the determination as to whether each tire data set is from the non-mounted tire can be effected on the basis of the amount of the motion or the amounts of the motions of the tire.

(8) A vehicle tire information obtaining apparatus according to any one of modes (4)–(7), wherein the tire-state-basis determining portion of the non-mounted-tire information determining portion includes a running-state-basis determining portion which determines whether each of the tire data sets received by the receiver has been transmitted from the non-mounted tire or not, on the basis of the above-described at least one tire-state data element during running of the vehicle.

In the apparatus of this mode (8) of the invention, the determination as to whether each tire data set is from the non-mounted tire can be effected on the basis of the tire-state data element or elements during running of the vehicle rather than during parking of the vehicle (i.e., stopping of the vehicle for such a long time that the tire temperature is substantially equalized to the ambient temperature). The mounted tire and the non-mounted tire tend to differ from each other in the tire-state data by a larger extent during running the vehicle, than during parking of the vehicle. The term "running of the vehicle" should be interpreted to mean not only a continuous running in which the vehicle runs at a constant speed not lower than a predetermined value, but also an intermittent running in which the vehicle alternately runs and stops such that the vehicle stop time is so short that the stopping is ignorable with respect to the tire temperature or other state of the tire. That is, the running of the vehicle is interpreted as a state contrary to the parking of the vehicle. It is noted that the determination can be effected also during stopping or parking of the vehicle. For example, where the tire data set includes the identification data, the determination can be effected based on the identification data. Where a switch is operated by the vehicle operator each time a tire replacement is made, such a determination based on the identification data can be effected in response to the operation of the switch, as described below in the DETAILED DESCRIPTION OF THE PREFERRED EMBODIMENTS.

(9) A vehicle tire information obtaining apparatus according to any one of modes (4)–(8), wherein the tire-state-basis determining portion of the non-mounted-tire information determining portion includes a tire-state-change-basis determining portion which determines whether each of the tire data sets received by the receiver has been transmitted from the non-mounted tire or not, on the basis of the above-described at least one tire-state data element upon initiation of running of the vehicle and the above-described at least one tire-state data element during running of the vehicle.

As shown in FIG. 12, the temperature of each tire and the change of the temperature after initiation of running of the vehicle vary depending upon whether the initiation of running of the vehicle follows mere parking of the vehicle, or follows replacement of the mounted tire with the non-mounted tire after running of the vehicle for a relatively large length of time. Where the initiation of running follows the parking, the temperatures of the mounted tire and non-mounted tire are substantially equal to each other upon the initiation of running, and then the temperature of the mounted tire is increased at a relatively high rate while the temperature of the non-mounted tire is changed (commonly increased) at a small rate. On the other hand, where the initiation of running follows the replacement of the tires, the difference between the temperatures of the mounted and non-mounted tires is large upon initiation or restart of running of the vehicle, and then the temperature of the non-mounted tire (which used to be mounted as the mounted tire on the axle before the tire replacement) is reduced while the temperature of the newly mounted tire (which used to be carried as the non-mounted tire by the vehicle before the tire replacement) is increased. In this instance, the temperatures of the other mounted tires (which used to be mounted on the axles also before the replacement) are held substantially constant. In the apparatus of this mode (9) of the invention, the tire-state-change-basis determining portion effects the determination on the basis of the tire-state data element or elements upon initiation of running of the vehicle following parking of the vehicle or replacement of the tires and also the tire-state data element or elements during running of the vehicle.

(10) A vehicle tire information obtaining apparatus according to any one of modes (4)–(9), wherein the above-described at least one tire-state data element includes the temperature data, and wherein the tire-state-basis determining portion of the non-mounted-tire information determining portion includes a temperature-difference-basis determining portion which determines whether each of the tire data sets received by the receiver has been transmitted from the non-mounted tire or not, on the basis of a difference among temperatures of the plurality of tires each of which is represented by the temperature data upon initiation of running of the vehicle, and also the temperatures during running of the vehicle.

In the apparatus of this mode (10) of the invention, the temperature-difference-basis determining portion effects the determination on the basis of the difference among the temperatures of the tires upon initiation of running of the vehicle, and also on the basis of the temperatures of tires and/or changes of the temperatures of tires during the running of the vehicle.

(11) A vehicle tire information obtaining apparatus according to any one of modes (4)–(10), wherein the above-described at least one tire-state data element includes the temperature data, and wherein the tire-state-basis determining portion of the non-mounted-tire information determining portion includes a temperature-difference-basis determining portion which determines whether each of the tire data sets received by the receiver has been transmitted from the non-mounted tire or not, on the basis of a difference between an ambient temperature and the temperature represented by the temperature data upon initiation of running of the vehicle, and also at least one of the temperature represented by the temperature data during running of the vehicle and change of the temperature represented by the temperature data during running of the vehicle.

In the apparatus of this mode (11) of the invention, the temperature-difference-basis determining portion effects the determination on the basis of the difference between the ambient temperature and the tire temperature represented by the temperature data upon initiation of running of the vehicle, and also on the basis of the tire temperature and/or change of the tire temperature during the running of the vehicle. The change of the temperature of each tire during running of the vehicle is influenced by the ambient temperature. Since the mounted tire and the non-mounted tire are influenced by the ambient temperature differently from each other, it is preferable to detect the difference between the ambient temperature and the temperature of each tire before running of the vehicle and to take account of the detected difference in the determination as to whether each tire data set is from the non-mounted tire or not.

Where the ambient temperature is considerably lower than the tire temperature upon initiation of running of the vehicle, the temperature of the mounted tire is provisionally reduced after the initiation of running and is then increased as the time passes during running of the vehicle. The temperature of the non-mounted tire is reduced to a level dependent on the ambient temperature after the initiation of running, and is then held substantially constant. In such a case where the ambient temperature is considerably lower than the tire temperature, it is preferable that the determination (as to whether each tire data set is from the non-mounted tire or not) is effected on the basis of the tire temperature and/or temperature change represented by the temperature data after a point of time at which the temperature of the mounted tire is considered to begin to be increased.

(12) A vehicle tire information obtaining apparatus according to any one of modes (2)–(11), wherein the non-mounted-tire information determining portion includes a number-basis checking portion which checks determination as to whether each of the tire data sets has been transmitted from the non-mounted tire, by seeing if a number of the tire data sets determined to have been transmitted from the non-mounted tire is not larger than a predetermined number.

It is common that the number of the non-mounted tire or tires is known. In the apparatus of this mode (12) of the invention, if the number of the tire data sets determined to be from the non-mounted tire coincides with the predetermined number, it is possible to consider that the determination is correct. If the number of the tire data sets determined to be from the non-mounted tire is larger than the predetermined number, it is possible to consider that the determination is not correct. If the number of the tire data sets determined to be from the non-mounted tire is smaller than the predetermined number, it is possible to consider that the determination is correct. This is because there is a case where the mounted tire is replaced by the non-mounted tire, and the mounted tire removed from the axle in the replacement is then discarded instead of being carried as a new non-mounted tire by the vehicle.

Where the determination is effected by checking if a content of each of the tire data sets satisfies a predetermined condition, there is a possibility that the number of the tire data sets determined to have been transmitted from the non-mounted tire might be larger than the actual number of the non-mounted tire or tires. Such an erroneous determination is advantageously prevented in the apparatus of this mode (12). On the other hand, where the determination is effected by comparing the tire data sets with each other, there is substantially no possibility that the number of the tire data sets determined to have been transmitted from the non-mounted tire is larger than the actual number of the non-mounted tire or tires.

(13) A vehicle tire information obtaining apparatus according to any one of modes (2)–(12), wherein each of the tire data sets includes an identification data which identifies a corresponding one of the plurality of tires, wherein the non-mounted-tire information determining portion includes a non-mounted-tire identification data obtaining portion which is activated to obtain a content represented by the identification data of the non-mounted tire, and wherein the non-mounted-tire identification data obtaining portion is activated each time a predetermined condition is satisfied.

In the apparatus of this mode (13) of the invention, the content of the identification data of the non-mounted tire is obtained each time the predetermined condition is satisfied. The content of the identification data of the non-mounted tire is not necessarily constant but is changeable when the content is updated. The last obtained content of the identification data and the newly obtained content of the identification data are the same in some case and are different from each other in other case. The content of the identification data of the non-mounted tire is changed, for example, where the mounted tire is replaced with the non-mounted tire, or where the non-mounted tire is replaced with a new non-mounted tire. It is noted that the vehicle tire information obtaining apparatus described in any one of modes (2)–(12) may be adapted to obtain the content represented by the identification data included in one of the tire data sets, which is determined by the non-mounted-tire information data determining portion to have been transmitted from the non-mounted tire.

(14) A vehicle tire information obtaining apparatus according to mode (13), wherein the non-mounted-tire information separator separates the one of the tire data sets transmitted from the non-mounted tire on the basis of the content represented by the identification data of the non-mounted tire that has been obtained as a result of last satisfaction of the predetermined condition, during a period of time after a first moment at which the predetermined condition is newly satisfied and before a second moment at which the content represented by the identification data of the non-mounted tire is newly obtained, and wherein the non-mounted-tire information separator separates the one of the tire data sets transmitted from the non-mounted tire on the basis of the content represented by the identification data of the non-mounted tire that is newly obtained as a result of new satisfaction of the predetermined condition, after the second moment.

In the apparatus of this mode (14) of the invention, the separation of the tire data set of the non-mounted tire from that of the mounted tire is made on the basis of the last obtained content of the identification data of the non-mounted tire, during the period between the first moment at which the predetermined condition is newly satisfied and the second moment at which the content of the identification data of the non-mounted tire is newly obtained. Where the replacement of the tires is not effected after the content of the identification data of the non-mounted tire has been last obtained, the last obtained content of the identification data of the non-mounted tire still correctly represents the actual non-mounted tire. In such a case, the separation of the tire data set of the non-mounted tire can be made based on the last obtained content of the identification data of the non-mounted tire.

(15) A vehicle tire information obtaining apparatus according to mode (13), wherein the non-mounted-tire information separator does not separate the one of the tire data sets transmitted from the non-mounted tire, during a period of time after a first moment at which the predetermined condition is newly satisfied and before a second moment at which the content represented by the identification data of the non-mounted tire is newly obtained, and wherein the non-mounted-tire information separator separates the one of the tire data sets transmitted from the non-mounted tire on the basis of the content represented by the identification data of the non-mounted tire that is newly obtained as a result of new satisfaction of the predetermined condition, after the second moment.

In the apparatus of this mode (15) of the invention, the separation of the tire data set of the non-mounted tire from that of the mounted tire is suspended until the content of the identification data of the non-mounted tire is newly obtained. During this suspended period, the tire data sets of all the tires may be equally obtained without separating the tire data set of the non-mounted tire from that of the mounted tire, or alternatively, the obtainment of the tire data sets of all the tires may be suspended.

(16) A vehicle tire information obtaining apparatus according to any one of modes (1)–(15), wherein each of the tire data sets includes a quantitative data element, the vehicle tire information obtaining apparatus further comprising:

a tire information sorter which sorts the tire data sets received by the receiver, according to a predetermined threshold value, on the basis of the quantitative data element of each of the tire data sets.

In the apparatus of this mode (16) of the invention, the plurality of tire data sets can be sorted or divided into a plurality of groups. For example, it is possible to divide the tire data sets into the tire data set transmitted from the non-mounted tire and the tire data set transmitted from the mounted tire, and to accordingly separate the tire data set transmitted from the non-mounted tire from the tire data set from the mounted tire. It is also possible to otherwise divide the data sets, for example, into the data set of a front tire and the data set of a rear tire, or into the data set of a tire having a high degree of necessity for replacement with another and the data set of a tire having a low degree of necessity for replacement with another. It is noted that the apparatus of this mode (16) provides a technical advantage even if the apparatus does not include the features described in modes (1)–(15).

(17) A vehicle tire information obtaining apparatus according to mode (16), wherein the quantitative data element is provided by each of the above-described at least one tire-state data element, and wherein the tire information sorter includes a threshold-value determining portion which determines the threshold value, on the basis of a tire-state-related value represented by each of the above-described at least one tire-state data element when a running state of the vehicle satisfies a predetermined condition.

In the apparatus of this mode (17) of the invention, the threshold value is determined based on the tire-state-related value when the running state of the vehicle satisfies the predetermined condition. Although the threshold value may be a predetermined constant value, it is preferable that the threshold value is dependent on the tire-state-related value during actual running of the vehicle, as in the apparatus of this mode (17), particularly, where the tire-state-related value and change of the tire-state-related value are considerably influenced by the running condition of the vehicle. For example, in an arctic region, a tropical region and other region having a severe environmental condition, it is preferable that the threshold value is determined based on the tire-state-related value during actual running of the vehicle under such a severe environmental condition.

Where the identification data of each tire is stored in a data storage prior to the detection of the tire-state-related value of each tire during running of the vehicle, it is possible to utilize a relationship between the identification data and the detected tire-state-related value, for determining a threshold value that is suitable for a desired kind of sorting of the tire data sets. However, storing the identification data prior to the detection of the tire-state-related value is not essential. For example, where the tire data sets have to be divided into a tire data set of one non-mounted tire and tire data sets of four mounted tires, if the tire-state-related value of one tire data set is deviated from the tire-state-related values of the other four tire data sets which are close to each other, it is possible to determine a threshold value such that the threshold value is located between the deviated value and the mutually close values.

Where the sorting of the tire data sets is effected during running of the vehicle, it is preferable that the threshold value is determined in substantially the same state as a state in which the sorting is effected. The sorting is effected in such a state that differentiates the tire-state-related values of the vehicle of the tires, for example, where the running state of the vehicle satisfies the predetermined condition, namely, where an accumulative amount of load applied to each tire has reached a predetermined amount. The predetermined condition may be, for example, that the running distance or running time of the vehicle be not smaller than a predetermined value. It is noted that the threshold value should be determined in a state suitable for the sorting of the tire data sets. That is, the predetermined condition is dependent on the state suitable for the sorting of the tire data sets.

The threshold value for each individual vehicle may be determined only once without modifying the determined threshold value, or alternatively, the threshold value for each individual vehicle may be determined or modified a plurality of times. However, it is preferable that the threshold value is newly determined or modified each time an operating condition or environment is changed, for example, when the weather is seasonally changed, or when the vehicle is transferred to a new region having a different climate. In a region in which the difference between daily maximum and minimum temperatures is large, the threshold value is preferably determined or modified at least twice a day. Further, the threshold value may be determined or modified periodically, or each time a predetermined condition is satisfied (e.g., each time the ambient temperature is changed by at least a predetermined value).

(18) A vehicle tire information obtaining apparatus according to mode (16), wherein the non-mounted-tire information separator includes a non-mounted-tire information determining portion which determines whether each of the tire data sets received by the receiver has been transmitted from the non-mounted tire or not, and wherein the tire information sorter is included in the non-mounted-tire information determining portion, and includes a threshold-basis non-mounted-tire information sorting portion which sorts out the one of the tire data sets transmitted from the non-mounted tire, from the one of the tire data sets transmitted from the mounted tire.

(19) A vehicle tire information obtaining apparatus according to any one of modes (1)–(18), comprising a non-mounted-tire information ignorer which ignores the one of the tire data sets transmitted from the non-mounted tire.

In the apparatus of this mode (19) of the invention, where the tire data set of the non-mounted tire as well as that of the mounted tire is received by the receiver, the tire data set of the non-mounted tire is ignored. During running of the vehicle, in general, the information of the non-mounted tire is not required so much and accordingly may be ignored. Further, there is even a case where it is preferable that the information of the non-mounted tire is ignored, as discussed below in "DETAILED DESCRIPTION OF THE PREFERRED EMBODIMENTS".

Ignoring the tire data set of the non-mounted tire is equivalent to abstaining from handling it as unignorable information, and corresponds to the following arrangements:

(i) a determination as to whether the tire state is abnormal or not (e.g., by checking if the tire air pressure is lower than a predetermined minimum value or if the tire temperature is higher than a predetermined maximum value) is not effected on the basis of the tire-state data element or elements contained in the tire data set of the non-mounted tire;

(j) even where the determination as to whether the tire state is abnormal is made on the basis of the tire-state element contained in the tire data set of the non-mounted tire, and even if the tire state is determined to be abnormal in this determination, the abnormality of the tire is disregarded, for example, without setting an abnormality flag to ON;

(k) where the abnormality flag has been already set to ON (e.g., before the ignition switch is placed in its ON state), the abnormality flag is reset to OFF (e.g., after the ignition switch is placed in its ON state) if it is determined that the ON state of the abnormality flag is due to the tire state represented by the tire-state data element or elements transmitted from the non-mounted tire;

(l) where there is a tire data set which is not received by the receiver, the tire data set is left unreceived if it is determined that the tire data set in question has been transmitted from the non-mounted tire;

(m) where an external device controls the vehicle on the basis of the tire data sets or by taking account of the tire data sets, the tire information obtaining apparatus does not outputs the tire data set of the non-mounted tire to the external device; and (n) where a failsafe control is executed by an external device in the event of abnormality of the tire state, the tire data set indicative of the abnormality is not outputted to the external device if it is determined that the tire data set in question has been transmitted from the non-mounted tire.

In general, it is not so necessary to effect the determination as to whether the tire state of the non-mounted tire is normal or abnormal, and to inform the vehicle operator of a result of the determination. Similarly, it is not so necessary to execute the failsafe control when the tire state of the non-mounted tire is abnormal. Further, it is not so necessary to control the vehicle on the basis of the tire state of the non-mounted tire.

(20) A vehicle tire information obtaining apparatus according to any one of modes (1)–(19), comprising a data processor which processes the one of the tire data sets transmitted from the mounted tire and which does not process the one of the tire data sets transmitted from the non-mounted tire.

In the apparatus of this mode (20) of the invention, the receiver may be adapted not to receive the tire data set from the non-mounted tire, or may be adapted to receive the tire data set from the non-mounted tire as well as that from the mounted tire. In the latter case, the data processor can be adapted not to process the tire data set transmitted from the non-mounted tire.

(21) A vehicle tire information obtaining apparatus according to any one of modes (1)–(20), comprising a data processor which processes the one of the tire data sets in a mounted-tire data processing manner and which processes the one of the tire data sets in a non-mounted-tire data processing manner that is different from the mounted-tire data processing manner.

In the apparatus of this mode (21) of the invention, the data processor may include a mounted-tire data processing portion for processing the tire data set of the mounted tire in the mounted-tire data processing manner, and a non-mounted-tire data processing portion for processing the tire data set of the non-mounted tire in the non-mounted-tire data processing manner.

(22) A vehicle tire information obtaining apparatus according to any one of modes (1)–(21), wherein each of the tire data sets includes an identification data which identifies a corresponding one of the plurality of tires, the vehicle tire information obtaining apparatus comprising a non-mounted-tire identification data storage which distinguishes the tire data set transmitted from the non-mounted tire, from the tire data set transmitted from the mounted tire, and which stores the identification data included in the tire data set transmitted from the non-mounted tire.

In the apparatus of this mode (22) of the invention, the tire data set transmitted from the non-mounted tire is separated or distinguished from the data set transmitted from the mounted tire, and the identification data included in the tire data set of the non-mounted tire is then stored as a non-mounted-tire identification data in the non-mounted-tire identification storage. After the non-mounted-tire identification data has been stored in the storage, the determination as to whether each tire data set has been transmitted from the non-mounted tire can be made based on the identification data included in the tire data set of each tire. The separation or distinction of the tire data set of the non-mounted tire from that of the mounted tire can be made in any one of the various manners as described above in modes (3)–(21). Where it can be determined that the non-mounted tire is provided by one of the tires having the lowest air pressure, the tire data set of the non-mounted tire can be distinguished from that of the mounted tire, by comparing the air pressures of the respective tires with each other. For example, when the mounted tire whose air pressure has been reduced due to its puncture is removed from the axle so as to be replaced by the non-mounted tire, the air pressure of the removed tire may be further reduced to be lower than a predetermined threshold (which corresponds to a minimum pressure amount required to permit the vehicle to run for a predetermined length of time) before the removed tire is disposed on a designated position in the vehicle body, thereby making it possible to determine, when the vehicle runs for at least the predetermined length of time after the tire replacement, that the tire whose air pressure is lower than the predetermined threshold is provided by the non-mounted tire. Further, for such an event of the tire replacement, a reset switch (initialization switch) may be provided to be operable to adapt the non-mounted-tire information separator to separate the tire having the lowest air pressure, from the other tires.

(23) A vehicle tire information obtaining apparatus according to any one of modes (1)–(22), wherein the non-mounted-tire information separator includes a communication inhibitor which inhibits a communication between the receiver and one of the transmitters provided in the non-mounted tire.

In the apparatus of this mode (23) of the invention, the tire data set transmitted from the non-mounted tire is separated from the tire data set transmitted from the mounted tire, by inhibiting the tire data set of the non-mounted tire from being received by the receiver. For example, if the apparatus is provided with a provision for obstructing the communication between the non-mounted tire and the receiver, it is easy to inhibit the tire data set of the non-mounted tire from being received by the receiver. However, the provision for obstructing the communication is not essential, because it is possible to restrict radiation of a signal emitted from the non-mounted tire, for example, by damping the radiation, so that the signal does not reach the receiver.

(24) A vehicle tire information obtaining apparatus according to mode (23), wherein the communication inhibitor includes an information-reception disabling portion which disables a signal from the one of the transmitters provided in the non-mounted tire, from being received by the receiver.

In the apparatus of this mode (24), the signal transmitted from the transmitter provided in the non-mounted tire is not received by the receiver. The information-reception disabling portion may be provided with a device capable of absorbing or reflecting an electromagnetic wave emitted from the transmitted provided in the non-mounted tire, or obstructing or damping the radiation of the electromagnetic wave, so that the signal emitted from the non-mounted tire does not reach the receiver.

(25) A vehicle tire information obtaining apparatus according to mode (23) or (24), wherein the information-reception inhibitor includes a shielding member which blocks transmission of a signal from the one of the transmitters provided in the non-mounted tire, to the receiver.

In the apparatus of this mode (25), the shielding member is provided between the receiver and the transmitter provided in the non-mounted tire, so that the electromagnetic wave emitted from the transmitter provided in the non-mounted tire does not reach the receiver. The shielding member is provided in such a manner that inhibits the communication between the receiver and the transmitter. For example, the shielding member may be arranged to cover or surround the entirety of the non-mounted tire, or cover a part of the non-mounted tire in which the transmitter is provided. It is preferable that the shielding member is disposed in the vicinity of the non-mounted tire or the transmitter provided in the non-mounted tire, rather than in the vicinity of the receiver. This is because there is a risk that the tire data set transmitted from the mounted tire is not received by the receiver, if the shielding member is disposed in the vicinity of the receiver.

The shielding member may be provided by a member which includes a material having a conductivity and which is capable of blocking an electromagnetic wave. For example, the shielding member may be made entirely of a conductive material, or may be made of a resin, cloth or other base material containing a conductive material. The shielding member may take the form of a vessel having a certain degree of rigidity, or alternatively, may take the form of a sheet having a certain degree of flexibility. Described more specifically, the shielding member may be formed, by incorporating a conductive material into a base material, weaving a mixture of a conductive fiber and an organic fiber, weaving a fiber including a conductive material and an organic material, or covering a base material with a coating made of a conductive material. It is noted that the base material may be provided by a resin, cloth or other material while the conductive material may be provided by a metal, carbon or other material.

(26) A vehicle tire information processing apparatus for processing tire information relating to a plurality of tires of a vehicle which include a mounted tire mounted on an axle of the vehicle and a non-mounted tire carried by the vehicle, the apparatus comprising:

tire state detectors which are provided in the respective tires and each of which detects a state of a corresponding one of the tires;

transmitters which are provided in the respective tires and which transmit tire data sets, as the tire information, each containing at least one tire-state data element representative of the detected state of a corresponding one of the tires;

a receiver which is provided in a body of the vehicle and which receives the tire data sets transmitted by the transmitters; and a mounted-tire-state-data processor which processes the tire-state data element transmitted from the mounted tire, and which does not process the tire-state data element transmitted from the non-mounted tire.

In the vehicle tire information processing apparatus of this mode (26) of the invention, the receiver may be adapted to receive only the tire data set transmitted from the mounted tire, or may be adapted to receive the tire data set transmitted from the non-mounted as well as the tire data set transmitted from the mounted tire. In the latter case, the tire data set transmitted from the non-mounted tire is distinguished from the tire data set transmitted from the mounted tire, so that the above-described at least one tire-state data element contained in the tire data set of the non-mounted tire is not processed while that contained in the tire data set of the mounted tire is processed. Where the above-described at least one tire-state data element consists of a plurality of tire-state data elements, all the plurality of tire-state data elements of the non-mounted tire do not have to be abstained from being processed, but some of the tire-state data elements of the non-mounted tire may be processed. It is noted that the technical feature described in any one of the above modes (1)–(25) is applicable to the tire information processing apparatus of this mode (26).

(27) A vehicle tire information processing apparatus according to mode (26), wherein the above-described at least one tire-state data element, which represents the detected state of the corresponding one of the tires, includes an air pressure data representative of an air pressure of the corresponding tire, and wherein the mounted-tire-state-data processor includes a non-mounted-tire pressure data ignoring portion which ignores the air pressure data included in the above-described at least one tire-state data element transmitted from the non-mounted tire.

(28) A vehicle tire information processing apparatus according to mode (26) or (27), wherein the above-described at least one tire-state data element, which represents the detected state of the corresponding one of the tires, includes an air pressure data representative of an air pressure of the corresponding tire, and wherein the mounted-tire-state-data processor includes a data output controlling portion which does not output the air pressure data included in the tire-state data element transmitted from the non-mounted tire, to an external device provided outside the vehicle tire information processing apparatus, the data output controlling portion outputting the air pressure data included in the tire-state data element transmitted from the mounted tire, to the external device.

(29) A vehicle tire information processing apparatus according to any one of modes (26)–(28), wherein the above-described at least one tire-state data element, which represents the detected state of the corresponding one of the tires, includes an air pressure data representative of an air pressure of the corresponding tire, and wherein the mounted-tire-state-data processor includes:

an air-pressure abnormality determining portion which effects a determination as to whether the air pressure of each of the tires is lower than a predetermined minimum value or not; and an informing device which informs a vehicle operator of a tire-air-pressure abnormality when an affirmative decision in the determination is obtained on the basis of the air pressure data included in the tire-state data element transmitted from the mounted tire, and which does not inform the vehicle operator of the tire-air-pressure abnormality when the affirmative decision in the determination is obtained on the basis of the air pressure data included in the tire-state data element transmitted from the non-mounted tire.

(30) A vehicle tire information processing apparatus according to mode (29), wherein the informing device includes:

an indicator which is activated to indicate the tire-air-pressure abnormality; and an indicator controlling portion which activates the indicator when the affirmative decision in the determination is obtained on the basis of the air pressure data included in the tire-state data element transmitted from the mounted tire, and which does not activate the indicator when the affirmative decision in the determination is obtained on the basis of the air pressure data included in the tire-state data element transmitted from the non-mounted tire.

In the tire information processing apparatus of this mode (30) of the invention, the indicator is not activated if the air pressure data indicating the air pressure lower than the predetermined minimum value is transmitted from the non-mounted tire. The informing device is interpreted to mean a device adapted to inform the vehicle operator of the state of each tire. The informing device may take the form of a warning device which is activated exclusively in the event of an abnormality of the tire state, to inform the vehicle operator of the fact of the abnormality. The informing device may include means for visually or auditorily informing the vehicle operator of the information relating to the state of each tire. The visually informing means may be provided by, for example, a display for showing the detected value of the air pressure of the tire or indicating an abnormality of the air pressure, or a flashing lamp for indicating whether the air pressure is normal or abnormal. The auditorily informing means may be provided by, for example, a voice emitter for emitting a voice representative of the detected value of the air pressure, or a sound emitter activated in the event of an abnormality of the air pressure.

(31) A vehicle tire information processing apparatus for processing tire information relating to a plurality of tires of a vehicle which include a mounted tire mounted on an axle of the vehicle and a non-mounted tire carried by the vehicle, the apparatus comprising:

tire state detectors which are provided in the respective tires and each of which detects a state of a corresponding one of the tires;

transmitters which are provided in the respective tires and which transmit tire data sets, as the tire information, each containing at least one tire-state data element representative of the detected state of a corresponding one of the tires;

a receiver which is provided in a body of the vehicle and which receives the tire data sets transmitted by the transmitters;

a non-mounted-tire information determining portion which determines whether each of the tire data sets received by the receiver has been transmitted from the non-mounted tire or not; and a data processor which processes the tire data sets in a predetermined first manner when one of the tire data sets can be determined to have been transmitted from the non-mounted tire, the data processor processing the tire data sets in a predetermined second manner different from the predetermined first manner when none of the tire data sets can be determined to have been transmitted from the non-mounted tire.

In the tire information processing apparatus of this mode (31) of the invention, the tire data sets are processed in one of the different manners which is selected depending upon whether one of the tire data sets can be determined to have been transmitted from the non-mounted tire or not, namely, whether the tire data set of the non-mounted tire is distinguishable from that of the mounted tire or not. The tire data sets are processed in the above-described predetermined first manner in the case (hereinafter referred to as "distinguishable case") where the tire data set of the non-mounted tire is distinguishable, for example, where the identification data of the actual non-mounted tire is stored in the non-mounted-tire identification data storage. The tire data sets are processed in the above-described predetermined second manner in the case (hereinafter referred to as "undistinguishable case") where the tire data set of the non-mounted tire is not distinguishable, for example, where the identification data of the actual non-mounted tire is not stored in the non-mounted-tire identification data storage. It is noted that there is a case where the data storage stores the identification data representing an ex-non-mounted tire which has been replaced by the actual non-mounted tire. This case corresponds to the undistinguishable case where the identification data of the actual non-mounted tire is not stored in the data storage.

The data processor, which processes the tire data set in the different manners, may be adapted as follows:
(i) processing all of the tire data sets equally irrespective whether each data set is actually originated from the mounted tire or the non-mounted tire in the undistinguishable case, while processing the tire data set of the mounted tire without processing the tire data set of the non-mounted tire in the distinguishable case;
(ii) processing none of the tire data sets in the undistinguishable case, while processing the tire data set of the mounted tire without processing the tire data set of the non-mounted tire in the distinguishable case;
(iii) informing the vehicle operator of a tire-state abnormality if at least one of the tire data sets transmitted from the tires indicates an abnormality in the undistinguishable case, while informing the vehicle operator of the tire-state abnormality if the abnormality is indicated by the tire data set of the mounted tire rather than that of the non-mounted tire in the distinguishable case.

It is noted that the technical feature described in any one of the above modes (1)–(30) is applicable to the tire information processing apparatus of this mode (31).

(32) A vehicle tire information processing apparatus according to mode (31), wherein the data processor processes the tire data sets without taking account of whether each of the tire data sets has been transmitted from the mounted tire or the non-mounted tire, when none of the tire data sets can be determined to have been transmitted from the non-mounted tire, and wherein the data processor processes the tire data sets, by taking account of whether each of the tire data sets has been transmitted from the mounted tire or the non-mounted tire, when one of the tire data sets can be determined to have been transmitted from the non-mounted tire.

(33) A vehicle tire information processing apparatus for processing tire information relating to a plurality of tires of a vehicle which include a mounted tire mounted on an axle of the vehicle and a non-mounted tire carried by the vehicle, the apparatus comprising:

tire state detectors which are provided in the respective tires and each of which detects a state of a corresponding one of the tires;

transmitters which are provided in the respective tires and which transmit tire data sets, as the tire information, each containing at least one tire-state data element representative of the detected state of a corresponding one of the tires;

a receiver which is provided in a body of the vehicle and which receives the tire data sets transmitted by the transmitters; and a pressure-data processor which processes an air pressure data included in the above-described at least one tire-state data element, wherein the pressure-data processor includes:

an air-pressure abnormality determining portion which effects a determination as to whether an air pressure of each of the tires is lower than a predetermined minimum value or not; and an informing device which informs a vehicle operator of a result of the determination in one of different manners that is selected depending upon whether the result of the determination relates to the mounted tire or the non-mounted tire.

In the tire information processing apparatus of this mode (33) of the invention in which the vehicle operator can be informed of the fact that the air pressure of the non-mounted tire is low, the operator can recognize a need of replacing the non-mounted tire with another tire. For example, where the informing device includes an indicator capable of being activated in a selected one of a plurality of different manners, the indicator may be activated in the suitable one of the different manners that is selected depending upon whether the low air pressure is indicated by the mounted tire or the non-mounted tire. The indicator may be provided by, for example, a sound emitter activated to emits a sound whose tone or loudness is changeable, or a lamp activated to be flashed in an intermittently manner changeable depending upon the selected manner. It is noted that the technical feature described in any one of the above modes (1)–(32) is applicable to the tire information processing apparatus of this mode (33).

(34) A vehicle tire information processing apparatus according to mode (33), wherein the informing device includes at least two indicators, one of which is placed in one of different operational states that is selected depending upon whether the air pressure of the mounted tire is lower than the predetermined minimum value or not, and the other of which is placed in one of different operational states that is selected depending upon whether the air pressure of the non-mounted tire is lower than the predetermined minimum value or not.

In the tire information processing apparatus of this mode (34) of the invention in which the informing device includes the plurality of indicators, one of the indicators (first indicator) is operated differently depending upon whether the air pressure of the mounted tire is abnormal or not, while another of the indicators (second indicator) is operated differently depending upon whether the air pressure of the non-mounted tire is abnormal or not, so that the vehicle operator can know whether the tire indicating the air pressure abnormality is provided by the mounted tire or the non-mounted tire. Each of the plurality of indicators may be adapted to be switchable between first and second operational states, or among first, second and third operational states. Where the number of the indicators is N with the number of the operational states of each indicator being M, it is possible to indicate (N×M) patterns of states of the air pressures of the tires in respective manners different from each other. For example, where the air pressure of the mounted tire is low, the first indicator is placed in the first operational state while the second indicator is placed in the second operational state. Where the air pressure of the non-mounted tire is low, the first indicator is placed in the second operational state while the second indicator is placed in the first operational state. Where the air pressures of the mounted and non-mounted tires are both low, the first and second indicators are both placed in the respective first operational states.

The operational states of the first indicator and those of the second indicator do not have to be necessarily the same, but may be different. For example, where the first indicator is switchable between its light OFF state and light ON state, the second indicator may be switchable between its light OFF state and light flashing state. Where the first indicator is provided by a sound emitter (auditorily informing means), the second indicator may be provided by a light emitter (visually informing means). Further, one of the first and second operational states may be an non-activated state. In this case, the indicator is switched from its non-activated state to activated state, when the indicator has to inform the vehicle operator of a fact relating to the tire state. It is further noted that the number of the indicators included in the informing device may be three or more.

(35) A vehicle tire information processing apparatus for processing tire information relating to a plurality of tires of a vehicle which include a mounted tire mounted on an axle of the vehicle and a non-mounted tire carried by the vehicle, the apparatus comprising:

tire state detectors which are provided in the respective tires and each of which detects a state of a corresponding one of the tires;

transmitters which are provided in the respective tires and which transmit tire data sets, as the tire information, each containing at least one tire-state data element representative of the detected state of a corresponding one of the tires;

a receiver which is provided in a body of the vehicle and which receives the tire data sets transmitted by the transmitters; and a data processor which processes the tire data sets received by the receiver, wherein the data processor includes a data-processing restricting portion which restricts processing of one of the tire data sets that has been transmitted from the non-mounted tire.

In the tire information processing apparatus of this mode (35) of the invention, the tire data set transmitted from the mounted tire is processed, while the tire data set transmitted from the non-mounted tire is not processed at all, or processed in a restricted or limited manner. That is, a limited part of the tire data set of the non-mounted tire may be processed, for example, for the purpose of utilizing the processed data element or elements of the non-mounted tire so as to facilitate the processing of the tire data set of the mounted tire. It is noted that the technical feature described in any one of the above modes (1)–(31) is applicable to the tire information processing apparatus of this mode (35).

(36) A vehicle tire information obtaining apparatus for obtaining tire information relating to a plurality of tires of a vehicle which include a mounted tire mounted on an axle of the vehicle and a non-mounted tire carried by the vehicle, the apparatus comprising:

tire state detectors which are provided in the respective tires and each of which detects a state of a corresponding one of the tires;

transmitters which are provided in the respective tires and which transmit tire data sets, as the tire information, each containing at least one quantitative data element representative of the detected state of a corresponding one of the tires;

a receiver which is provided in a body of the vehicle and which receives the tire data sets transmitted by the transmitters;

a tire information sorter which sorts the tire data sets received by the receiver, according to a threshold value, on the basis of the quantitative data element; and a threshold-value determining portion which determines the threshold value during running of the vehicle.

The threshold value, which is used for sorting the tire data sets, may be determined in a stage of production of the vehicle. However, it is preferable that the threshold value is determined during actual running of the vehicle. That is, the threshold value is preferably a value variable or modifiable depending upon an operating environment under which the vehicle runs, rather than a fixed value. The technical feature described in any one of the above modes (1)–(35) is applicable to the tire information obtaining apparatus of this mode (36).

(37) A vehicle tire information obtaining apparatus according to any one of modes (3)–(25), wherein the non-mounted-tire information determining portion of the non-mounted-tire information separator determines whether each of the tire data sets received by the receiver has been transmitted from the non-mounted tire or not, by taking account of an operating environment of each of the tires.

(38) A vehicle tire information obtaining apparatus according to any one of modes (8)–(25) and (37), further comprising:

a running-state detector which detects a running state of the vehicle, wherein the running-state basis determining portion determines whether each of the tire data sets received by the receiver has been transmitted from the non-mounted tire or not, on the basis of the running state detected by the running-state detector, in addition to the above-described at least one tire-state data element.

In the tire information obtaining apparatus of this mode (38) of the invention, the determination can be effected, for example, based on an assumption that a force acting on the mounted tire is larger than that acting on the non-mounted tire during accelerating, decelerating or turning of the vehicle. The running-state detector may be provided by, for example, a running speed sensor for detecting a running speed (acceleration and deceleration) of the vehicle, or a sensor (e.g., a yaw rate sensor, a lateral acceleration sensor, a steering angle sensor) for detecting a turning motion of the vehicle.

(39) A vehicle tire information obtaining apparatus according to any one of modes (1)–(25), (37) and (38)

wherein the receiver includes a non-mounted-tire-information receiving antenna which is capable of receiving the one of the tire data sets transmitted from one of the transmitters provided in the non-mounted tire and which is not capable of receiving the one of the tire data sets transmitted from one of the transmitters provided in the mounted tire, so that the non-mounted-tire information separator separates the one of the tire data sets received by the non-mounted-tire-information receiving antenna, from the one of the tire data sets not received by the non-mounted-tire-information receiving antenna.

In the tire information obtaining apparatus of this mode (39) of the invention, the tire data set of the non-mounted tire received by the non-mounted-tire-information receiving antenna is distinguishable from the tire data set of the mounted tire.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 20 is a flow chart illustrating an informing-device controlling routine executed according to a control program stored in a tire information processing apparatus constructed according to a seventh embodiment of the invention;

FIGS. 21A–21C are views illustrating an informing device included in a tire information processing apparatus constructed according to an eighth embodiment of the invention;

FIGS. 22A and 22B are views illustrating an informing device included in a tire information processing apparatus constructed according to a ninth embodiment of the invention;

FIGS. 23A and 23B are views illustrating an informing device included in a tire information processing apparatus constructed according to a tenth embodiment of the invention;

FIGS. 24A–24D are views illustrating an informing device included in a tire information processing apparatus constructed according to an eleventh embodiment of the invention;

DETAILED DESCRIPTION OF THE PREFERRED EMBODIMENTS

Figure 1:
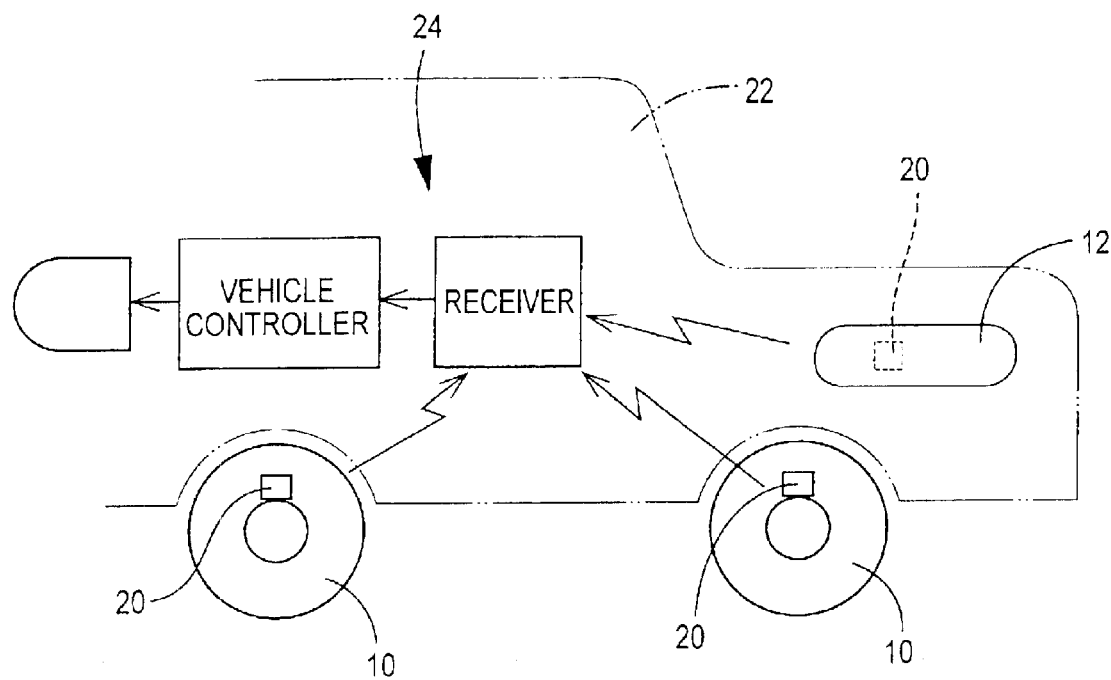
FIG. 1 is a schematic view showing a vehicle equipped with a tire information processing apparatus which is constructed according to a first embodiment of this invention.
Figure 2:
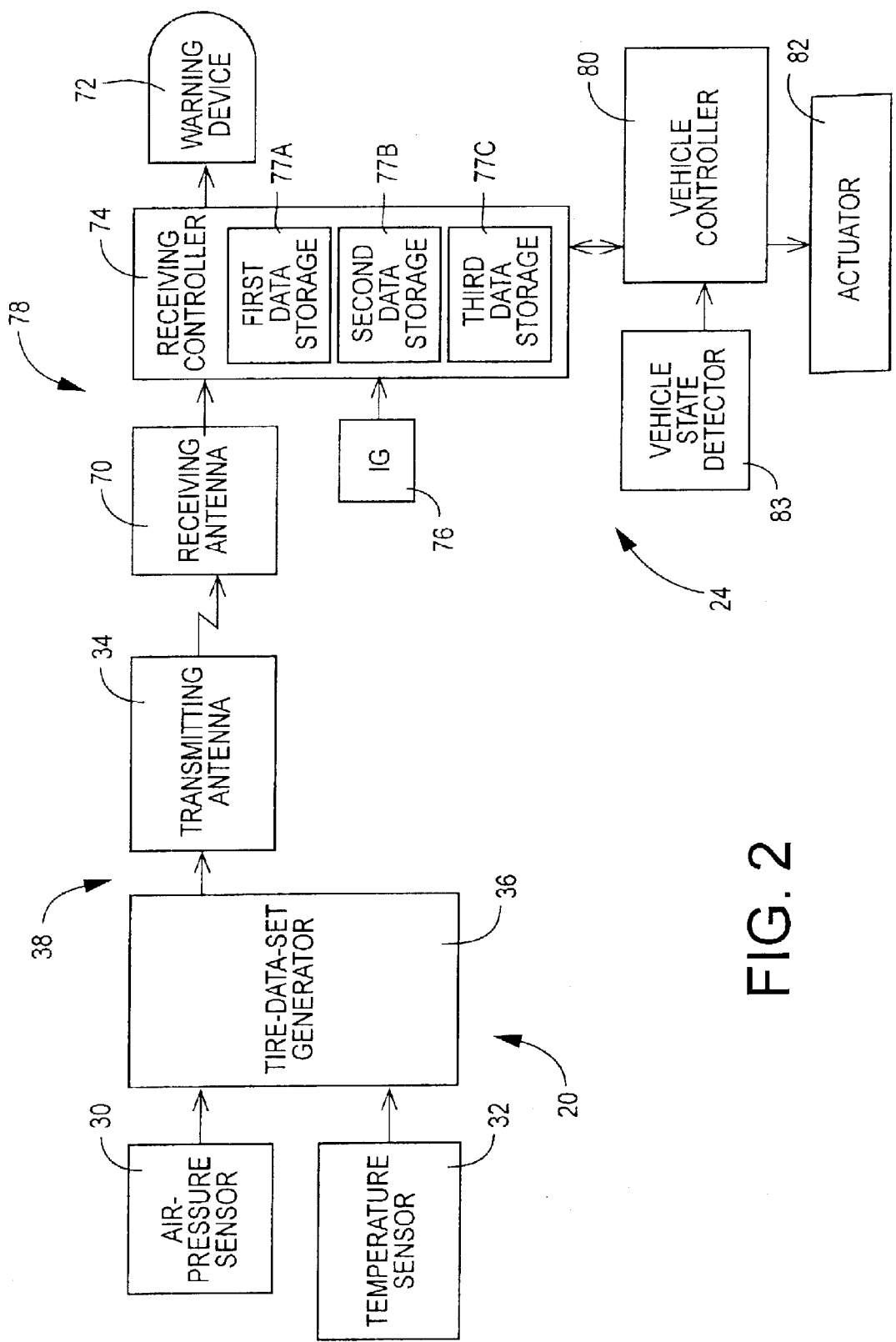
FIG. 2 is a block diagram showing the tire information processing apparatus of FIG. 1.

Referring to first to FIGS. 1 and 2, there is shown a tire information processing apparatus which is constructed according to a first embodiment of this invention and which includes a tire-state-related information obtaining apparatus in the form of a tire-air-pressure data obtaining apparatus. As shown in FIG. 1, four regular tires 10 are mounted as mounted tires on axles of a vehicle which is provided with the tire information processing apparatus, such that the four regular tires serve as front right and left wheels FR, FL and rear right and left wheels RR, RL. A spare tire 12 is stored as a non-mounted tire in a luggage space located in a rear portion of a body 22 of the vehicle. Each of the tires 10, 12 may be referred also to as "tired wheel", since each of tires 10, 12 is mounted on a wheel.

As shown in FIG. 2, each of the tires 10, 12 is provided with a local unit 20, while the vehicle body 22 is provided with a central unit 24. The local unit 20 includes: an air pressure sensor 30 for detecting an air pressure of a corresponding one of the tires 10, 12; a temperature sensor 32 for detecting a temperature of the corresponding tire; a transmitting antenna 34 for transmitting tire information in the form of a tire data set which includes an air pressure data and a temperature data representing the detected air pressure and temperature of the corresponding tire, respectively; and a tire information generator 36 for generating the tire data set. The tire information generator 36 includes a CPU, a ROM, a RAM and input and output portions. To the input and output portions, there are connected the air pressure sensor 30, the temperature sensor 32 and the transmitting antenna 34. In the present embodiment, the air pressure sensor 30 is fixed to a portion of the wheel which portion faces an inlet valve of the tire.

Figure 3:
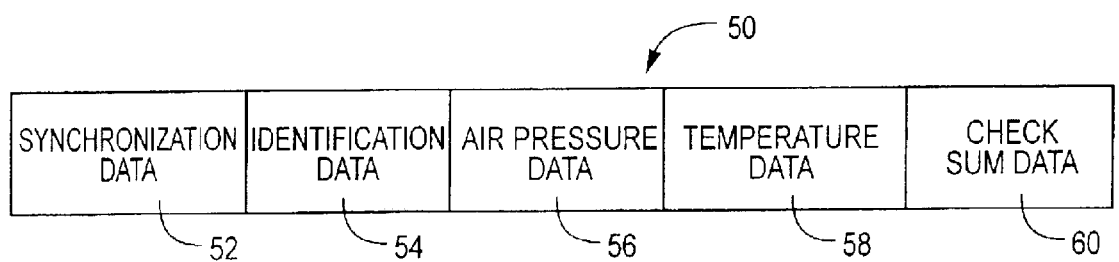
FIG. 3 is a view illustrating tire information in the form of a tire data set.

As shown in FIG. 3, the tire data set 50 includes a header data in the form of a synchronization data 52, an identification data 54, an air pressure data 56, a temperature data 58 and a check sum data 60. The synchronization data 52 is provided for synchronization of a transmitter with a receiver. The identification data 54 is provided to identify each of the tires 10, 12 from which the tire data set 50 is transmitted. That is, the identification data 54 serves to confirm that the tire identified by the same data 54 is one of the tires of the vehicle in question rather than of the other vehicle. Further, the identification data 54 serves to determine whether the tire data set 50 including the same data 54 has been transmitted from the spare tire 12 or not, namely, determine whether the tire identified by the same data 54 is the spare tire 12 or not. The check sum data 60 is provided for effecting a parity check or for otherwise checking an actual total volume of the tire data set 50 transmitted from the transmitter. The tire data set 50 may include, in addition to the above-described data elements 52, 54, 56, 60, a data element representative of a state of the local unit 20 such as a residual amount of electric energy left in a battery used in the transmitter. Of these data elements constituting the tire data set 50, the air pressure data 56 and the temperature data 58 correspond to tire-state data elements. In the local unit 20, the air pressure and the temperature of the tire are detected by the air-pressure sensor 30 and the temperature sensor 32, respectively, so that the tire information generator 36 generates the tire data set 50 on the basis of the detected air pressure and temperature. The generated tire data set 50 is transmitted from the transmitting antenna 34. In the present embodiment, the transmitting antenna 34 and the tire information generator 36 constitute a major portion of a transmitter 38.

The central unit 24 includes: a receiving antenna 70 for receiving the tire data set transmitted from the local unit 20; a warning device 72 as an informing device; and a receiving controller 74 which is principally constituted by a computer. To input and output portions of the receiving controller 74, there are connected the receiving antenna 70, an ignition switch 76 and the warning device 72. The receiving controller 74 serves to process the received tire data set, for determining whether the received tire data set has been transmitted from the spare tire 12 or not, and for determining whether the tire state is abnormal or not. The warning device 72 is activated in the event of an abnormality of the tire state. In the present embodiment, the local units 20 provided in the respective tires transmit the respective tire data sets at respective time intervals different from each other, so that two or more tire data sets are not likely to be concurrently received by the receiving antenna 70. Although there is a possibility of the concurrent reception of two or more tire data sets, such a concurrent reception is not occurred successively.

The receiving controller 74 includes a first data storage 77A, a second data storage 77B and a third data storage 77C. The first data storage 77A stores various control programs such as programs for executing a tire-information processing routine and an informing-device controlling routine which are illustrated by the respective flow charts of FIG. 4 and FIG. 6. The second data storage 77B, which consists of a nonvolatile storage, stores the identification data of the spare tire 12. The third data storage 77C stores the identification data of the tire whose state is determined to be abnormal. In the present embodiment, the receiving antenna 70 and the receiving controller 74 constitute a major portion of a receiver 78 as the receiving device. It is also possible to consider that the major portion of the receiver 78 is constituted by the receiving antenna 70 and a portion of the receiving controller 74 which is assigned to process the data sets received by the receiving antenna 70.

To the receiving controller 74, there is connected a vehicle controller 80, so that the air pressure data and other data elements are supplied from the receiving controller 74 to the vehicle controller 80. The vehicle controller 80 is principally constituted by a computer including a CPU, a ROM, a RAM and input and output portions, and controls an actuator 82 for controlling a running state of the vehicle. To the vehicle controller 80 there are connected a vehicle state detector 83.

In the central unit 24, after the tire data set has been received by the receiving antenna 70, each data element of the tire data set is processed by the receiving controller 74. The warning device 72 is activated as needed, for example, when the tire state is determined to be abnormal. In the present embodiment, the warning device 72 includes a sound emitter capable of emitting a warning buzzer, chime or other sound so that the vehicle operator is auditorily informed of the abnormality of the tire state. However, the warning device 72 may include, in place of or in addition to the sound emitter, a display device capable of displaying a warning message so that the vehicle operator is visually informed of the abnormality. It is noted that the warning device 72 may be adapted to inform the vehicle operator of a normality of the tire state when the tire state is normal, or may be adapted to inform the operator of the specific state of the tire such as current values of the air pressure and temperature.

The warning device 72 is activated when the tire state is determined to be abnormal, namely, when the air pressure data 56 included in the tire data set 50 transmitted from each of the tires 10, 12 represents an air pressure smaller than a predetermined minimum value, and also when the temperature data 58 included in the tire data set 50 transmitted from each tire represents a temperature larger than a predetermined maximum value. However, if the air pressure 56 or temperature data 58 in question is included in the tire data set 50 which is determined to have been transmitted from the spare tire 12, the warning device 72 is not activated. This is because it is considered that an abnormality of the spare tire 12 is not required to be immediately informed to the vehicle operator.

Figure 7:
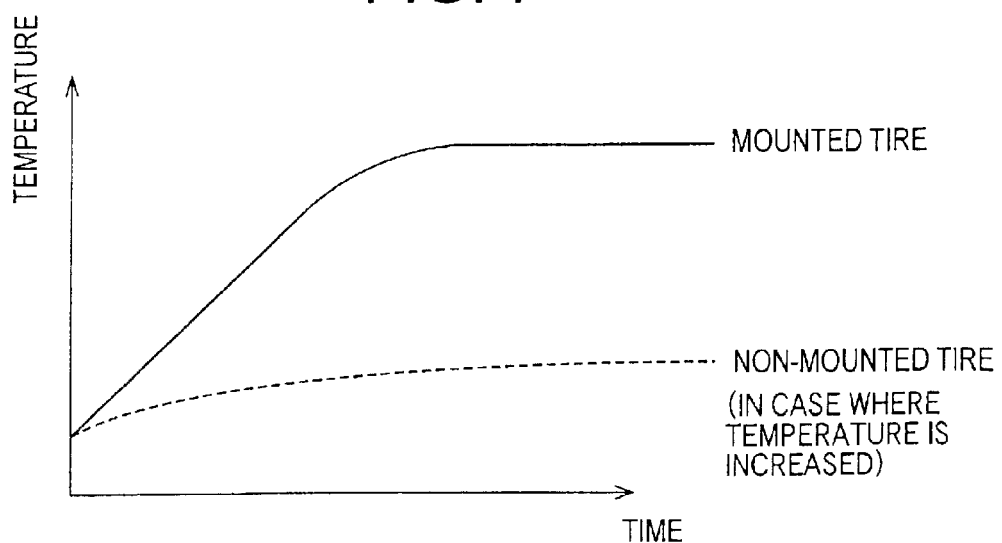
FIG. 7 is a graph indicating changes of temperatures of a mounted tire and a non-mounted tire.

In the receiver 78, it is determined whether the received tire data set 50 is a tire data set transmitted from the spare tire 12 or not, on the basis of the tire data set 50. As shown in FIG. 7, during running of the vehicle after the ignition switch 76 has been turned on, the temperature of each mounted tire 10 is increased at a relatively high rate, for example, due to an elastic deformation of the tire occurred in a repeated manner and also a friction acting between the tire and a road surface. However, the temperature of the mounted tire 10 is not increased to an unlimited extent, but is eventually held in constant after having being increased to a certain level. On the other hand, the temperature of the spare tire 12 is changed with change of a temperature in the luggage space in which the spare tire 12 is stored, but is changed at a relatively low rate. Further, since the temperature in the luggage space is not necessarily increased but can be reduced, the temperature of the spare tire 12 can be reduced when the temperature in the luggage space is reduced. Like the temperature of the mounted tire 10, the temperature of the spare tire 12 is eventually held in a certain level. The certain level of the temperature of the spare tire 12 is not as high as that of the temperature of the mounted tire 10. In the present embodiment, it is determined whether the tire data set 50 is a tire data set transmitted from the spare tire 12 or not, on the basis of change of the temperature of the tire before a point of time at which the tire temperature has been changed or increased to the certain constant level.

Figure 4:
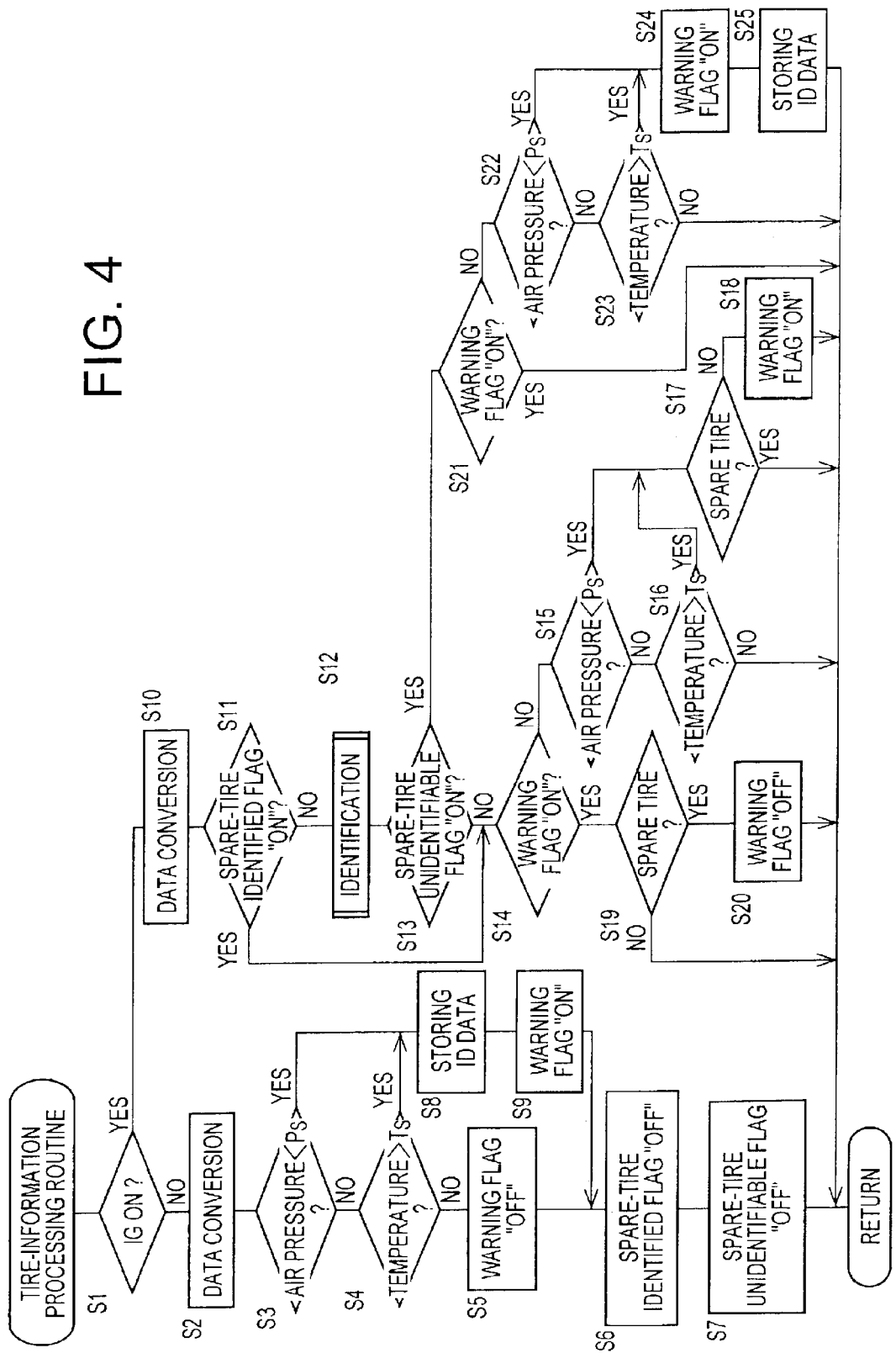
FIG. 4 is a flow chart illustrating a tire-information processing routine executed according to a control program stored in a data storage of a receiving controller which is included in the tire information processing apparatus of FIG. 1.

The tire-information processing routine illustrated by the flow chart of FIG. 4 is executed at a predetermined time interval. The time interval may be changed depending upon whether the ignition switch 76 is held in its ON state or OFF state. This routine is initiated with step S1 for determining whether the ignition switch 76 is held in its ON state or OFF state. In the present embodiment, the communication between the local unit 20 and the central unit 24 is maintained during the OFF state of the ignition switch 76 as well as during the ON state of the ignition switch 76, so that the tire date sets 50 are transmitted from the respective transmitting antennas 34 not only during the ON state but also during the OFF state of the ignition switch 76. However, the warning device 72 is not activated during the OFF state of the ignition switch 76 even if there is detected an abnormality of the tire state.

During the OFF state of the ignition switch 76, step S1 is followed by step S2 for converting the tire data set received by the receiver 78, into a form that can be processed by the computer of the receiving controller 74. In the subsequent steps S3 and S4, it is determined whether the tire state is normal or abnormal. In the present embodiment, the tire state is determined to be abnormal when at least one of the air pressure and the temperature of the tire indicates an abnormal value. That is, the determination is effected by seeing if the detected air pressure is lower that the predetermined minimum value Ps and seeing if the detected temperature is higher than the predetermined maximum value Ts. If the air pressure is not lower than the predetermined minimum value Ps and if the temperature is not higher than the predetermined maximum value Ts, the tire state is determined to be normal, so that a warning flag is reset to OFF in step S5. Steps S6 and S7 are implemented to reset a spare-tire successfully identified flag and a spare-tire unidentifiable flag (which are used during the ON state of the ignition switch 76) to OFF. On the other hand, if the air pressure is lower than the predetermined minimum value Ps or if the temperature is higher than the predetermined maximum value Ts, the tire state is determined to abnormal. When the tire state is thus determined to be abnormal, step S8 is implemented whereby the identification data 54 included in the tire data set in question is stored in the third data storage 77C, and step S9 is then implemented whereby the warning flag is set to ON. Steps S1–S9 are repeatedly implemented while the ignition switch 76 is in its OFF state.

During the ON state of the ignition switch 76, step S10 is implemented to convert the tire data set received by the receiver 78, into the form that can be processed by the computer of the receiving controller 74. Step S10 is followed by step S11 to determine whether the spare-tire successfully identified flag is in its ON state or not. When the step S11 is implemented for the first time after the ignition switch 76 has been switched from its OFF state to its ON state, a negative decision (NO) is obtained in step S11 since the spare-tire successfully identified flag is in its OFF state. The negative decision in step S11 is followed by step S12 to identify the spare tire, as described below in details. In the subsequent step S13, it is determined whether the spare-tire unidentifiable flag is in its ON state. In step S12, the identification data 54 of the spare tire 12 (i.e., the identification data 54 included in the tire data set 50 transmitted from the transmitter 38 of the spare tire 12) is stored in the second data storage 77B, so that the tire date set transmitted from the spare tire 12 is made distinguishable from the tire data sets transmitted from the mounted tires 10. Thus, a negative decision is obtained in step S13, and step S14 is then implemented.

In step S14, it is determined whether the warning flag is in its ON state or not. A negative decision in step 14 is followed by steps 15, S16 to determine whether the tire state is normal or abnormal. If the tire state is abnormal, step S17 is implemented to check whether the identification date 54 included in the tire data set in question coincides with the identification data 54 of the spare-tire 12 (which has been stored in the second data storage 77B). If an affirmative decision (YES) is obtained in step S17, namely, if the tire data set in question is determined to have been transmitted from the spare tire 12, the warning flag is not set to ON. However, if the identification data 54 included in the tire data set in question does not coincide with the identification data 54 of the spare tire 12, step S18 is implemented to set the warning flag to ON.

If the warning flag is in its ON state upon implementation of step S14, an affirmative decision is obtained in step S14, whereby step S19 is implemented to check whether the identification date 54 included in the tire data set in question coincides with the identification data 54 of the spare tire 12. If an affirmative decision is obtained in step S19, step S20 is implemented to reset the warning flag to OFF. The affirmative decision in step S19 means that the warning flag has been set to ON, based on the tire data set 50 transmitted from the spare tire 12 rather than the tire data set 50 transmitted from one of the mounted tires 10.

If the spare-tire unidentifiable flag is set to ON in step S12, namely, if the identification data 54 of the spare tire 12 is not yet obtained as a result of failure to separate the tire data set of the spare tire 12 from the tire data sets of the mounted tires 10, an affirmative decision is obtained in step S13. In this case, the control flows goes to step S21 in which it is determined whether the warning flag is in its ON state or not. A negative decision in step S21 is followed by steps S22, S23 to determine whether the tire state is normal or abnormal. If the tire state is determined to be abnormal, step S24 is implemented to set the warning flag to ON, and step S25 is then implemented so that the identification data 54 included in the tire data set in question is stored in the third data storage 77C.

Figure 5:
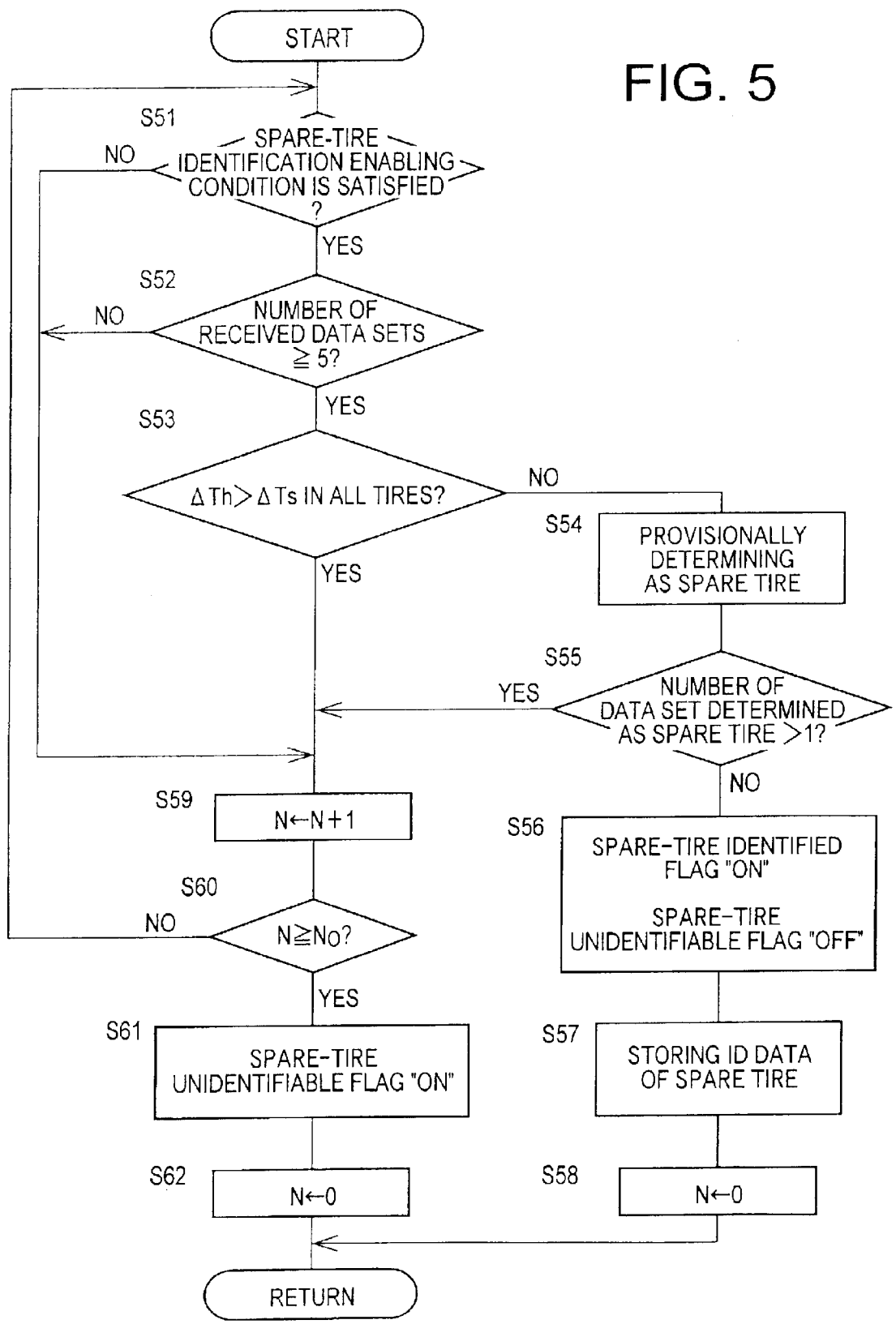
FIG. 5 is a flow chart illustrating a part of the tire-information processing routine of FIG. 4.

Step S12 is implemented by executing a spare-tire identifying routine illustrated by the flow chart of FIG. 5. This routine is initiated with step S51 to determine whether a spare-tire identification enabling condition is satisfied or not. In the present embodiment in which the spare tire 12 is identified based on change of the tire temperature, the spare-tire identification enabling condition is determined to be satisfied when the vehicle is in such a running state that makes it possible to identify the spare tire 12 on the basis of change of the tire temperature. For example, the spare-tire identification enabling condition may include a running-time-related requirement that a length of time having elapsed after initiation of running of the vehicle be not smaller than a first predetermined value and be not larger than a second predetermined value. When the identification enabling condition is satisfied, step S52 is implemented to determine whether at least a predetermined number Cs0 of tire data sets 50 have been received or not. The predetermined number Cs0 may be of a number of tires each of which the tire data set 50 is transmitted. In the present embodiment, since the vehicle has four mounted tires 10 and one spare tire 12, the predetermined number Cs0 is five. Therefore, if at least five tire data sets 50 have been received, step S53 is implemented to check the tire temperature represented by the temperature data 58 of each of the tire data sets 50. That is, in step S53, it is determined whether an actual amount $\Delta$Th of change of the tire temperature within a predetermined length of time is larger than a predetermined amount $\Delta$Ts. As is apparent from FIG. 7, if the actual amount $\Delta$Th is not larger than -the predetermined threshold amount $\Delta$Ts, it is possible to determine that the tire data set 50 in question is a tire data set 50 transmitted from the spare tire 12.

If the actual amount $\Delta$Th is not smaller than the predetermined threshold amount $\Delta$Ts, step S54 is implemented to provisionally determine that the tire data set 50 in question is a tire data set 50 transmitted from the spare tire 12. Step S55 is implemented to check a number of the tire data sets 50 each of which has be provisionally determined to have been transmitted from the spare tire 12. That is, in step S55, it is determined whether the number of the thus provisionally determined data sets 50 is larger than a predetermined number Cs1 (that is one in the present embodiment in which the number of the spare tire 12 is one). If an affirmative decision is obtained in step S55, it is considered that the provisional determination was incorrect. This is because the number of the provisionally determined data sets 50 can not be larger than the predetermined number Cs1 (the number of the spare tire 12) if the provisional determination had been correct. It is noted that the predetermined numbers Cs0, Cs1 may be changed by the vehicle operator, as needed, for example, when two or more spare tires 12 are carried by the vehicle. On the other hand, if a negative decision is obtained in step S55, it is considered that the provisional determination was correct. Where the number of the provisionally determined data set or sets 50 is equal to the predetermined number Cs1, it is possible to definitely determine that the provisionally determined data set 50 is a tire data set 50 originated from the spare tire 12. Where the number of the provisionally determined data set 50 is smaller than the predetermined number Cs1, it is possible to consider that one of the mounted tires 10 replaced by the spare tire 12 is not carried by the vehicle after the replacement. The negative decision in step S55 is followed by step S56 in which the spare-tire successfully identified flag is set to ON while the spare-tire unidentifiable flag is reset to OFF. In the subsequent step S57, the identification data 54 included in the tire data set 50 transmitted from the spare tire 12 is stored in the second data storage 77B. Step S58 is then implemented to rest a trial-number counter (which is described below) to "zero". The implementations of steps S56 and S57 may be referred to as a definite determination procedure.

The above-described identification enabling condition and the threshold amount $\Delta$Ts of change of the tire temperature may be experimentally, theoretically or otherwise obtained. For example, an experiment conducted by the present inventors revealed that the above-described predetermined first and second values of the identification enabling condition may be 10 minutes and 30 minutes, respectively, and that the threshold amount $\Delta$Ts may be 3° C. where an ambient temperature is 11° C. That is, according to the experiment, while the running-time-related requirement is being satisfied, it is possible to determine that the tire whose temperature change amount is not smaller than 3° C. within 10 minutes is the mounted tire, and that the tire whose temperature change amount is smaller than 3° C. within 10 minutes is the non-mounted tire. In this instance, the threshold amount $\Delta$Ts may be 5° C. in place of 3° C. The identification enabling condition and the threshold amount $\Delta$Ts may be determined during an actual running of the vehicle, as described below, namely, when a running state of the vehicle satisfies a predetermined condition, for example, when a running speed (detected by a running speed sensor provided in the vehicle) is not smaller than a predetermined value. There would be required further experiments and studies in connection with the identification enabling condition and the threshold amount $\Delta$Ts.

The above-described provisional determination can not be done, if the spare-tire identification enabling condition is not satisfied in the determination of step S51, or if the number of the tire data sets 50 received by the receiver 78 is smaller than the predetermined number Cs0 in the determination of step S52, or if the change amount $\Delta$Th of the tire temperature represented by the temperature data 58 is larger than the threshold amount $\Delta$Ts in all the tire data sets 50 received by the receiver 78. These cases could happen, for example, where the spare tire 12 can not be identified although the spare tire 12 is actually carried by the vehicle, or where the spare tire 12 is not actually carried by the vehicle. In the present embodiment, steps S51, S52, S53 are repeatedly implemented a predetermined number N0 of times, where the control flows can not go to step S54, namely, where the provisional determination can not be effected. During the repeated implementation of steps S51, S52, S53, there is a case where the identification enabling condition becomes satisfied in the current cycle of implementation after the dissatisfaction in the last cycle of implementation. Further, although the central unit 20 might sometimes fails to receive the information from the local unit 24 (due to, for example, a noise or a change in the positional relationship between the units 20, 24), the central unit 20 could eventually receives the information from the local unit 24 after the repeated implementations of the steps. The count of the trial-number counter is incremented by "one" in step S59, and it is then determined whether the count of the trial-number counter becomes equal to or larger than the predetermined number N0 in step S60. If the count of the trial-number counter is still smaller than the predetermined number N0, the control flow returns to step S51. While the spare tire 12 can not be identified as described above, steps S51, S52, S53, (S54, S55,) S59, S60 are repeatedly implemented. When the count of the trial-number counter becomes equal to the predetermined number, the spare-tire unidentifiable flag is placed in its ON state in step S61, and then the count of the trial-number counted is reset to "zero" in step S62.

The ON state of the spare-tire unidentifiable flag means that the spare tire 12 was not identified in the current implementation of step S12. Thus, an affirmative decision is obtained in step S13, whereby the control flow goes to step S21 and steps following step S21. As described above, where the warning flag is in its ON state, the warning device 72 is activated without checking if the warning flag has been set to ON based on the tire data set 50 transmitted from one of the mounted tires 10 rather than the tire data set 50 transmitted from the spare tire 12. Where the warning flag is in its OFF state, if an affirmative decision is obtained in step S22 or S23, the warning flag is set to ON irrespective of whether the tire suffering from the abnormal state is one of the mounted tires 10 or non-mounted tire 12.

During implementation of step S12 a plurality of times, the spare tire 12 becomes identifiable in some case while the spare tire 12 remains unidentifiable in other case. Where the spare tire 12 becomes identifiable, step S56 is implemented to reset the spare-tire unidentifiable flag to OFF and set the spare-tire successfully identified flag to ON, whereby a negative decision is obtained in step S13 so that step S14 and the following steps are implemented. Where the warning flag is in its ON state, it is determined in step S14 whether the warning flag has been set to ON based on the tire data set 50 of the spare tire 12 or not. If an affirmative decision is obtained in step S19, step S20 is implemented to reset the warning flag to OFF. There is a case where the warning flag is set to ON during the OFF state of the ignition switch 76. There is also a case where the warning flag is set to ON during implementations of step S21 and the following steps. Further, after the spare tire 12 has been identified, each time an abnormality of the tire state is detected, it is determined whether the tire data set 50 in question is originated from the spare tire 12 or not. If the tire data set 50 in question is originated from the spare tire 12, namely, if the abnormality relates to the spare tire 12 rather than to the mounted tires 10, the warning device 72 is not activated.

Figure 6:
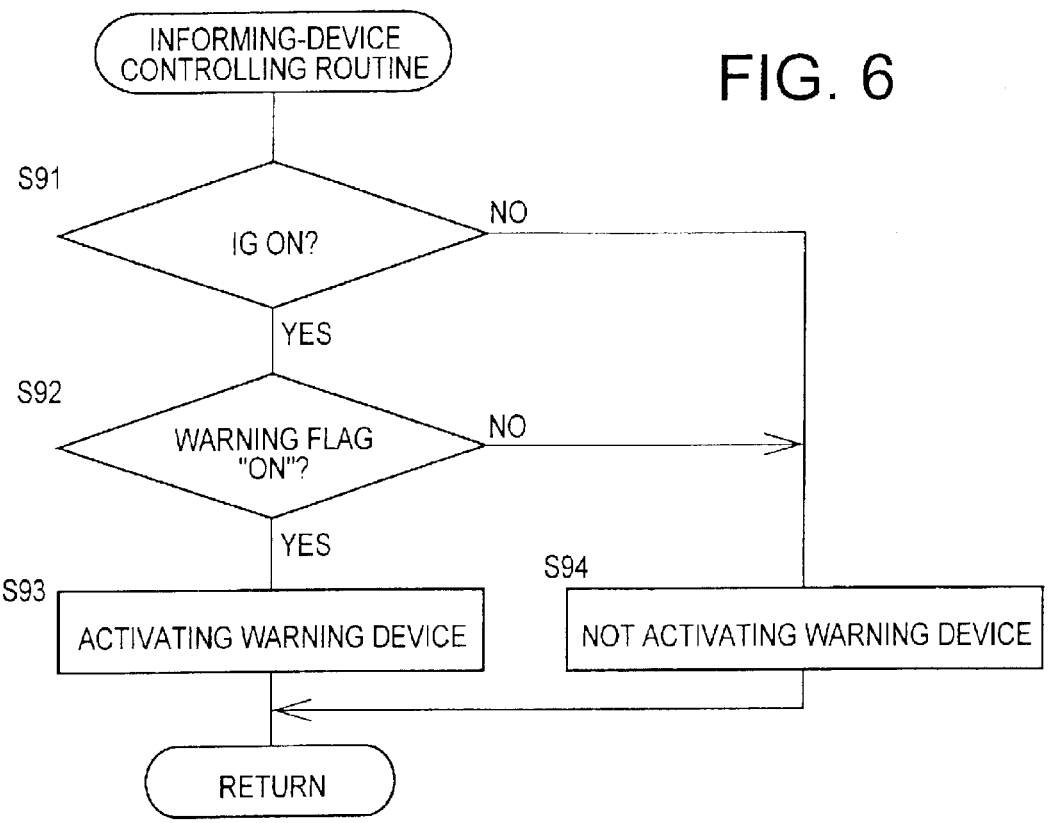
FIG. 6 is a flow chart illustrating an informing-device controlling routine executed according to a control program stored in the above-described data storage of the receiving controller.

The warning device 72 is controlled by executing the informing-device controlling routine illustrated by the flow chart of FIG. 6. This routine is initiated with step S91 to determine whether the ignition switch 76 is in its ON state. If an affirmative decision is obtained in step S91, step S92 is implemented to determine whether the warning flag is in its ON state. If an affirmative decision is obtained also in step S92, step S93 is implemented to activate the warning device 72 as the informing device. However, if a negative decision is obtained in at least one of steps S91, S92, the control flows goes to step S94 in which the warning device 72 is not activated. In this instance, if the warning device 72 is being activated, the activation of the warning device 72 is stopped in step S94. It is noted that the warning device 72 is not activated, even if the warning flag is set to ON, as long as the ignition switch 76 is held OFF.

In the present embodiment, even if the tire state represented by the tire-state data elements included in the tire data set 50 is determined to be abnormal, the warning device 72 is not activated as long as the tire data set 50 in question is a data set transmitted from the spare tire 12. This arrangement is effective to prevent an unnecessary activation of the warning device 72, thereby leading to an improvement in an operational environment in the vehicle. Further, since the spare tire 12 is identified on the basis of change of the tire temperature, it is possible to identify the spare tire 12 in a relatively early stage after switching of the ignition switch 76 from its OFF state to its ON state. This arrangement provides a technical advantage in a case where the warning flag is set in ON due to a low air pressure of the spare tire 12 while the ignition switch 76 is in its OFF state. In this case, the warning device 72 is activated upon switching of the ignition switch 76 from its OFF state to its ON state. However, the activation of the warning device 72 is immediately stopped, owing to the identification of the spare tire 12 in the early stage, thereby making it possible to reduce a length of time of such an activation of the warning device 72 due to the low air pressure of the spare tire 12. The activation of the warning device 72 within the reduced length of time serves as an indication that the air pressure of the spare tire 12 is low.

Further, in the present embodiment, it is provisionally determined whether each of the tire data sets 50 received by the receiver 78 has been transmitted from the spare tire 12 or not, and then it is definitely determined that the provisionally determination is correct if the number of the tire data set or sets 50 provisionally determined to have been transmitted from the spare tire 12 is not larger than the predetermined number Cs1 (i.e., the number of the spare tire 12). Owing to this arrangement, the spare tire 12 is accurately identified.

In the present embodiment, a non-mounted-tire information separator is constituted by portions of the receiving controller 74 which are assigned to store and execute the spare-tire identifying routine program (i.e., step S12 of the tire-information processing routine illustrated by the flow chart of FIG. 4) illustrated by the flow chart of FIG. 5. The non-mounted-tire information separator serves also as a non-mounted-tire information determining portion, a tire-state-basis determining portion, a data processor, a mounted-tire-state-data processor, a tire-temperature-change-basis determining portion and a non-mounted-tire identification data obtaining portion. Further, an air-pressure abnormality determining portion is constituted by portions of the receiving controller 74 which are assigned to store and implement steps S3, S15, S22 of the tire-information processing routine program illustrated by the flow chart of FIG. 4. Further, an informing device is constituted by the warning device 72 and portions of the receiving controller 74 which are assigned to store and execute an informing-device controlling routine program illustrated by the flow chart of FIG. 6.

In the present embodiment, it is possible to understand that the ON state of the spare-tire successfully identified flag corresponds to the state in which one of the tire data sets 50 can be determined to have been transmitted from the spare tire 12 as the non-mounted tire, and that the ON state of the spare-tire unidentifiable flag corresponds to the state in which none of the tire data sets 50 can be determined to have been transmitted from the spare tire 12 as the non-mounted tire. In this understanding, the spare-tire identification enabling condition can be considered to correspond to "a predetermined condition" (which is described in the mode (13) in the above "SUMMARY OF THE INVENTION"). Further, it is also possible to understand that the OFF state of the spare-tire successfully identified flag corresponds to the state in which none of the tire data sets 50 can be determined to have been transmitted from the spare tire 12. In this understanding, it is possible to consider that the above-described "predetermined condition" is satisfied when the ignition switch 76 is placed in its ON state. With the spare-tire successfully identified flag being in its ON state, steps S14–S20 are implemented. With the spare-tire unidentifiable flag being in its ON state, namely, with the spare-tire successfully identified flag being its OFF state, steps S21–S25 are implemented. In the latter case, the warning flag is set to ON if the air pressure of the tire is low (irrespective of whether the tire in question is one of the mounted tires 10 or the spare tire 12), whereby the informing device 72 is activated. That is, in the latter case where the spare-tire successfully identified flag is not in its ON state, the tire date set of each mounted tire 10 and that of the spare tire 12 are equally handled or processed.

In the present embodiment, the spare-tire unidentifiable flag is set to ON if the provisional determination can not be made even after steps S51, S52, S53 have been repeatedly implemented the predetermined number N0 of times. In this arrangement, two different flags may be provided in addition to or in place of the spare-tire unidentifiable flag, such that one of the two flag is set to ON where the provisional determination can not be made due to dissatisfaction with the spare-tire identification enabling condition, and such that the other flag is set to ON where the provisional determination can not be made due to a negative decision in step S52 or an affirmative decision in step S53. Further, the arrangement may be modified such that the control flow may go directly to step S61 from step S51 when it is determined in step S51 that the spare-tire identification enabling condition is not satisfied, whereby the spare-tire unidentifiable flag is immediately set to ON without repeating the implementation of step S51. The identification enabling condition may include a running-time-related requirement that a running time be not smaller than a predetermined value while a stopping time be not larger than a predetermined value, or alternatively, may include a running-distance-related requirement that a running distance be not smaller than a predetermined value. The running time may be, for example, a length of time for which the vehicle runs at a speed not smaller than a predetermined value.

In the present embodiment, the spare tire 12 is identified based on change of the temperature represented by the temperature data 58. However, the identification of the spare tire 12 does not have to be made necessarily based on the temperature change, but may be otherwise made. Namely, the manner for the determination in step S53 may be modified as needed. For example, the spare tire 12 may be identified based on the temperature after the temperature has been stabilized (e.g., after at least one hour has passed since initiation of the vehicle running). The spare tire 12 is distinguishable from the mounted tires 10 since the temperature of the spare tire 12 tends to be lower than that of each mounted tire 10 also in the temperature stabilized stage.

For the distinction of the spare tire 12 from the mounted tires 10, the temperatures of the respective tires may be checked individually from each other by comparing each of the temperatures with a predetermined reference value, or alternatively, the temperatures of the respective tires may be compared with each other. In the latter case, it is possible to determine that the spare tire is one of the tires which has the lowest temperature or which exhibits the smallest change in the temperature.

Further, the spare tire 12 can be identified also on the basis of the identification data 54. For example, the identification data 54 of the spare tire 12 may be stored into the data storage when the spare tire 12 is loaded onto the vehicle. In this instance, the identification data 54 may be stored into the data storage in such a manner that correlates the identification data with the spare tire 12. Still further, the spare tire 12 can be identified also on the basis of the air pressure itself. For example, where the air pressures of all the tires 10, 12 of the vehicle are held within a normal range, it is possible to determine that the spare tire 12 corresponds to the tire having the lowest air pressure among all the tires 10, 12. The air pressure of each mounted tire 10, which is subjected to a weight of the vehicle and whose temperature is increased during running of the vehicle, tends to be higher than that of the spare tire 12. Moreover, the spare tire 12 can be identified also on the basis of change of the air pressure. In contrast with the air pressure of the spare tire 12 which is not substantially changed, the air pressure of each mounted tire 10 is changed in response to change of the temperature and also change of amount of force acting on the tire, so that the air pressure of each mounted tire 10 is changed by a relatively large amount and with a relatively high frequency. In view of this, where there is a tire exhibiting an air pressure change whose absolute value is not smaller than a predetermined value, or whose frequency is not smaller than a predetermined value (namely, the air pressure change whose value is larger than the predetermined value takes places at least a predetermined number of times within a predetermined length of time), it is possible to determine that the tire in question is one of the mounted tires 10.

Figure 8:
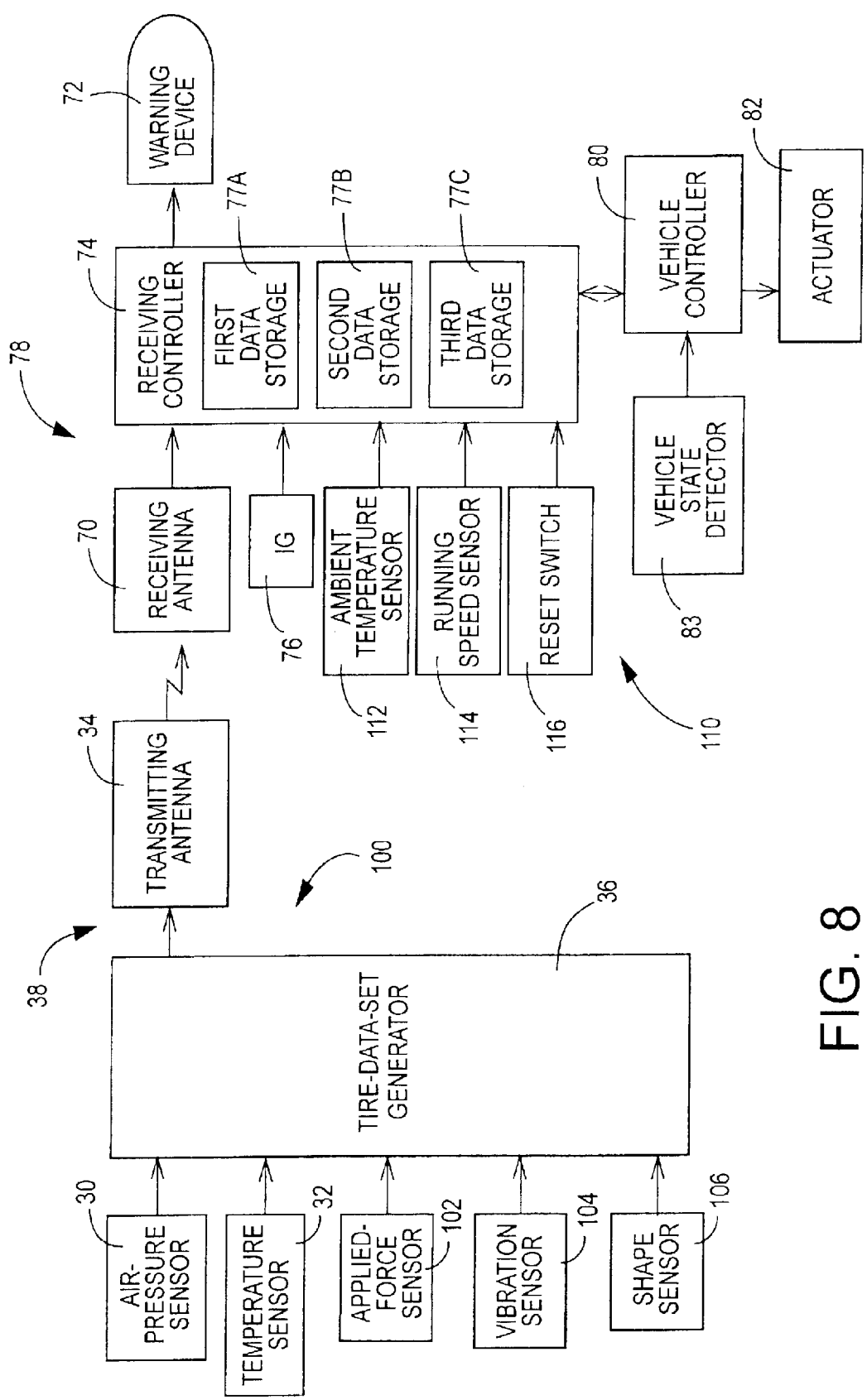
FIG. 8 is a block diagram showing a tire information processing apparatus which is constructed according to a second embodiment of the invention.

Referring next to FIG. 8, there will be described a tire information processing apparatus which is constructed according to a second embodiment of the invention, and in which the above-described local unit 20 and central unit 24 are respectively replaced with a local unit 100 and a central unit 110. In the local unit 100 which is provided in each of the tires 10, 12, an applied-force sensor 102, a vibration sensor 104 and a shape sensor 106, as well as the air-pressure sensor 30 and the temperature sensor 32, are connected to the input portion of the tire information generator 36. In the central unit 110, an ambient temperature sensor 112, a running speed sensor 114 and a reset switch (initializing switch) 116, as well as the ignition switch 76, are connected to the input portion of the receiving controller 74. With the provisions of the applied-force sensor 102, the vibration sensor 104 and the shape sensor 106 in the local unit 100, the tire data set 50 can be adapted to include, in addition to the air pressure data 56 and the temperature data 58, a data representative of a force applied to the tire in a transversal, longitudinal or vertical direction of the vehicle, a data representative of vibration of the tire, and a data representative of a shape of the tire. It is noted that the local unit 100 does not have to include necessarily all of the applied-force sensor 102, vibration sensor 104 and shape sensor 106 but may include at least one of these sensors 102, 104, 106, so that the tire data set 50 include at least one of the above-described data representative of the applied force, data representative of the vibration and data representative of the tire shape.

The applied-force sensor 102 serves to detect a force applied to the tire in the transversal direction, a force applied to the tire in the longitudinal direction and/or a force applied to the tire in the vertical direction, and may include a strain gage which can be fixed to the wheel or the axle. For example, each of the mounted tires 10 receives a force acting thereon in the vertical direction while the spare tire 12 does not substantially receive a force acting thereon in the vertical direction. Thus, since the force acting on each of the mounted tires 10 in the vertical direction tends to be larger than the force acting on the spare tire 12 in the vertical direction, it is possible to know that the data indicative of the relatively large vertical force is originated from one of the mounted tires 10 while the data indicative of the relatively small vertical force is originated from the spare tire 12. Further, each mounted tire 10 receives a force acting thereon in the longitudinal direction during acceleration and deceleration of the vehicle, and receives a force acting thereon in the transverse direction during turning of the vehicle. Since the spare tire 12 rarely receives such forces acting in the longitudinal and transversal directions, it is possible to distinguish the spare tire 12 from the mounted tires 10 on the basis of such longitudinal and transversal forces. Thus, the data representative of the force acting on the tire can cooperate with data representative of the running state of the vehicle, so as to increase a reliability of the distinction of the spare tire 12 from the mounted tires 10.

For example, in step S53 of the spare-tire identifying routine of FIG. 5, it is possible to effect a determination as to whether a force acting on each tire in the vertical direction is smaller than a predetermined reference amount, instead of effecting the determination as to whether the amount $\Delta Th$ of change of each tire is smaller than the predetermined reference amount $\Delta Ts$. In this arrangement, if there is a tire receiving the vertical force whose amount is smaller than the predetermined amount, it is possible to determine that the tire in question is the spare tire 12. Further, in step S53, it is also possible to determine whether a force acting on each tire in the longitudinal or transversal direction is smaller than a predetermined amount. In this arrangement, it is preferable that the spare-tire identification enabling condition includes, in addition to the above-described running-time-related requirement, a running-motion-related requirement that the vehicle be currently accelerating, decelerating or turning. It is noted that the vertical, longitudinal or transversal forces acting on the respective tires may be compared with each other without using the predetermined reference amount. In this case, it is possible to determine that the spare tire is one of the tires on which the smallest force acts.

Figure 9:
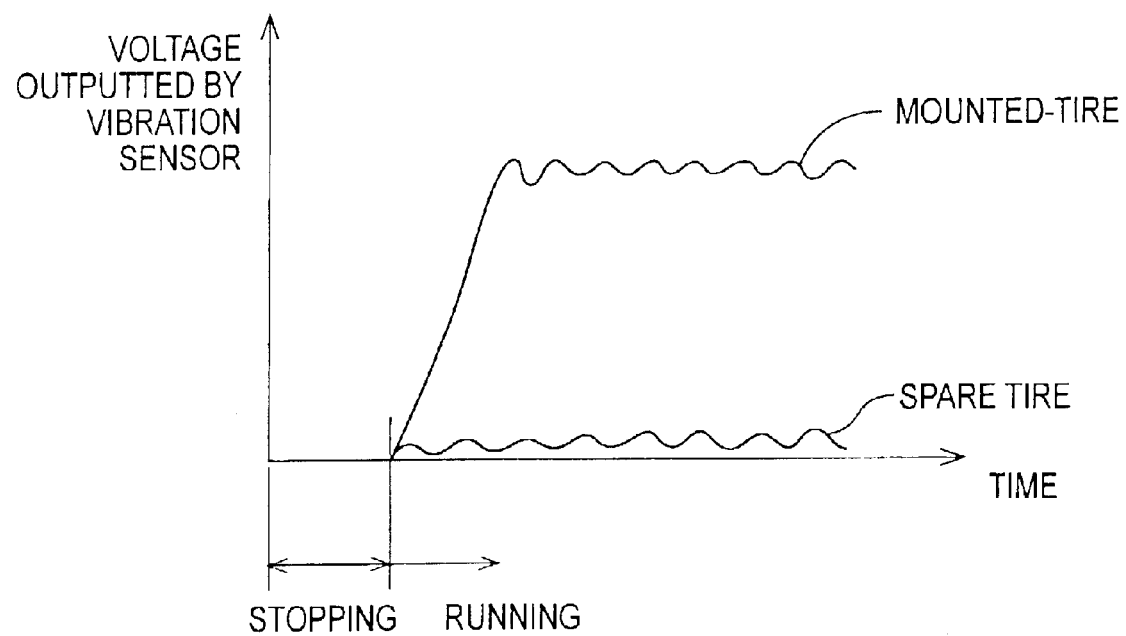
FIG. 9 is a graph indicating vibrations of a mounted tire and a non-mounted tire.

The vibration sensor 104 has a vibrator, and is adapted to detect vibration acting on the vibrator. This vibration sensor 104 outputs a signal whose voltage is variable depending upon an amount of displacement of the vibrator. In the present embodiment, the vibration sensor 104 is arranged to detect vibration applied principally in a radial direction of the tire. This is because each of the mounted tires 10 is vibrated in the radial direction due to a centrifugal force (rotational acceleration) acting on the mounted tire 10 tire as a result of rotation of the mounted tire 10, although the mounted tire 10 is vibrated also in the other directions as a result of running of the vehicle. On the other hand, there is substantially no centrifugal force acting on the spare tire 12, although the spare tire 12 is vibrated as a result of running of the vehicle. Therefore, the voltage outputted by the sensor 104 provided in each mounted tire 10 is higher than the voltage outputted by the sensor 104 provided in the spare tire 12, by at least an amount corresponding to influence of the centrifugal force, as shown in the graph of FIG. 9. Based on this fact, it is possible to determine that the spare tire 12 is one of the tires in which the vibration sensor 104 outputs the smallest absolute value of voltage as expressed as follows:

MIN|Vi| where "i" (numeral assigned to each tire)=1–5

It is also possible to determine that the spare tire 12 is one of the tires in which the vibration sensor 104 outputs a voltage Vi which is the most deviated from the average (<Vi>=ΣVi/5) of the voltages outputted from the respective five sensors 104, namely, which satisfies the following expression:

MAX|<Vi>–Vi|

Figure 10:
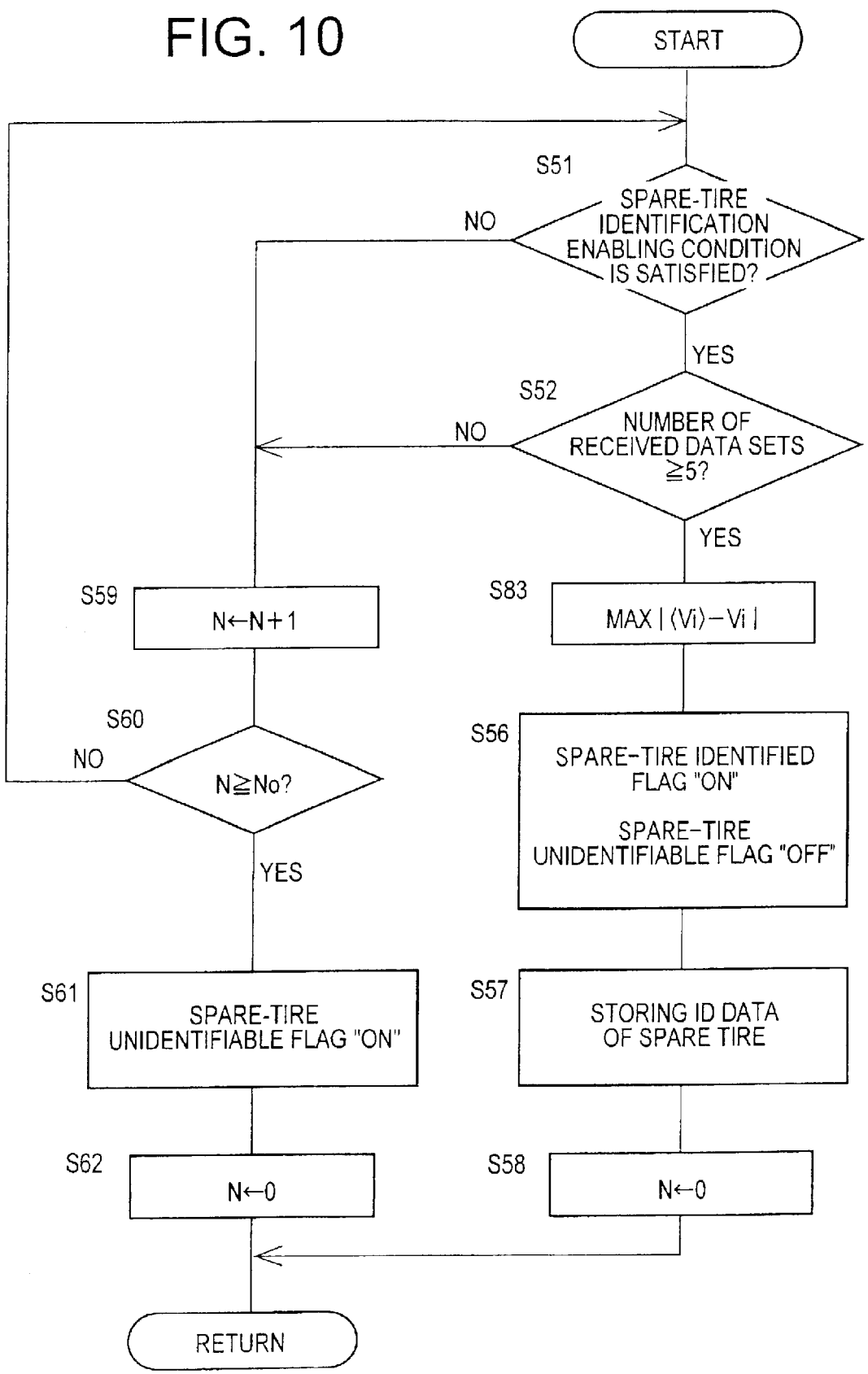
FIG. 10 is a flow chart illustrating a part of a tire-information processing routine executed according to a control program stored in the tire information processing apparatus of FIG. 8.

In this arrangement in which the vibration data of the spare tire 12 is distinguished from that of each of the mounted tires 10 by comparing the voltages outputted by the respective sensors 104, with each other, it is possible to certainly distinguish one of the tire data sets as the tire data set of the spare tire 12, from the other tire data sets. In a spare-tire identifying routine illustrated by the flow chart of FIG. 10, step S83 is implemented to calculate five absolute values each obtained by subtracting the corresponding voltage value from the average of the five voltage values, and then compare the obtained five absolute values with each other. That is, in step S83, it is determined that the tire data set, including the vibration data providing the largest one among the five absolute values, has been transmitted from the spare tire 12. In step S57, the identification data included in the tire data set of the spare tire 12 is stored in the second data storage 77B. It is noted that the vibration sensor 104 may be adapted to detect exclusively the vibration acting on the tire in a particular direction, and not detect the vibration acting in the other directions. For example, it is preferable that the vibration sensor 104 is arranged to detect exclusively the vibration acting in the radial direction, or to detect the vibration acting in the radial direction more easily than that acting in the other direction. The vibration sensor 104 may be referred also to as an acceleration sensor. In the present embodiment, a tire-motion-basis determining portion (which is described in the mode (7) in the above "SUMMARY OF THE INVENTION") is principally constituted by portions of the receiving controller 74 which are assigned to store and execute the spare-tire identifying routine program illustrated by the flow chart of FIG. 10.

The shape sensor 106 serves to measure a radial dimension and an axial width dimension of the tire, and may include a non-contact-type displacement sensor. Since each of the mounted tires 10 has an aspect ratio RH/RV (ratio of a radial dimension RH to a width dimension RV) which is smaller than that of the spare tire 12, the spare tire 12 is identifiable based on the aspect ratio. For example, it is possible to determine that the spare tire 12 is one of the tires having an aspect ratio not smaller than a predetermined value, or that the spare tire 12 is one of the tires having the largest aspect ratio. It is noted that it is also possible to identify the spare tire 12 on the basis of two or more tire-state data elements contained in the tire data set 50, so that the identification of the spare tire 12 can be made more accurately and reliably.

Figure 11:
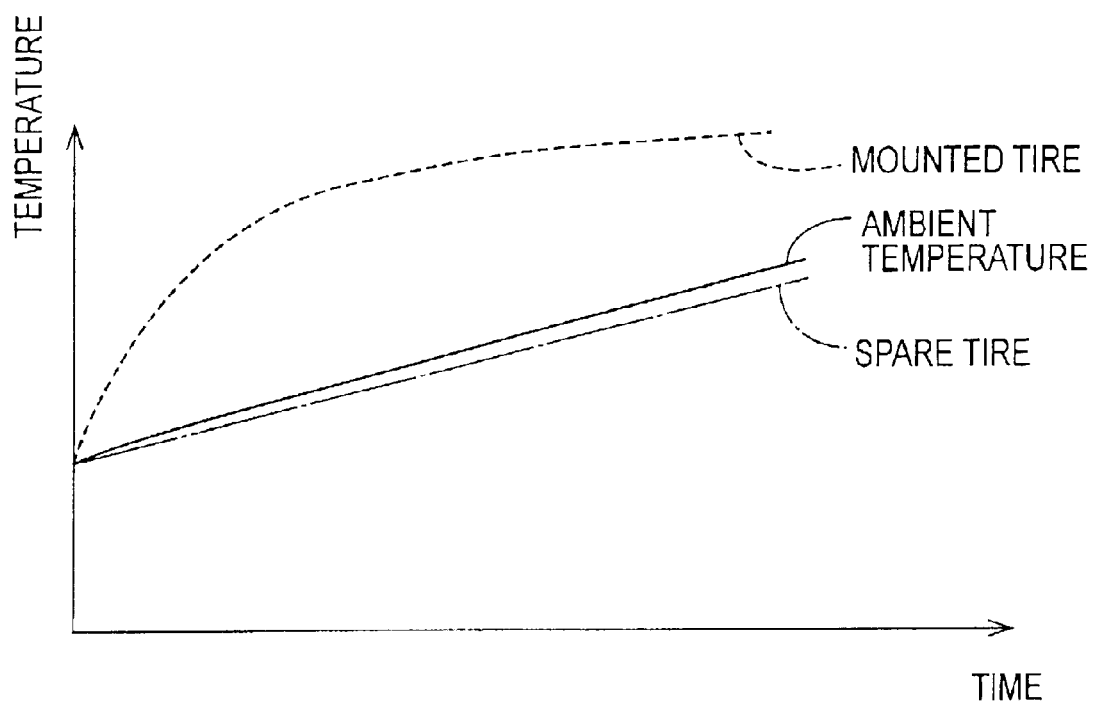
FIG. 11 is a graph indicating changes of an ambient temperature and temperatures of tires during running of the vehicle.

The non-mounted tire 12 can be identified also based on a difference between an ambient temperature and the tire temperature, since the difference between the ambient temperature and the temperature of the spare tire 12 tends to be smaller than the difference between the ambient temperature and the temperature of the mounted tire 10, as shown in FIG. 11. In the light of this fact, step S83 of the spare-tire identifying routine of FIG. 10 may be modified to be implemented to calculate a minimum value of the difference between the ambient temperature and the tire temperature, in place of calculating the voltage value most deviated from the average voltage value. Described more specifically, when a length of time having elapsed after initiation of running of the vehicle is not smaller than a predetermined value, a difference between the ambient temperature Tout and the temperature Ti of each tire is obtained. Then, five absolute values each obtained by subtracting the corresponding temperature Ti from the ambient temperature Tout are compared with each other. In this instance, it is determined that the spare tire 12 is one of the tires which has a temperature that is the closest to the ambient temperature Tout, namely, which satisfies the following expression:

$$MIN|Tout-Ti|$$

In this arrangement, a temperature-difference-basis determining portion (which is described in the mode (6) in the above "SUMMARY OF THE INVENTION") is principally constituted by a portion of the receiving controller 74 which is assigned to identify the spare tire 12 on the basis of the difference between the tire temperature and the ambient temperature.

Figure 12:
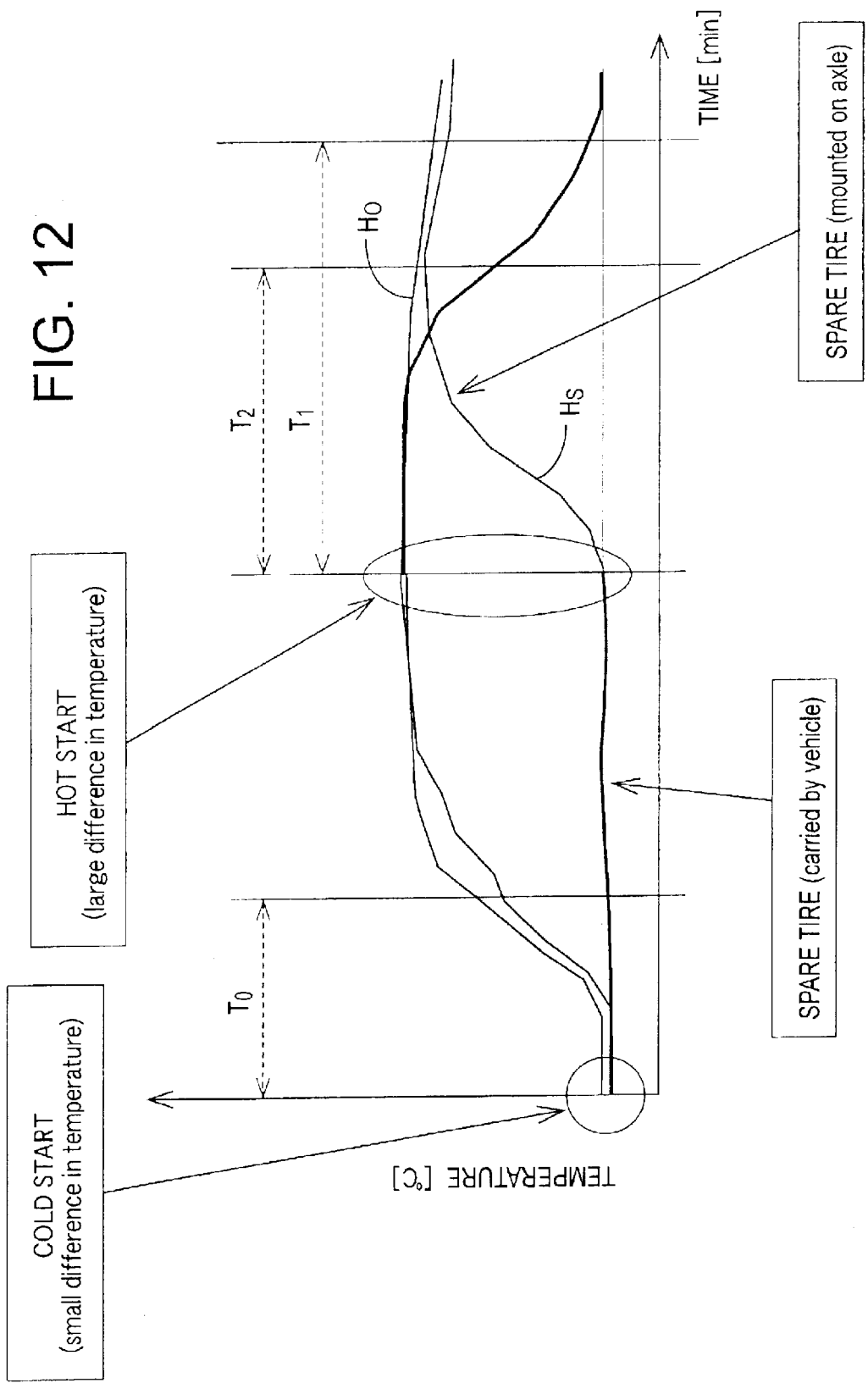
FIG. 12 is a graph indicating changes of temperatures of tires of a vehicle equipped with a tire information processing apparatus which is constructed according to a third embodiment of the invention.

Further, the non-mounted tire 12 can be identified by taking account of the tire state upon initiation of running of the vehicle. In other words, it is possible to consider that the identification of the non-mounted tire 12 can be made based on the tire state (e.g., difference among the temperatures of the tires) upon initiation of running of the vehicle and also the temperature or temperature change during running of the vehicle when the spare-tire identification enabling condition is satisfied, or alternatively, the identification can be made in an identifying manner that is selected based on the tire state upon initiation of running of the vehicle. As shown in FIG. 12, there are two patterns with respect to the tire temperature upon initiation of running of the vehicle. One of the two patterns (hereinafter referred to as "cold-start pattern") is that the temperatures of all the tires are substantially equal to each other and to the ambient temperature upon initiation of running of the vehicle. The other pattern (hereinafter referred to as "hot-start pattern"), which takes place, for example, when one of the mounted tires 10 having gone flat is replaced with the spare tire 12, is that the temperatures of the spare tire 12 and the mounted tire 10 is considerably different from each other upon initiation of running of the vehicle. In the cold-start pattern, the temperature of the mounted tire 10 is increased at a higher rate than the spare tire 12 after the initiation of running. In the hot-start case, on the other hand, the temperature of the spare tire 12 (which used to be the mounted tire before the replacement) is higher than the ambient temperature upon initiation of the running, and is then reduced after the initiation of running. Further, in this hot-start pattern, the temperature (Hs in FIG. 12) of the newly mounted tire (which used to be the spare tire before the replacement) is increased at a high rate after the initiation of running, while the temperatures (Ho in FIG. 12) of the other mounted tires are no longer increased even after the initiation of running since the temperatures of those mounted tires had been already increased to the constant level.

Therefore, where there is not a large difference among the temperatures of the tires 10, 12 upon switching of the ignition switch 76 from its OFF state to ON state (upon starting of the vehicle), it can be determined that the tires, each having a relatively high temperature and exhibiting a relatively high rate of the temperature increase after a predetermined length TO of time has passed, correspond to the mounted tires 10. On the other hand, where there is a large difference among the temperatures of the tires 10, 12 upon switching of the ignition switch 76 from its OFF state to ON sate (upon starting of the vehicle), it can be determined that the tire, whose temperature is reduced after a predetermined length T2 of time, corresponds to the spare tire 12. Further, it can be also determined that the tire, whose temperature is the lowest among all the tires after a predetermined length T1 of time, corresponds to the non-mounted tire. It is noted that it is possible to determine that any tire whose temperature is not smaller than a predetermined guard value (e.g., 50° C.) corresponds to the mounted tire 10 even if the temperature of the tire in question is the lowest among all the tires, so that the mounted tire 10 can be prevented from being erroneously identified as the spare tire 12.

Figure 13:
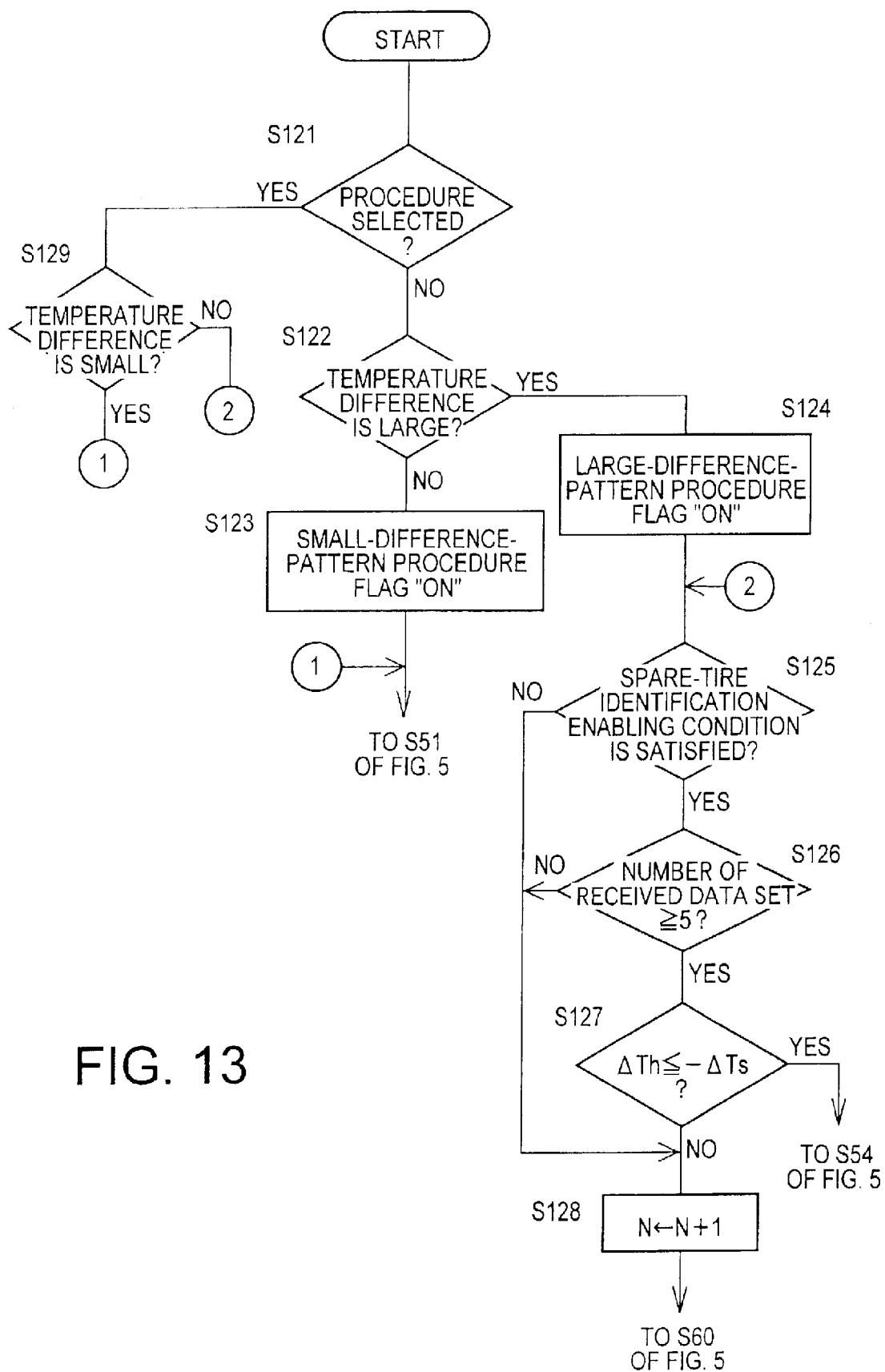
FIG. 13 is a flow chart illustrating a part of a tire-information processing routine executed according to a control program stored in the tire information processing apparatus of the third embodiment of the invention.

In this third embodiment, a spare-tire identification routine illustrated by the flow chart of FIG. 13 is executed. In this routine of FIG. 13, the identification of the spare tire 12 is effected in a selected one of two identification procedures, i.e., a small-temperature-difference-pattern procedure and a large-temperature-difference-pattern procedure. The routine is initiated with step S121 to determine whether one of the two identification procedures has bee already selected or not. When step S121 is implemented for the first time, a negative decision is obtained in step S121 since the procedure selection is not done at least before the first implementation of step S121. The negative decision in step S121 is followed by step S122 to determine whether the difference among the temperatures of the respective tires is equal to or larger than a predetermined amount. If the difference among the temperatures of the respective tires is smaller than the predetermined amount, the small-temperature-difference-pattern procedure suitable for the "cold-start pattern" is selected. In this case, step S123 is implemented to set a small-temperature-difference-pattern procedure flag to ON, whereby step S51 and the following steps are implemented as shown in FIG. 5. In this case of the small-temperature-difference-pattern procedure, the spare-tire identification enabling condition is provided by a running-time-related requirement that at least the predetermined length T0 of time has elapsed after initiation of running of the vehicle.

If the temperature difference is not smaller than the predetermined amount, namely, if an affirmative decision is obtained in step S122, the large-temperature-difference-pattern procedure suitable for the "hot-start pattern" is selected. In this case, step S124 is implemented to set a large-temperature-difference-pattern procedure flag to ON, whereby step S125 and the following steps are implemented. In step S127, it is determined whether there is a tire whose temperature change amount ΔTh is equal to or smaller than a predetermined negative amount ΔTs. If an affirmative decision is obtained in step S127, the control flow goes to step S54 in which the tire in question is provisionally determined as the spare tire 12. In this case of the large-temperature-difference-pattern procedure, the spare-tire identification enabling condition is provided by a running-time-related requirement that at least the predetermined length T2 of time has elapsed after initiation of running of the vehicle.

If one of the two identification procedures has been already selected, an affirmative decision is obtained in step S121, whereby the control flow goes to step S129 that is implemented to determine which one of the two procedure flags is in its ON state, so that the identification of the spare tire 12 is effected in a suitable one of the two identification procedures. In this third embodiment, the spare tire 12 can be identified with a high accuracy owing to the arrangement in which the identification of the spare tire 12 is effected in one of the different procedures that is selected based on the temperature difference upon initiation of running of the vehicle. It is noted that the accuracy of the identification of the spare tire 12 can be further improved, if the identification is effected based on both of the temperature and temperature change.

As described above, in the tire-information processing routine illustrated by the flow chart of FIG. 4, where the spare-tire successfully identified flag is not in its ON state, the tire data set of each mounted tire 10 and that of the spare tire 12 are equally handle or processed, so that the warning flag is set to ON if one of the tire indicates an abnormal state, irrespective of whether the tire in question is the mounted tire 10 or the spare tire 12. This arrangement provides an advantage, for example, in a case where the spare tire is mounted on the axle in place of one mounted tire after the identification data of the spare tire has been stored as the identification data of the spare tire. That is, in this case, the warning device 72 can be activated even in the event of reduction of the air pressure of the newly mounted tire which used to be the spare tire and which is recognized still as the spare tire. However, this arrangement may be modified as needed. For example, it is possible to suspend the processing of the tire data sets 50 or suspend the detection of an abnormality of the tire state, until the spare-tire successfully identified flag is placed into its ON state in each cycle of execution of the routine, so that the warning device 72 is not activated even if the air pressure of any one of the tires 10, 12 is low. Further, it is also possible to identify the spare tire 12 on the basis of the identification data stored in the last cycle of the execution of the routine.

In the routine illustrated by the flow chart of FIG. 4, the detection or identification of the spare tire 12 is effected when the ignition switch 76 is switched from its OFF state to ON state. However, the routine may be modified such that the identification of the spare tire 12 is effected when the vehicle is stopped and restarted. This modification makes it possible to correctly identify the spare tire 12 even if a tire replacement is made with the ignition switch 76 being held in its ON state. The identification of the spare tire 12 may be effected at a desired point of time after a tire replacement, wherein the point of time is determined or modified by the vehicle driver or operator.

For example, the identification of the spare tire 12 may be effected when the reset switch 116 is operated after a tire replacement in which a flat one of the mounted tires 10 is replaced with the spare tire 12. In this arrangement, the flat tire (which used to be one of the mounted tires and then removed from the axle) is correctly identified as the non-mounted tire, so that the identification data included in the tire data set transmitted from the flat tire is stored as the non-mounted tire identification data in the data storage.

Figure 14:
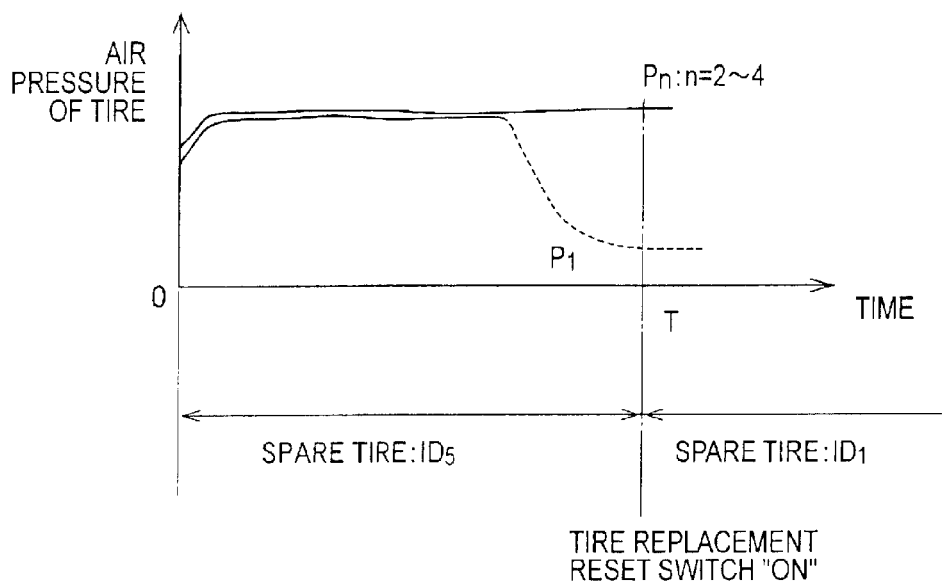
FIG. 14 is a graph indicating changes of air pressures of tires of a vehicle equipped with a tire information processing apparatus which is constructed according to a fourth embodiment of the invention.
Figure 15:
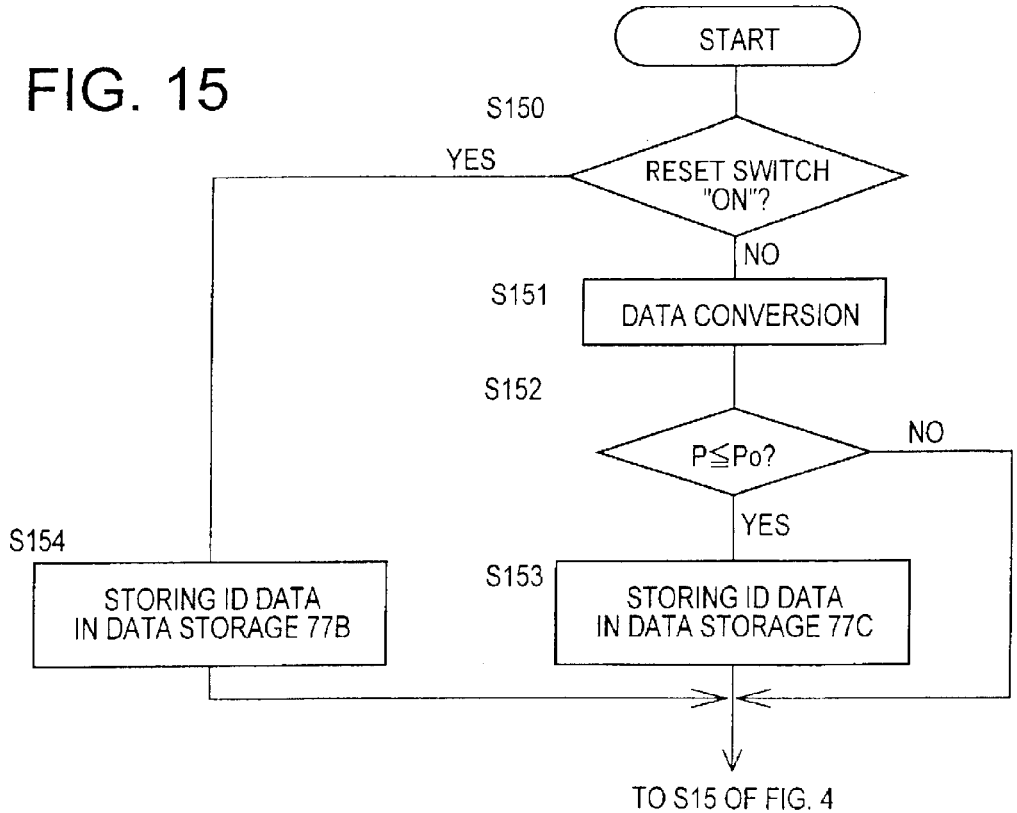
FIG. 15 is a flow chart illustrating a part of a tire-information processing routine executed according to a control program stored in the tire information processing apparatus of the fourth embodiment of the invention.

A part of a tire-information processing routine is illustrated by the flow chart of FIG. 15. Step S150 is implemented to determine whether the reset switch 116 has been switched from its OFF state to its ON state. If a negative decision is obtained in step S150, step S151 is implemented to convert the received tire data set into the form processable by the computer of the receiving controller 74, and step S152 is then implemented to determine whether the air pressure value represented by the air pressure data included in each tire data set is lower than the predetermined minimum value. If the air pressure value is lower than the predetermined minimum value, the identification data included in the tire data set in question is stored in the third data storage 77C in step S153. In this fourth embodiment, where a tire replacement is effected at a point T of time as shown in FIG. 14, the reset switch 116 is operated whereby an affirmative decision is obtained in step S150. The affirmative decision in step S150 is followed by step S154 in which the identification data, stored in the third data storage 77C in step S153, is stored in the second data storage 77B. This routine illustrated by the flow chart of FIG. 15 is executed equally irrespective of whether the ignition switch 76 is in its ON state or OFF state, since the reset switch 116 is operable in the ON state of the ignition switch 76 as well as in the OFF state of the ignition switch 76. In this fourth embodiment in which the identification of the spare tire 12 is effected each time the rest switch 116 is operated, the identification data of the spare tire obtained or stored in the last cycle of execution of the routine is used during a period of time between a moment at which the reset switch 116 is turned ON and a moment at which the identification data of the spare tire is newly obtained or stored in the present cycle of execution of the routine.

Figure 16:
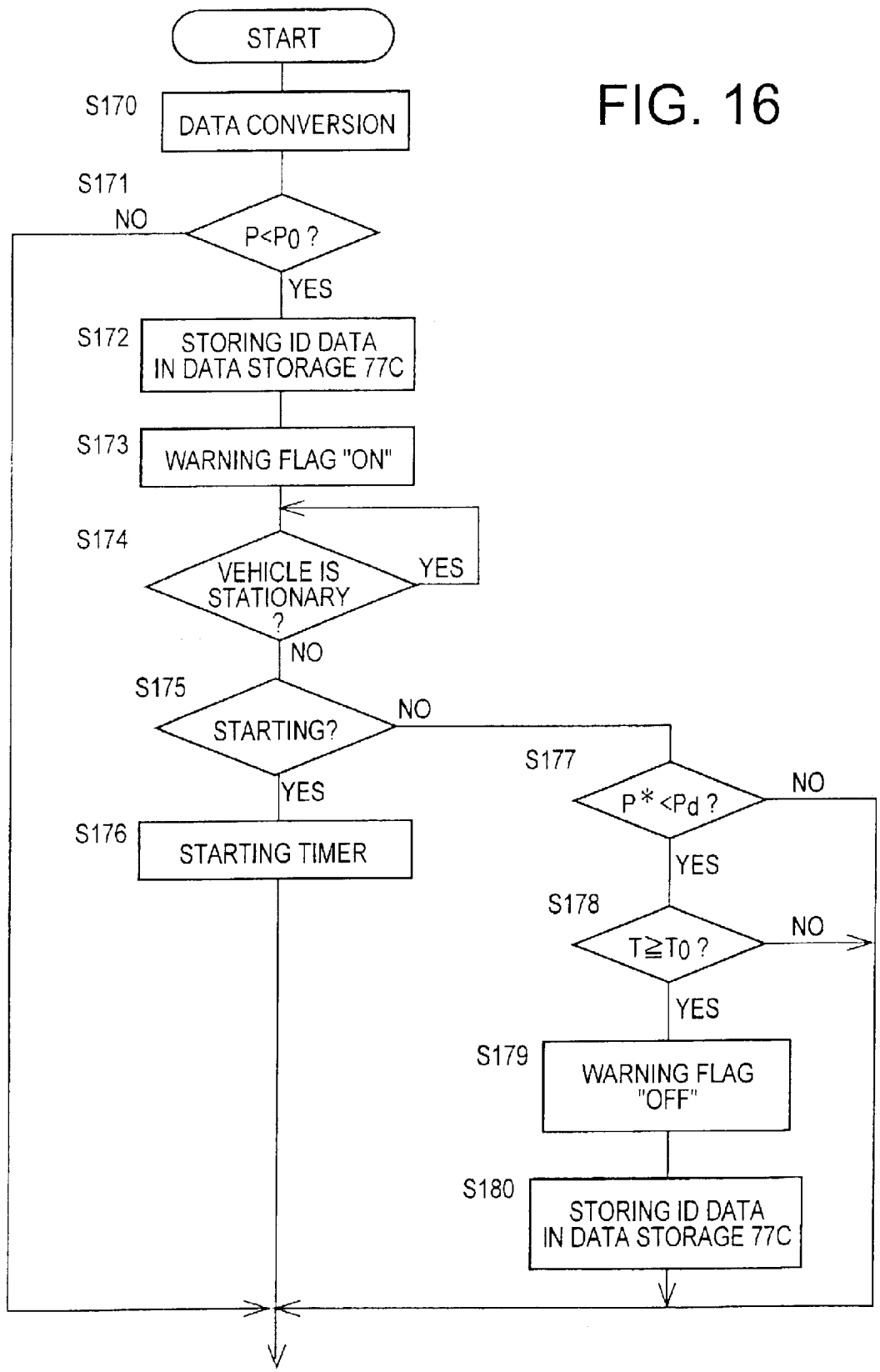
FIG. 16 is a flow chart illustrating a part of a tire-information processing routine executed according to a control program stored in a tire information processing apparatus constructed according to a fifth embodiment of the invention.
Figure 17:
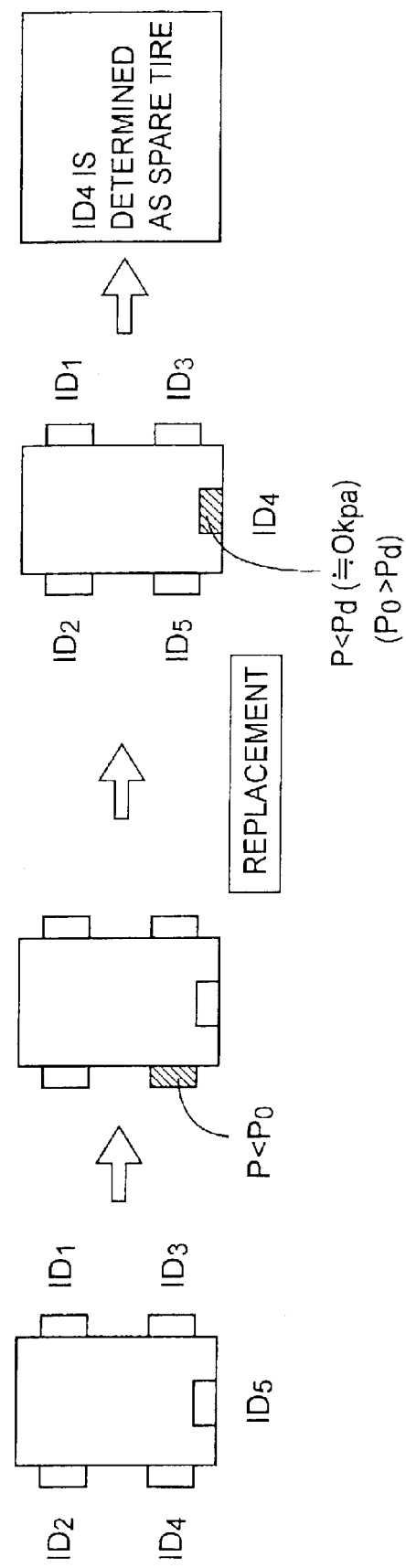
FIG. 17 is a view illustrating a tire replacement effected in a vehicle equipped with the tire information processing apparatus of the fifth embodiment of the invention.

When a flat one of the mounted tires 10 whose air pressure has been reduced is removed from the axle so as to be replaced by the spare tire 12, the air pressure of the flat tire may be further reduced in a suitable manner, so as to be smaller than a predetermined minimum pressure value that is required to permit the vehicle to run for a predetermined length of time, before the flat tire is disposed on a designated position in the vehicle body. This arrangement makes it possible to determine that the spare tire is one of the tires which has the air pressure smaller than the predetermined minimum pressure value, when the vehicle has run for at least the predetermined length of time (see FIG. 17). A part of a tire-information processing routine is illustrated by the flow chart of FIG. 16. Step S170 is implemented to convert the received tire data set into the processable form, and step S171 is then implemented to determine whether the air pressure value represented by the air pressure data included in each tire data set is lower than a predetermined first value P0. If the air pressure value of at least one of the tires is not larger than the predetermined first value P0, an affirmative decision is obtained in step S171, the control flow goes to step S172 in which the identification data of the tire whose air pressure is not larger than the predetermined first value P0 is stored in the third data storage 77C. Step S172 is followed by step S173 to set the warning flag to ON. Step S174 is implemented to determine whether the vehicle is currently stationary or not. This step S174 is repeatedly implemented until a negative decision is obtained, namely, until the vehicle starts to run. When the vehicle is not currently stationary, negative decisions are obtained in steps S174 and S175, whereby step S177 and the following steps are implemented. If the vehicle continues running without the tire replacement, a negative decision is obtained in step S177 in which it is determined whether the air pressure of at least one of the tires is lower than the above-described predetermined minimum pressure value (hereinafter referred to as "a predetermined second value Pd"), since the air pressure of each tire is not lower than the predetermined second value Pd. With the negative decision in the determination of step S177, the control flow goes to step S14 without resetting the warning flag to OFF.

If an affirmative decision is obtained in step S174, there is a possibility that the tire replacement has been made. In this case, an affirmative decision is obtained in step S175 when the vehicle starts to run, and step S176 is implemented to start a timer upon starting of the vehicle. While the vehicle is running, negative decisions are obtained in steps S174, S175, whereby the control flow goes to step S177 which is implemented to determine whether the air pressure of at least one of the tires is smaller than the predetermined second value Pd (that is lower than the predetermined first value P0). If the air pressure of any one of the tires is not smaller than the second value Pd, the warning flag is held in its ON state since there is a possibility that the tire replacement has not been made. If the air pressure of at least one of the tires is smaller than the second value Pd (that may be close to a value of the atmospheric pressure), step S178 is implemented to determine the time measured by the timer has reached a predetermined value T0. If the time has reached the predetermined value T0 with the air pressure of the tire in question being smaller than the second value Pd, it is possible to determine that the tire in question is the spare tire 12. An affirmative decision in step S178 is followed by steps S179 in which the warning flag is reset to OFF. Step S180 is implemented to determine that the identification data stored in the third data storage 77C corresponds to the identification data of the spare tire 12, so that the identification data stored in the third data storage 77C is stored also in the second data storage 77B. Meanwhile, the timer is reset to "zero".

The routine of this fifth embodiment may be provided with manual steps, which are implemented manually by the vehicle driver or operator when the tire replacement is made, namely, when one of the mounted tires 10 is replaced by the spare tire 12. The manual steps are: reducing the air pressure of the dismounted tire to a level smaller than the predetermined second value Pd; and operating the reset switch 116. In this arrangement, step S175 and the following steps are implemented in response to the operation of the reset switch 116. Further, the reset switch 116 may be operated when the spare tire whose air pressure is low is replaced with a new spare tire. In this arrangement, the identification data of the new spare tire may replace that of the ex-spare tire, so as to be stored in the data storage.

While an abnormality of the tire state is detected during the OFF state of the ignition switch 76 as well as during the ON state of the ignition switch 76 in the above-described embodiments with the tire-information processing routine of FIG. 4, the detection of abnormality of the tire state during the OFF state of the ignition switch 76 is not essential. Further, in the above-described embodiments, if at least one of the tires 10, 12 is detected to have a low air pressure before the spare tire 12 is identified, the warning device 72 is activated irrespective of whether the tire having the low air pressure is actually one of the mounted tires 10 or the spare tire 12. After the spare tire 12 is identified, if the tire having the low air pressure is determined to be the spare tire 12, the activation of the warning device 72 is immediately suspended. However, in this instance, the activation of the warning device 72 may be suspended after the activation is maintained for a predetermined length of time, so that the vehicle operator can be informed of the fact that the air pressure of the spare tire 12 is low.

Figure 18:
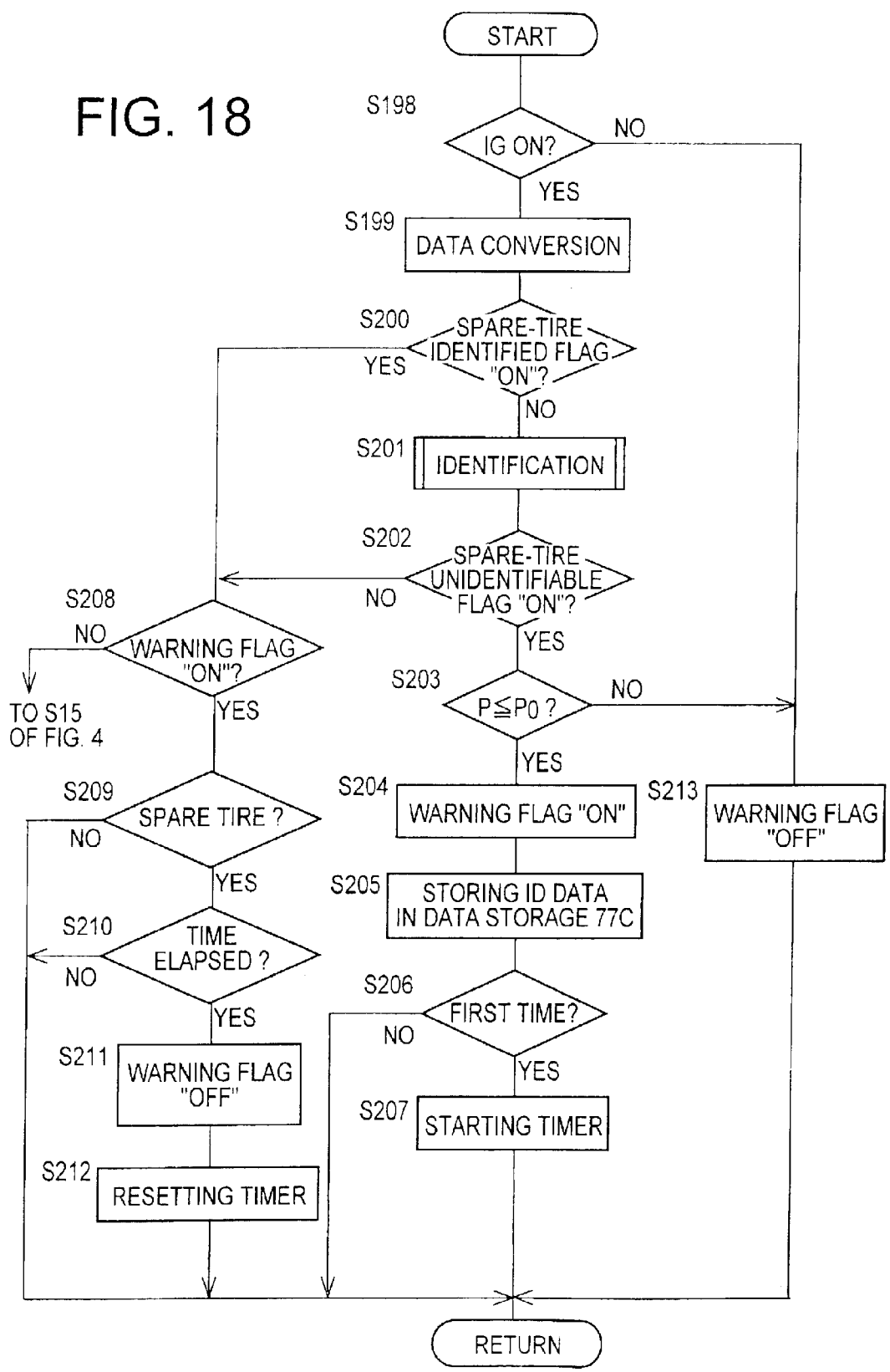
FIG. 18 is a flow chart illustrating a part of a tire-information processing routine executed according to a control program stored in a tire information processing apparatus constructed according to a sixth embodiment of the invention.

A part of a tire-information processing routine is illustrated by the flow chart of FIG. 18. Step S200 is implemented to determine whether the spare-tire successfully identified flag is in its ON sate or not. If this flag is not yet set to ON, the tire data sets of all the tires 10, 12 are equally processed in steps S203–S207. In the implementation of these steps, if at least one of the tires 10, 12 is detected to have an air pressure lower than a predetermined value, the warning flag is set to ON. The identification data of the tire in question is stored in the third data storage 77C, and the timer is then started. The ON state of the warning flag remains unchanged while the spare-tire successfully identified flag is in its OFF state. When the spare-tire successfully identified flag is set to ON, the control flow goes to step S208 to determine whether the warning flag is in its ON state or not. If the warning flag is in its ON state, step S209 is implemented to determine whether the identification data stored in the third data storage 77C in step S205 corresponds to that of the spare tire 12. If an affirmative decision is obtained in step S209, step S210 is implemented to determine the time measured by the timer has reached a predetermined value. While the measured time is smaller than the predetermined value, the activation of the warning device 72 is maintained. When the time has reached the predetermined value, namely, when the predetermined length of time has elapsed after the warning flag was set to ON, steps S211, S212 are implemented to reset the warning flag to OFF and to reset the timer to "zero". If a negative decision is obtained in step S209, the warning flag is not reset to OFF so that the warning device 72 continues to be activated.

Figure 19:
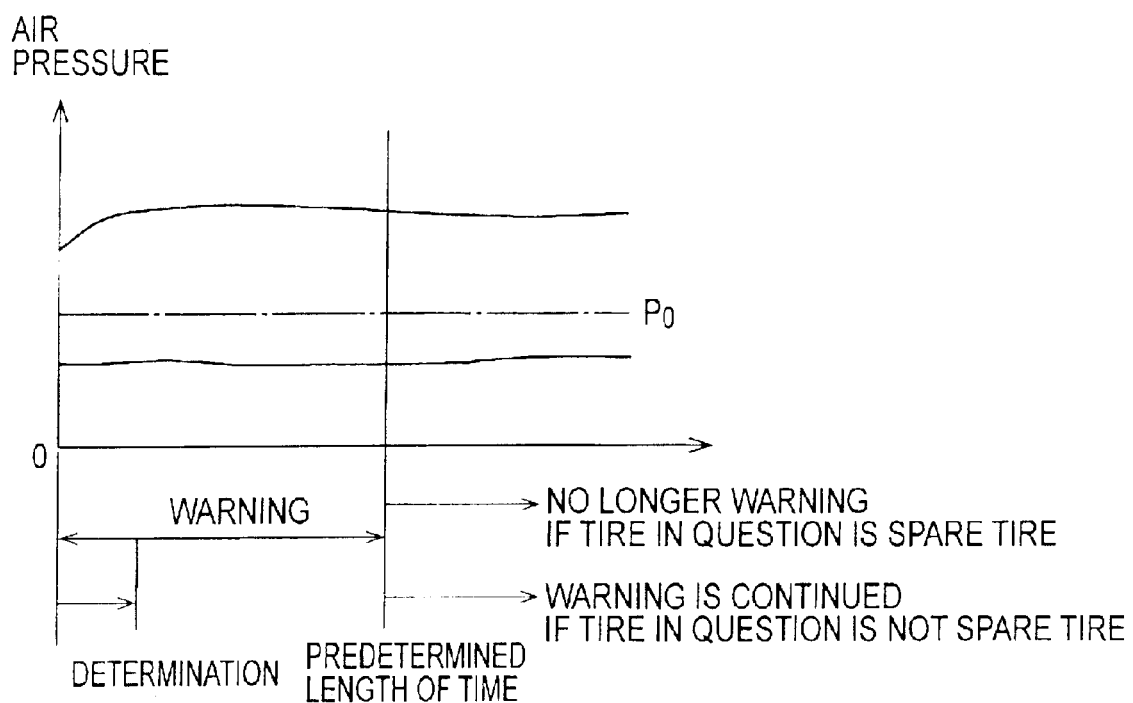
FIG. 19 is a graph indicating activation of an informing device controlled by the tire information processing apparatus of the sixth embodiment of the invention.

As described above, in this sixth embodiment of the invention, an alarm or warning is given for the predetermined length of time, as shown in FIG. 19, whereby the vehicle operator is informed of the fact that the air pressure of the spare tire 12 is low. Further, the vehicle operator is informed by the continuous activation of the warning device 72, of the fact that the air pressure of at least one of the mounted tires 10 is low. It is noted that step S213 is implemented to reset the warning device to OFF when the ignition switch 76 is in its OFF state. That is, in the present embodiment, an abnormality of the tire state is not detected during the OFF state of the ignition switch 76.

The warning device 72 may be controlled in accordance with a warning-device controlling routine illustrated by the flow chart of FIG. 20. In this seventh embodiment, if an affirmative decision is obtained in step S222, namely, if the air pressure is lower than a predetermined value Ps, step S223 is implemented to determine whether the tire data set 50 in question (including the air pressure data indicative of the low air pressure) has been transmitted from the non-mounted tire 12 or not. If the tire data set 50 in question is determined to have been transmitted from the mounted tire 10 rather than the non-mounted tire 12, step S224 is implemented to activate the warning device 72 in a predetermined manner. If the tire data set 50 in question is determined to have been transmitted from the non-mounted tire 12, step S225 is implemented to activate the warning device 72 in another predetermined manner that is different from the above-described predetermined manner. That is, the warning device 72 is activated in one of different manners that is selected depending upon whether the determination in step S222 relates to the mounted tire 10 or the non-mounted tire 12. For example, where the warning device 72 is constituted by a sound emitter, the warning device 72 may be adapted to emit one of different music melodies that is selected depending upon whether the tire having the low air pressure is the mounted tire 10 or the non-mounted tire 12. Where the warning device 72 is constituted by a display device, the warning device 72 may be adapted to display a message in one of its different portions that is selected depending upon whether the tire having the low air pressure is the mounted tire 10 or the non-mounted tire 12. In either of these cases, the warning device 72 is activated when the air pressure of at least one of the tires 10, 12 is lower than the predetermined value Ps, such that the vehicle operator can know whether the tire having the low air pressure is the mounted tire 10 or the non-mounted tire 12.

In the present embodiment with the warning-device controlling routine of FIG. 20, it is determined whether the air pressure of each tire is lower than the predetermined value Ps, and then determined whether the tire data set 50 indicative of the low air pressure has been transmitted from the non-mounted tire 12 or not, as described above. The tire-information processing routine of FIG. 4 may be modified to delete steps S19, S20, S17 so that the warning flag is not reset to OFF even if the warning flag has been set to ON due to a low air pressure (or high temperature) of the non-mounted tire 12 rather than that of the mounted tire 10. In this modified arrangement, it is possible to determine whether the warning flag is in ON state or not in step S222 of the routine of FIG. 20. Further, the tire-information processing routine of FIG. 4 may be provided with another warning flag (referred to as a second warning flag) in addition to the above-described warning flag (referred to as a first warning flag). The second warning flag is set to ON while the first warning flag is reset to OFF in step S20, namely, when an affirmative decision is obtained in step S19. In this modified arrangement, the warning device 72 is activated in one of the different manners that can be selected depending upon which one of the first and second warning flags is in ON state.

Figure 21A:
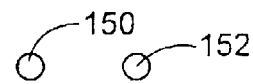

The warning device 72 may include a plurality of indicators, as shown in FIGS. 21A–21C by way of example, in which two lamps 150, 152 are provided in the warning device 72, so that the vehicle operator can know whether the tire indicating an abnormality (e.g. the air pressure lower than a predetermined minimum vale) is the mounted tire 10 or the non-mounted tire 12, by seeing the ON and OFF states of the two lamps 150, 152. In an arrangement of FIG. 21B, the first and second lamps 150, 152 are respectively placed in the ON state (light ON state or light flashing state) and the OFF state (light OFF state) when the air pressure of the mounted tire 10 is lower than the predetermined minimum value, while the first and second lamps 150, 152 are respectively placed in the OFF state and the ON state when the air pressure of the non-mounted tire 12 is lower than the predetermined minimum value. When the air pressures of the mounted and non-mounted tires 10, 12 are both lower than the predetermined minimum value, the first and second lamps 150, 152 are both placed in the ON states. In an arrangement of FIG. 21C, the first and second lamps 150, 152 are respectively placed in the ON state and the OFF state when the air pressure of the mounted tire 10 is lower than the predetermined minimum value, while the first and second lamps 150, 152 are both placed in the ON states when the air pressure of the non-mounted tire 12 is lower than the predetermined minimum value. The arrangement of FIG. 21C does not deal with the case where the air pressures of the mounted and non-mounted tires 10, 12 are both lower than the predetermined minimum value, which case is considered to rarely take place. In this eighth embodiment, the tire state is determined to be abnormal when the air pressure is lower than the predetermined minimum value. However, the condition for determining the abnormality of the tire state may be modified as needed. For example, the tire state may be determined to be abnormal when the air pressure is lower than the predetermined minimum value and/or when the tire temperature is higher than the predetermined maximum value. Further, the abnormality determination may be made when otherwise modified condition is satisfied.

The warning device 72 may be provided by a display device having a display as shown in FIGS. 22A and 22B. In the display 158 of FIG. 22A in which five indicators 160, 162, 164, 166, 168 are provided, the four indicators 160, 162, 164, 166 are positioned in respective positions corresponding to front right and left wheels and rear right and left wheels of a vehicle illustrated on the display 158, while the indicator 168 indicating the spare tire is positioned in a rear portion of the illustrated vehicle. In the display 169 of FIG. 22B. in which five indicators 170, 172, 174, 176, 178 are provided, the four indicators 170, 172, 174, 176 are positioned in respective positions corresponding to four mounted tires of a vehicle illustrated on the display 169, while the indicator 178 indicating the spare tire is positioned in a central portion of the illustrated vehicle. In this ninth embodiment illustrated in FIGS. 22A and 22B, when the air pressure of the spare tire 12 is lower than the predetermined minimum value, an operational state of the indicator 168 or 178 is switched. When the air pressure of one of the mounted tires 10 is lower than the predetermined minimum value, operational states of the indicators 160–166 or 170–176 are all switched. In this instance, however, if the position of the mounted tire 10 having the low air pressure is detectable (for example, if the identification data of each tire is representative of the position of the corresponding mounted tire 10), it is possible to switch an operational state of one of the indicators positioned in the mounted tire 10 in question, so that the vehicle operator can be informed of which one of the four mounted tires 10 currently suffers from the low air pressure. Further, the indicators 160–168 or 170–178 may be adapted to numerically indicate values of the air pressures of the tires 10, 12.

FIGS. 23A and 23B show other arrangements of the warning device 72. In the arrangement of FIG. 23A, an indicator 180 is provided to indicate a number of the tire or tires each having an air pressure lower than the minimum value, or indicate a value of the air pressure lower than the minimum value. In the arrangement of FIG. 23B, five lamps 182, 183, 184, 185, 186 are provided such that the same number of lamps as the tires suffering from the low air pressure are turned ON. In this tenth embodiment illustrated in FIGS. 22A and 22B, the arrangements may be modified as needed. For example, the arrangement of FIG. 23A may be modified such that the value of the low air pressure is not indicated if the tire having the low air pressure is the spare tire 12. The arrangement of FIG. 23B may be modified such that the lamp 182 is turned ON when the air pressure of the spare tire 12 is low and such that one of the lamps 183-186 is turned ON when the air pressure of the corresponding mounted tire 10 is low.

FIGS. 24A–24D shows still another arrangement of the warning device 72. In this eleventh embodiment of the invention, a single lamp 190 is provided to be activated according to one of various patterns that is selected depending upon the states of the tires 10, 12. For example, the lamp 190 is turned ON, as shown in FIG. 24B, when the air pressure of the spare tire 12 is low. The lamp 190 is flashed, as shown in FIG. 24C or 24D, when the air pressure of the mounted tire 10 is low. The arrangement may be modified such that the lamp 190 is turned ON in an intermittent manner when the air pressure of one of the tires 10, 12 is low while the lamp 190 is held ON in a continuous manner when the number of the tires 10, 12 having the low air pressures is two. Further, it is possible to inform the vehicle operator of various states of the tires, by changing the length of time for which the lamp is held ON or OFF.

Figure 31:
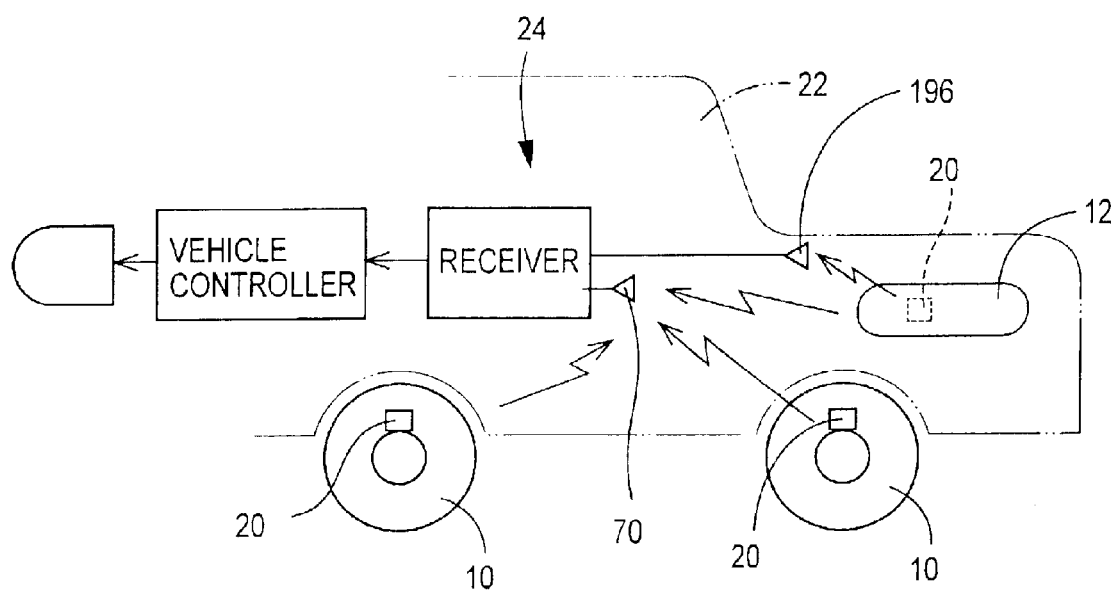
FIG. 31 is a modified arrangement of a receiver in which two receiving antennas are provided.

While the receiver 78 is provided with the single receiving antenna 70 in the above-described embodiments, the receiver 78 may be provided with two or more receiving antennas. FIG. 31 shows an arrangement in which the receiver 78 includes, in addition to the receiving antenna 70 as a first receiving antenna, a second receiving antenna 196. The first receiving antenna 70 serves to receive the tire data sets 50 transmitted from the transmitters 38 provided in the respective mounted tires 10, while the second receiving antenna 196 serves to receive exclusively the tire data set 50 transmitted from the transmitter 38 provided in the spare tire 12. In this arrangement, the tire data set 50 received by the second receiving antenna 196 can be determined to be originated from the spare tire 12. It is noted that the second receiving antenna 196 may be referred to as a non-mounted-tire-information receiving antenna.

Figure 25A:
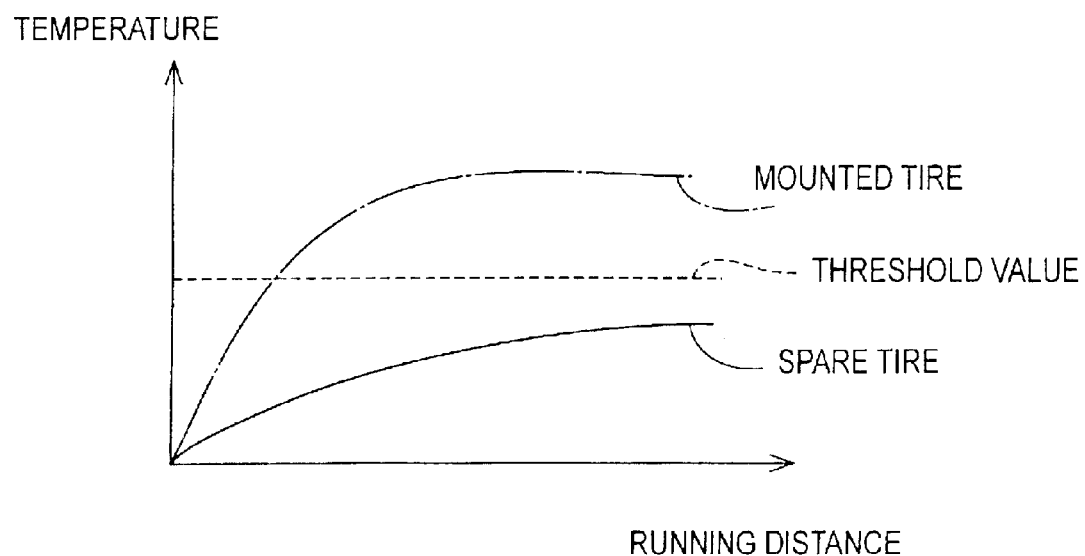
FIGS. 25A and 25B are graphs indicating a relationship between a tire temperature and a running distance of a vehicle equipped with a tire information processing apparatus which is constructed according to a twelfth embodiment of this invention.
Figure 25B:
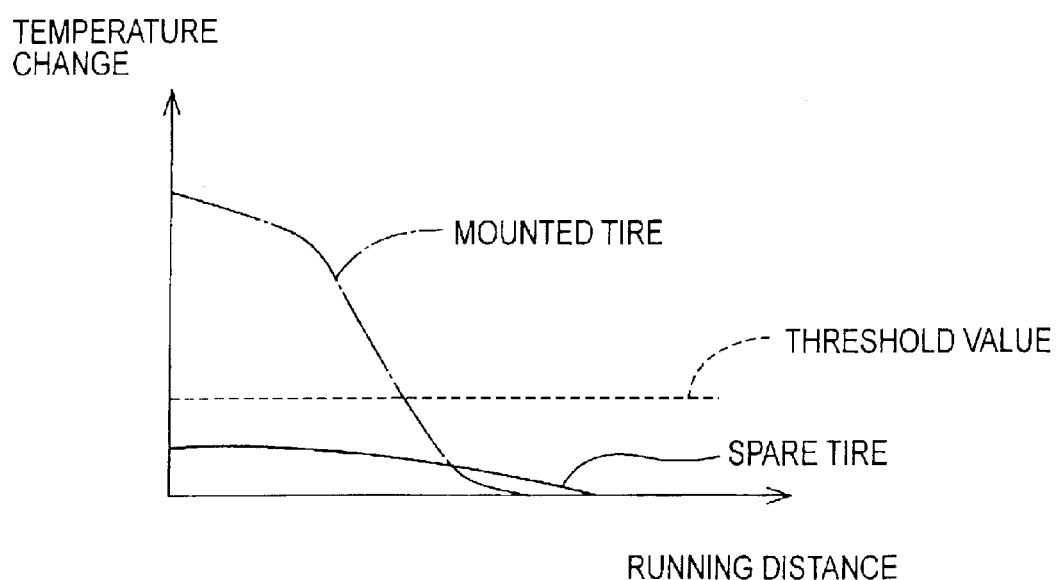

The threshold amount or value (as to the temperature change, temperature, applied force, shape of the tire, for example), according to which the tire data sets 50 are divided into the tire data sets 50 of the mounted tires 10 and the tire data set 50 of the non-mounted tire 12, may be determined during an actual running of the vehicle. Although the threshold value may be a theoretical value determined in a stage of designing or production of the vehicle as described above, it is preferable that the threshold value is determined during an actual running of the vehicle, because the tire state varies depending upon a running state or environment during the actual running of the vehicle. As shown in FIGS. 25A and 25B, it is possible to determine the threshold value, on the basis of the tire-state-related values representative of the states of the tires during an actual running of the vehicle, wherein the identification data of each of the tires 10, 12 is stored in the data storage, prior to the determination of the threshold value. In this instance, the determination of the threshold value is made when the running distance has reached a predetermined value, namely, when the state of each mounted tire 10 and the state of the non-mounted tire 12 are clearly differentiated from each other, or when the identification of the non-mounted tire is made with satisfaction of the above-described spare-tire identification enabling condition.

Figure 26:
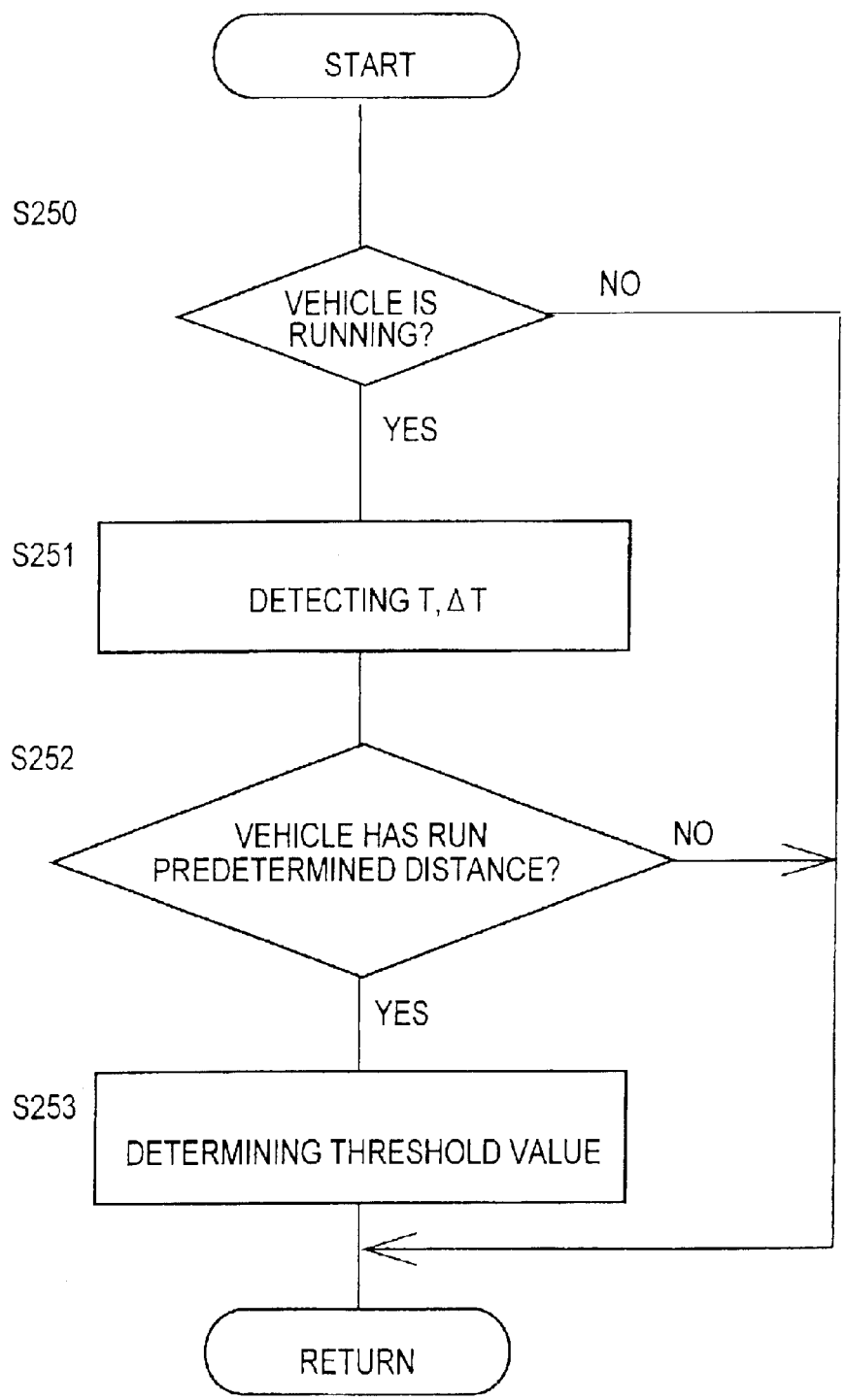
FIG. 26 is a flow chart illustrating a threshold-value determining routine according to a control program stored in a tire information processing apparatus of the twelfth embodiment of the invention.

A threshold-value determining routine illustrated by the flow chart of FIG. 26 is executed when a running of a manufactured vehicle is initiated. This routine is initiated with step S250 to determine whether the vehicle is currently running or not. If an affirmative decision is obtained in step S250, step S251 is implemented to detect the temperature T and the temperature change amount $\Delta T$, and step S252 is then implemented to determine whether the vehicle has run at least a predetermined distance. While the running distance is smaller than the predetermined distance, step S252 is repeated to repeatedly detect the temperature T and the change amount $\Delta T$. After the running distance has reached the predetermined distance, step S253 is implemented to determine the threshold value on the basis of the detected values of the temperature T and the change amount $\Delta T$. The spare tire 12 is identified based on the thus determined threshold value. For example, the above-described threshold value $\Delta Ts$ (used in step S53 of the spare-tire identification routine of FIG. 5) can be determined in this threshold-value determining routine, so that the spare tire 12 is identified based on the determined threshold value $\Delta Ts$ in the routine of FIG. 5. The thus determined threshold value makes it possible to further improve the reliability of the distinction of the spare tire 12 from the mounted tires 10. In this twelfth embodiment, a threshold-value determining portion is constituted by portions of the receiving controller 74 which are assigned to store and execute the threshold-value determining routine program, while a threshold-basis non-mounted-tire information sorting portion is constituted by a portion of the receiving controller 74 which is assigned to identify the spare tire 12 on the basis of the determined threshold value. It is also possible to consider that the threshold-basis non-mounted-tire information sorting portion is constituted by portions of the receiving controller 74 which are assigned to store and execute the spare-tire identification routine program of FIG. 5, where the threshold value $\Delta Ts$ (used in step S53) is determined by the threshold-value determining portion.

The threshold value may be determined or modified each time the ignition switch 76 is switched from its OFF state to ON state, each time a predetermined period of time (e.g. one or, two months) has passed, each time a predetermined number of times the vehicle has run, or each time a predetermined distance the vehicle has run. In the above-described embodiments, the threshold value is determined when the running distance (measured from a point of time of the initiation of the running) has reached the predetermined distance. However, the determination of the threshold value may be made when the running time (measured from the point of time of the initiation of the running) has reached the predetermined length of time. In either of these arrangements, the threshold value is determined in a state suitable for the separation of the non-mounted tire 12 from the mounted tires 10, for example, when an accumulative amount of load applied to each tire reaches a predetermined amount. Further, the pre-storing of the identification data of each tire is not essential. After detecting the tire-state-related value (such as the tire temperature and temperature change) of each tire, it is possible to determine, as the threshold value, a value that is located between the tire-state-related value of one tire and the tire-state-related values of four tires. It is noted that the threshold values of the other tire-state-related values (such as the applied force, vibration and shape of the tire) may be determined in the same manner as the determination of the threshold value of the tire temperature or temperature change.

There will be described a control operation of the vehicle controller 80. In response to an air-pressure-data requesting signal outputted by the vehicle controller 80 to the receiving controller 74, the receiving controller 74 outputs the air pressure data representative of the air pressure of each mounted tire 10, to the vehicle controller 80, which in turn controls the actuator 82 on the basis of the air pressure data. Since the receiving controller 74 does not output the air pressure data of the spare tire 12, the vehicle controller 80 does not control the running state of the vehicle on the basis of the air pressure of the spare tire 12.

As a kind of vehicle control executed based on the tire state in the form of the air pressure, there are a control of a suspension device, a control of a steering device, a control of a braking device, a control of a driving device and a control of a power transmitting device, for example. In these controls, the air pressure data is used as primary input data in some cases, and is used as ancillary input data in the other cases. Where the air pressure data is used as primary input data, a target value is determined directly based on the air pressure. Where the air pressure data is used as ancillary input data, a target value is determined based on primary input data representative of a running state of the vehicle. In the latter case, the air pressure data as the ancillary input data is used to modify the determined target value, a threshold value for initiation of a control and/or a rule of the control. That is, the determined target value, the threshold value for the control initiation and/or the control rule are modified based on the air pressure data.

As a kind of vehicle control in which the air pressure data is used as the primary input data, there are, for example, a suspension control for strengthen damping characteristics of a shock absorber of a suspension device when the air pressure is lower than a predetermined value, and a rear-wheel steering-angle control for controlling a steering angle of rear wheels so as to minimizing a yaw moment caused by a difference between the air pressures of the right and left wheels. On the other hand, as a kind of vehicle control in which the air pressure data is used as the ancillary input data, there is, for example, a vehicle stability control for controlling a braking force applied to each wheel so as to alleviate an oversteering or understeering tendency of the vehicle when the tendency is heavy during cornering of the vehicle. The air pressure data is used for modifying a threshold value or condition required for initiating such a vehicle stability control in such a manner that permits the control to be initiated more easily where the air pressure is relatively low, than where the air pressure is relatively high, for thereby reducing a force applied to the tire during the control.

Where it is not possible to determine a position of the tire suffering from the low air pressure, namely, where the tire having the low air pressure can not be identified among the four mounted tires, the vehicle control may be executed on the assumption that the air pressures of all the mounted tires are low. Further, for example, the vehicle controller 80 may be adapted to be capable of determining, on the basis of a running state and a fact that there is one tire having a low air pressure, a position of the tire having the low air pressure, so that the vehicle control can be executed depending upon the assumed position of the tire having the low air pressure. There will be briefly described the vehicle control executed based on the air pressure as the tire state.

The vehicle controller 80 and the actuator 82 may be respectively provided by, for example, a braking force controller and a braking-force controlling actuator cooperating with each other to control braking forces applied to the tires independently of each other. Each of the braking-force controlling actuators may be provided by a pressing-force controlling actuator capable of controlling a pressing force with which a frictional engagement member is forced against a rotor rotating together with the tire. The pressing-force controlling actuator may include a hydraulic-pressure controlling valve capable of controlling a pressure of a working fluid supplied to a hydraulically-operated braking device in which the frictional engagement member is forced by the pressurized working fluid, or alternatively, may include a driver circuit capable of controlling an amount of an electric current supplied to an electric motor of an electrically-operated braking device in which the frictional engagement member is forced by activation of the electric motor.

In the control of the braking device in which the pressing force is controlled in such a manner that permits a slip ratio of each wheel to be close to a target slip ratio that is determined based on an operating state of a brake operating member, the target slip ratio is set to be lower where the air pressure of the corresponding tire is relatively low, than where the air pressure is relatively high. This arrangement makes it possible to minimize a yaw moment caused by a difference between the air pressures of the respective tires. In this arrangement, where the tire having the low air pressure can not be identified among the four mounted tires, the target slip ratios of all the mounted tires may be reduced. It is noted that the vehicle state detector 83 may include an operating-state detecting device for detecting the operating state of the brake operating member in this arrangement.

In the vehicle stability control in which a spinning or drift-out tendency is minimized when a turning state of the vehicle actually exceeds a critical state, a threshold value required for initiating the control is set to be smaller where at least one of the tires has a low air pressure, than where none of the tires has a low air pressure. Thus, the control is initiated in an earlier stage where at least one of the tires has a low air pressure, than where none of the tires has a low air pressure, for thereby making it possible to reduce a load applied to each tire during execution of the control. The vehicle state detector 83 may include a yaw rate sensor, a lateral acceleration sensor, a steering-wheel angle sensor and/or a steering angle sensor, so that a turning direction of the vehicle is also detectable.

Further, the vehicle controller 80 and the actuator 82 may be respectively provided by, for example, a rear-wheel steering-angle controller and a rear-wheel steering-angle control actuator cooperating with each other to control a steering angle of rear wheels. The rear wheel may be steered by either of an electric motor or a hydraulic pressure. The steering angle of the rear wheels is controlled in such a manner that minimizes a yaw moment caused by a difference between air pressures of the tires. For example, where there arises a difference between the air pressures of the right and left driving wheels during driving of the vehicle, the pressure difference tends to induce a yaw moment that causes the vehicle to turn such that one of the driving wheels which has a lower air pressure is located on the outer side of the turning path. Where there arises a difference between the air pressures of the right and left driven wheels, the pressure difference tends to induce a yaw moment that causes the vehicle to turn such that one of the driven wheels which has a lower air pressure is located on the inner side of the turning path. In the rear-wheel steering-angle control, the rear wheels are steered in such a direction that reduces the yaw moment, by an amount larger where the induced yaw moment is relatively large than where the induced yaw moment is relatively small, namely, by an amount larger where the above-described air pressure difference is relatively large than where the air pressure difference is relatively small.

There is a case where the vehicle is forced to be turned in spite of a steering wheel of the vehicle being kept in its neutral position. If such a case takes place where it is detected that the air pressure of at least one of the mounted wheels is low, it is possible to determine that a yaw moment is induced due to the low air pressure of the mounted tire or tires. The vehicle state detector 83 may include a yaw rate sensor, a lateral acceleration sensor, a steering-wheel angle sensor and/or a steering angle sensor. The vehicle controller 80 receives information representative of the operating state of the driving device. Further, in the control of the rear steering device for establishing the steering angle of the rear wheels which is determined based on the operating amount of the steering wheel and the running speed of the vehicle, the rear wheels are steered at a lower rate where the air pressures of the rear wheels are relatively low, than where the air pressures are relatively high. This is because it is not preferable to abruptly apply a large load to a tire having a low air pressure. Where it is not possible to determine whether the tire having the low air pressure is the rear wheel or not, it is possible to reduce the steering speed, irrespective of whether the tire in question is really the rear wheel or not.

Further, the vehicle controller 80 and the actuator 82 may be respectively provided by, for example, an aiding-force controller and an aiding-force control actuator cooperating with each other to control an aiding force to be generated by a steering-force aiding device (a power steering device) for aiding a steering force applied to the steering member of the vehicle. The power steering device may be adapted to generate the aiding force by means of either an electric motor or a hydraulic pressure. Where the steered wheels are provided by the driven wheels, a difference between the air pressures of the right and left driven wheels tends to induce a yaw moment forcing the vehicle to be turned in a direction toward one of the driven wheels which has a lower air pressure, namely, in such a direction that positions the wheel having the lower air pressure on the inner side of the turning path. Therefore, if the vehicle operator intends to turn the vehicle in a direction toward the other driven wheel having a higher air pressure, the aiding force is increased. If the vehicle is intended to be turned in the direction toward the driven wheel having the lower air pressure, the aiding force is reduced. It is possible to detect, on the basis of the steering angle of the steering wheel, the turning direction intended by the vehicle operator.

Further, the vehicle controller 80 and the actuator 82 may be respectively provided by, for example, a suspension controller and a suspension control actuator (e.g., a device for adjusting damping characteristics of each shock absorber of the vehicle), for thereby making it possible to strengthen the damping characteristics (i.e., increasing a roll stiffness) of the shock absorber provided in the tire having a low air pressure. This arrangement serves to prevent deterioration of a ride comfortability which would be caused by the reduction of the air pressure of the tire, and to provide the shock absorber with a suitable degree of roll stiffness. The position of the tire having the low air pressure can be estimated based on the vehicle state, as described above. Where the level of the vehicle body is lowered due to the pressure reduction of the tire, it is possible to activate a vehicle-level adjusting device to heighten the level of the vehicle body.

Further, the vehicle controller 80 and the actuator 82 may be respectively provided by, for example, a drive controller and a drive control actuator cooperating with each other to control a driving torque to be generated by the driving device, or may be respectively provided by, for example, a transmission controller and a transmission control actuator cooperating with each other to control the driving torque to be transmitted by the power transmitting device. Where the air pressure of the driving wheel is low, this arrangement serves to prevent an abrupt increase of the driving torque supplied to the driving wheel having the low air pressure. The driving torque supplied to the wheel having the low air pressure may be prevented from being abruptly increased, even where it is not possible to determine whether the tire having the low air pressure is provided by the driving wheel or not.

Figure 27:
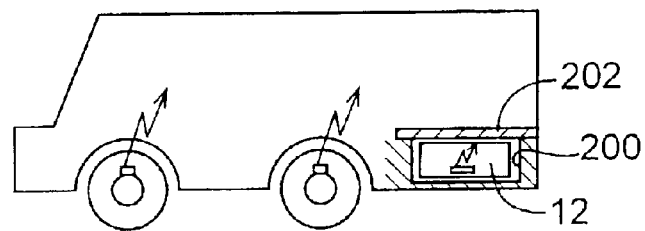
FIG. 27 is a view an arrangement in which a spare tire is carried by a vehicle equipped with a tire information processing apparatus constructed according to a thirteenth embodiment of this invention.

The spare tire 12, which is carried by the vehicle, may be covered with a shielding member, so that the tire data set transmitted from the spare tire 12 is not received by the receiver 78, namely, so that the tire data set of the spare tire 12 is not processed in the receiving controller 74. FIG. 27 shows a thirteenth embodiment of the invention in which the spare tire 12 is accommodated in a recess 200 formed in a luggage space of the vehicle body. An opening of the recess 200 is covered with a cover plate 202. Inner and bottom walls and the cover plate 202 are made of an electromagnetic-wave shielding material. For example, the cover plate 202 may be provided by a non-conductive base member which is made of a resin or other material and which contains a conductive material, or may be provided by a conductive base member. This shielding arrangement is effective to inhibit an electromagnetic wave (emitted from the transmitter 38 provided in the spare tire 12) from being radiated outwardly of the recess 200, thereby advantageously eliminating necessity of executing the routine program for distinguishing the tire data set of the non-mounted tire 12 from those of the mounted tires 10. In this embodiment, it can be determined that all the tire data sets have been successfully received by the receiver 78, where the same number of tire data sets as the number of the mounted tires 10 have been received by the receiver 78. It is noted that an information-reception inhibitor as the non-mounted-tire information separator is principally constituted by the recess 200 and the cover plate 202.

Figure 30:
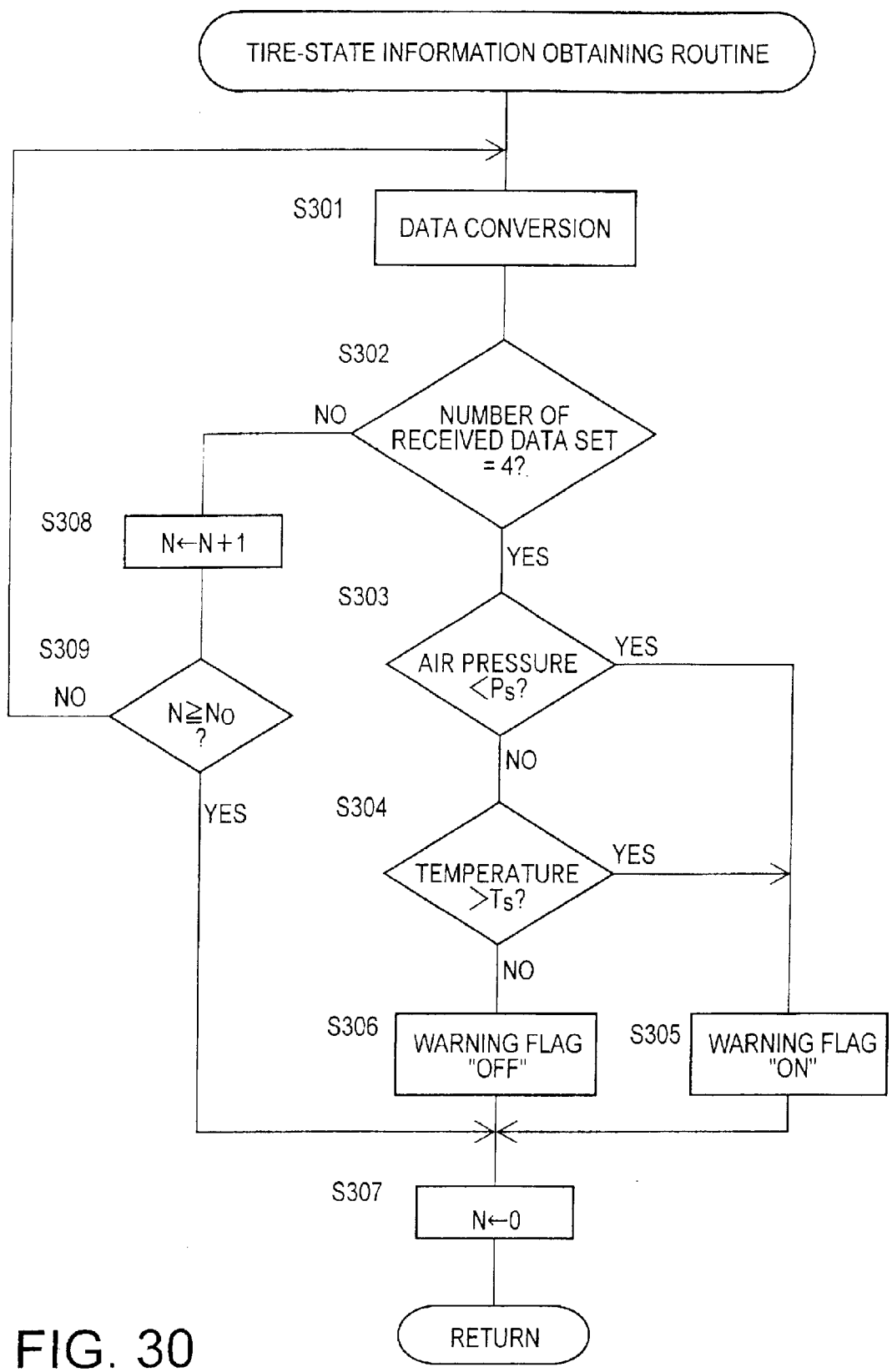
FIG. 30 is a flow chart illustrating a tire-state information obtaining apparatus routine according to a control program stored in the tire information processing apparatus of the thirteenth embodiment of the invention.

In the present embodiment, a tire-state information obtaining routine illustrated by the flow chart of FIG. 30 is executed. In this routine, step S302 is implemented to determine whether the number of the received tire data sets coincides with a predetermined number, i.e., four or not. If an affirmative decision is obtained in step S302, it is determined whether the air pressure represented by each tire data set is lower than the predetermined minimum value Ps in step S303, and then determined whether the tire temperature represented by each tire data set is larger than the predetermined maximum value Ts in step S304. If either one of the air pressure and the tire temperature is determined to be abnormal, step S305 is implemented to set the warning flag to ON. If both of the air pressure and the tire temperature are determined to be normal, step S306 is implemented to reset the warning flag to OFF. Step S307 is then implemented to reset the trial-number counter to "0".

If the number of the received tire data sets is smaller than four, a negative decision is obtained in step S302, whereby the count of the trial-number counter is incremented by "one" in step S308, and it is then determined whether the count of the trial-number counter becomes equal to or larger than a predetermined number in step S309. If the count of the trial-number counter is still smaller than the predetermined number, the control flow returns to step S301. When the count of the trial-number counter becomes equal to the predetermined number, the count of the trial-number counted is reset to "zero", without switching the ON state or OFF state of the warning flag to the other state. It is noted that steps S302, S308 and S309 are not essential, because there is no possibility of the tire data set of the spare tire 12 is received in the present embodiment in which the above-described shielding arrangement is provided. That is, since each of the tire data set obtained by the receiving controller 74 is necessarily the tire data set of one of the mounted tires 10, the warning flag may be set to ON or reset to OFF only depending on the air pressure and the tire temperature, without the determination as to whether the received data sets equals to the predetermined number.

Figure 28:
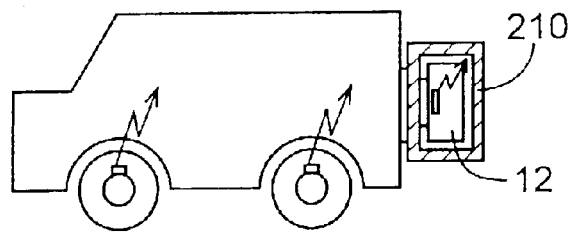
FIG. 28 is a view an arrangement in which a spare tire is carried by another vehicle equipped with the tire information processing apparatus of the thirteenth embodiment of the invention.
Figure 29:
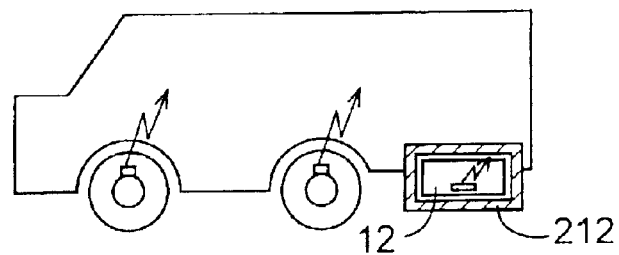
FIG. 29 is a view an arrangement in which a spare tire is carried by still another vehicle equipped with the tire information processing apparatus of the thirteenth embodiment of the invention.

FIGS. 28 and 29 illustrate other arrangements of this thirteenth embodiment of the invention in which the spare tire 12 disposed in the rear or lower portion of the vehicle is covered by a shielding member 200 or 212. In either of these arrangements, the spare tire 12 may be fixed directly to the vehicle body, or indirectly to the vehicle body via a suitable attachment or the shielding member 200 or 212. Each of the shielding members 200, 212 may take the form of a vessel or a sheet. Where the shielding member is provided by the sheet, the shielding member may be constituted by a base member which is made of a cloth or other material and which is covered with a coating made of a conductive material, or may be constituted by a fiber which is woven to include a conductive material. Further, where the shielding member is provided by the sheet, the shielding member can cover the spare tire 12 fixed directly to the vehicle body, without having to remove the spare tire 12 from the vehicle body. It is noted that the shielding member does have to be adapted to substantially completely obstruct radiation of the electromagnetic wave emitted from the transmitter 38 of the spare tire 12, but may be adapted to damp the electromagnetic wave as long as the electromagnetic wave does not reach the receiving antenna 70.

In the embodiments described above, the air pressure sensor 30 is fixed to a portion of the wheel which portion faces an inlet valve of the tire. However, the air pressure sensor 30 may be built in the tire per se, disposed in an inner space of the tire, or provided in a bead portion, a sidewall portion or a tread portion of the tire.

The principle of the invention is applicable not only to the above-described routine programs such as the tire-information processing routine program and the spare-tire identification routine program but also to any other program routines in which the tire data set of the non-mounted tire 12 is separated from the tire data sets of the mounted tires 10 on the basis of the tire data sets. Further, the warning or informing device 72 is not essential. The vehicle control based on the air pressure of each tire is not essential. Still further, the invention is applicable not only to a standard vehicle but also to a large-sized vehicle such as a truck and a trailer. It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A vehicle tire information obtaining apparatus for obtaining tire information relating to a plurality of tires of a vehicle which include a mounted tire mounted on an axle of the vehicle and a non-mounted tire carried by the vehicle, said apparatus comprising:

tire state detectors which are provided in the respective tires and each of which detects a state of a corresponding one of said tires;

transmitters which are provided in the respective tires and which transmit tire data sets, as said tire information, each containing at least one tire-state data element representative of the detected state of a corresponding one of said tires;

a receiver which is provided in a body of the vehicle and which receives said tire data sets transmitted by said transmitters; and a non-mounted-tire information separator which separates one of said tire data sets that has been transmitted from said non-mounted tire, from one of said tire data sets that has been transmitted from said mounted tire, wherein said at least one tire-state data element, which represents the detected state of the corresponding one of said tires, includes at least one of a temperature data representative of a temperature of the corresponding tire, an air pressure data representative of an air pressure of said corresponding tire, a shape data representative of a shape of said corresponding tire, an applied-force data representative of a force applied to said corresponding tire, and a motion data representative of a motion of said corresponding tire, and wherein said non-mounted-tire information separator includes a tire-state-basis determining portion which automatically determines whether each of said tire data sets received by said receiver has been transmitted from said non-mounted tire or not, on the basis of said at least one tire-state data element which is contained in said each of said tire data sets.

2. A vehicle tire information obtaining apparatus according to claim 1, wherein said at least one tire-state data element includes said temperature data, and wherein said tire-state-basis determining portion of said non-mounted-tire information separator includes a tire-temperature-change-basis determining portion which determines whether each of said tire data sets received by said receiver has been transmitted from said non-mounted tire or not, on the basis of change of said temperature represented by said temperature data.

3. A vehicle tire information obtaining apparatus according to claim 1, wherein said at least one tire-state data element includes said temperature data, and wherein said tire-state-basis determining portion of said non-mounted-tire information separator includes a temperature-difference-basis determining portion which determines whether each of said tire data sets received by said receiver has been transmitted from said non-mounted tire or not, on the basis of a difference between an ambient temperature and said temperature represented by said temperature data.

4. A vehicle tire information obtaining apparatus according to claim 1, wherein said at least one tire-state data element includes said motion data, and wherein said tire-state-basis determining portion of said non-mounted-tire information separator includes a tire-motion-basis determining portion which determines whether each of said tire data sets received by said receiver has been transmitted from said non-mounted tire or not, on the basis of said motion represented by said motion data.

5. A vehicle tire information obtaining apparatus according to claim 1, wherein said tire-state-basis determining portion of said non-mounted-tire information separator includes a running-state-basis determining portion which determines whether each of said tire data sets received by said receiver has been transmitted from said non-mounted tire or not, on the basis of said at least one tire-state data element during running of the vehicle.

6. A vehicle tire information obtaining apparatus according to claim 1, wherein said tire-state-basis determining portion of said non-mounted-tire information separator includes a tire-state-change-basis determining portion which determines whether each of said tire data sets received by said receiver has been transmitted from said non-mounted tire or not, on the basis of said at least one tire-state data element upon initiation of running of the vehicle and said at least one tire-state data element during running of the vehicle.

7. A vehicle tire information obtaining apparatus according to claim 1, wherein said at least one tire-state data element includes said temperature data, and wherein said tire-state-basis determining portion of said non-mounted-tire information separator includes a temperature-difference-basis determining portion which determines whether each of said tire data sets received by said receiver has been transmitted from said non-mounted tire or not, on the basis of a difference among temperatures of said plurality of tires each of which is represented by said temperature data upon initiation of running of the vehicle, and also said temperatures during running of the vehicle.

8. A vehicle tire information obtaining apparatus according to claim 1, wherein said at least one tire-state data element includes said temperature data, and wherein said tire-state-basis determining portion of said non-mounted-tire information separator includes a temperature-difference-basis determining portion which determines whether each of said tire data sets received by said receiver has been transmitted from said non-mounted tire or not, on the basis of a difference between an ambient temperature and said temperature represented by said temperature data upon initiation of running of the vehicle, and also at least one of said temperature represented by said temperature data during running of the vehicle and change of said temperature represented by said temperature data during running of the vehicle.

9. A vehicle tire information obtaining apparatus for obtaining tire information relating to a plurality of tires of a vehicle which include a mounted tire mounted on an axle of the vehicle and a non-mounted tire carried by the vehicle, said apparatus comprising:

tire state detectors which are provided in the respective tires and each of which detects a state of a corresponding one of said tires;

transmitters which are provided in the respective tires and which transmit tire data sets, as said tire information, each containing at least one tire-state data element representative of the detected state of a corresponding one of said tires;

a receiver which is provided in a body of the vehicle and which receives said tire data sets transmitted by said transmitters; and a non-mounted-tire information separator which separates one of said tire data sets that has been transmitted from said non-mounted tire, from one of said tire data sets that has been transmitted from said mounted tire, wherein said non-mounted-tire information separator includes a non-mounted-tire information determining portion which automatically determines whether each of said tire data sets received by said receiver has been transmitted from said non-mounted tire or not, wherein said non-mounted-tire information determining portion includes a number-basis checking portion which checks determination as to whether each of said tire data sets has been transmitted from said non-mounted tire, by seeing if a number of said tire data sets determined to have been transmitted from said non-mounted tire is not larger than a predetermined number.

10. A vehicle tire information obtaining apparatus for obtaining tire information relating to a plurality of tires of a vehicle which include a mounted tire mounted on an axle of the vehicle and a non-mounted tire carried by the vehicle, said apparatus comprising:

tire state detectors which are provided in the respective tires and each of which detects a state of a corresponding one of said tires;

transmitters which are provided in the respective tires and which transmit tire data sets, as said tire information, each containing at least one tire-state data element representative of the detected state of a corresponding one of said tires;

a receiver which is provided in a body of the vehicle and which receives said tire data sets transmitted by said transmitters; and a non-mounted-tire information separator which separates one of said tire data sets that has been transmitted from said non-mounted tire, from one of said tire data sets that has been transmitted from said mounted tire, wherein said non-mounted-tire information separator includes a non-mounted-tire information determining portion which automatically determines whether each of said tire data sets received by said receiver has been transmitted from said non-mounted tire or not, on the basis of difference in said at least one tire-state data element which is contained in said each of said tire data sets;

wherein each of said tire data sets includes an identification data which identifies a corresponding one of said plurality of tires, wherein said non-mounted-tire information determining portion includes a non-mounted-tire identification data obtaining portion which is activated to obtain a content represented by said identification data of said non-mounted tire, and wherein said non-mounted-tire identification data obtaining portion is activated each time a predetermined condition is satisfied.

11. A vehicle tire information obtaining apparatus according to claim 10, wherein said non-mounted-tire information separator separates said one of said tire data sets transmitted from said non-mounted tire on the basis of the content represented by said identification data of said non-mounted tire that has been obtained as a result of last satisfaction of said predetermined condition, during a period of time after a first moment at which said predetermined condition is newly satisfied and before a second moment at which the content represented by said identification data of said non-mounted tire is newly obtained, and wherein said non-mounted-tire information separator separates said one of said tire data sets transmitted from said non-mounted tire on the basis of the content represented by said identification data of said non-mounted tire that is newly obtained as a result of new satisfaction of said predetermined condition, after said second moment.

12. A vehicle tire information obtaining apparatus according to claim 10, wherein said non-mounted-tire information separator does not separate said one of said tire data sets transmitted from said non-mounted tire, during a period of time after a first moment at which said predetermined condition is newly satisfied and before a second moment at which the content represented by said identification data of said non-mounted tire is newly obtained, and wherein said non-mounted-tire information separator separates said one of said tire data sets transmitted from said non-mounted tire on the basis of the content represented by said identification data of said non-mounted tire that is newly obtained as a result of new satisfaction of said predetermined condition, after said second moment.

13. A vehicle tire information obtaining apparatus for obtaining tire information relating to a plurality of tires of a vehicle which include a mounted tire mounted on an axle of the vehicle and a non-mounted tire carried by the vehicle, said apparatus comprising:

tire state detectors which are provided in the respective tires and each of which detects a state of a corresponding one of said tires;

transmitters which are provided in the respective tires and which transmit tire data sets, as said tire information, each containing at least one quantitative data element which represents the detected state of a corresponding one of said tires by a tire-state-related value;

a receiver which is provided in a body of the vehicle and which receives said tire data sets transmitted by said transmitters; and a non-mounted-tire information separator which separates one of said tire data sets that has been transmitted from said non-mounted tire, from one of said tire data sets that has been transmitted from said mounted tire, wherein said non-mounted-tire information separator includes a tire information sorter which sorts said tire data sets received by said receiver, by comparing said tire-state-related value of said quantitative data element of each of said tire data sets, with a predetermined threshold value, such that said one of said tire data sets transmitted from said non-mounted tire is sorted out from said one of said tire data sets transmitted from said mounted tire.

14. A vehicle tire information obtaining apparatus according to claim 13, wherein said tire information sorter includes a threshold-value determining portion which determines said threshold value, on the basis of said tire-state-related value indicated by said quantitative data element of each of said tire data set when a running state of the vehicle satisfies a predetermined condition.

15. A vehicle tire information obtaining apparatus according to claim 1, comprising a non-mounted-tire information ignorer which ignores said one of said tire data sets transmitted from said non-mounted tire.

16. A vehicle tire information obtaining apparatus according to claim 1, comprising a data processor which processes said one of said tire data sets transmitted from said mounted tire and which does not process said one of said tire data sets transmitted from said non-mounted tire.

17. A vehicle tire information obtaining apparatus according to claim 1, comprising a data processor which processes said one of said tire data sets in a mounted-tire data processing manner and which processes said one of said tire data sets in a non-mounted-tire data processing manner that is different from said mounted-tire data processing manner.

18. A vehicle tire information obtaining apparatus according to claim 1, wherein each of said tire data sets includes an identification data which identifies a corresponding one of said plurality of tires, said vehicle tire information obtaining apparatus comprising a non-mounted-tire identification data storage which distinguishes the tire data set transmitted from said non-mounted tire, from the tire data set transmitted from said mounted tire, and which stores the identification data included in said tire data set transmitted from said non-mounted tire.

19. A vehicle tire information obtaining apparatus for obtaining tire information relating to a plurality of tires of a vehicle which include a mounted tire mounted on an axle of the vehicle and a non-mounted tire carried by the vehicle, said apparatus comprising:

tire state detectors which are provided in the respective tires and each of which detects a state of a corresponding one of said tires;

transmitters which are provided in the respective tires and which transmit tire data sets, as said tire information, each containing at least one tire-state data element representative of the detected state of a corresponding one of said tires;

a receiver which is provided in a body of the vehicle and which receives said tire data sets transmitted by said transmitters; and a non-mounted-tire information separator which separates one of said tire data sets that has been transmitted from said non-mounted tire, from one of said tire data sets that has been transmitted from said mounted tire, wherein said non-mounted-tire information separator includes a communication inhibitor which inhibits a communication between said receiver and one of said transmitters provided in said non-mounted tire.

20. A vehicle tire information obtaining apparatus according to claim 19, wherein said communication inhibitor includes an information-reception disabling portion which disables a signal from said one of said transmitters provided in said non-mounted tire, from being received by said receiver.

21. A vehicle tire information obtaining apparatus according to claim 19, wherein said information-reception inhibitor includes a shielding member which blocks transmission of a signal from said one of said transmitters provided in said non-mounted tire, to said receiver.

22. A vehicle tire information processing apparatus for processing tire information relating to a plurality of tires of a vehicle which include a mounted tire mounted on an axle of the vehicle and a non-mounted tire earned by the vehicle, said apparatus comprising:

tire state detectors which are provided in the respective tires and each of which detects a state of a corresponding one of said tires;

transmitters which are provided in the respective tires and which transmit tire data sets, as said tire information, each containing at least one tire-state data element representative of the detected state of a corresponding one of said tires;

a receiver which is provided in a body of the vehicle and which receives said tire data sets transmitted by said transmitters; and a mounted-tire-state-data processor which processes the tire-state data element transmitted from said mounted tire, and which does not process the tire-state data element transmitted from said non-mounted tire, wherein said at least one tire-state data element, which represents the detected state of the corresponding one of said tires, includes an air pressure data representative of an air pressure of said corresponding tire, and wherein said mounted-tire-state-data processor includes a data output controlling portion which does not output the air pressure data included in the tire-state data element transmitted from said non-mounted tire, to an external device which is provided outside said vehicle tire information processing apparatus and which controls the vehicle on the basis of the air pressure data, said data output controlling portion outputting the air pressure data included in the tire-state data element transmitted from said mounted tire, to said external device.

23. A vehicle tire information processing apparatus for processing tire information relating to a plurality of tires of a vehicle which include a mounted tire mounted on an axle of the vehicle and a non-mounted tire carried by the vehicle, said apparatus comprising:

tire state detectors which are provided in the respective tires and each of which detects a state of a corresponding one of said tires;

transmitters which are provided in the respective tires and which transmit tire data sets, as said tire information, each containing at least one tire-state data element representative of the detected state of a corresponding one of said tires;

a receiver which is provided in a body of the vehicle and which receives said tire data sets transmitted by said transmitters; and a mounted-tire-state-data processor which processes the tire-state data element transmitted from said mounted tire, and which does not process the tire-state data element transmitted from said non-mounted tire, wherein said at least one tire-state data element, which represents the detected state of the corresponding one of said tires, includes an air pressure data representative of an air pressure of said corresponding tire, and wherein said mounted-tire-state-data processor includes:

an air-pressure abnormality determining portion which effects a determination as to whether the air pressure of each of said tires is lower than a predetermined minimum value or not; and an informing device which informs a vehicle operator of a tire-air-pressure abnormality when an affirmative decision in said determination is obtained on the basis of the air pressure data included in the tire-state data element transmitted from said mounted tire, and which does not inform the vehicle operator of the tire-air-pressure abnormality when the affirmative decision in said determination is obtained on the basis of the air pressure data included in the tire-state data element transmitted from said non-mounted tire.

24. A vehicle tire information processing apparatus according to claim 23, wherein said informing device includes:

an indicator which is activated to indicate the tire-air-pressure abnormality; and an indicator controlling portion which activates said indicator when the affirmative decision in said determination is obtained on the basis of the air pressure data included in the tire-state data element transmitted from said mounted tire, and which does not activate said indicator when the affirmative decision in said determination is obtained on the basis of the air pressure data included in the tire-state data element transmitted from said non-mounted tire.

25. A vehicle tire information processing apparatus for processing tire information relating to a plurality of tires of a vehicle which include a mounted tire mounted on an axle of the vehicle and a non-mounted tire carried by the vehicle, said apparatus comprising:

tire state detectors which are provided in the respective tires and each of which detects a state of a corresponding one of said tires;

transmitters which are provided in the respective tires and which transmit tire data sets, as said tire information, each containing at least one tire-state data element representative of the detected state of a corresponding one of said tires;

a receiver which is provided in a body of the vehicle and which receives said tire data sets transmitted by said transmitters;

a non-mounted-tire information determining portion which determines whether each of said tire data sets received by said receiver has been transmitted from said non-mounted tire or not; and a data processor which processes said tire data sets in a predetermined first manner when one of said tire data sets can be determined to have been transmitted from said non-mounted tire, said data processor processing said tire data sets in a predetermined second maimer different from said predetermined first maimer when none of said tire data sets can be determined to have been transmitted from said non-mounted tire.

26. A vehicle tire information processing apparatus according to claim 25, wherein said data processor processes said tire data sets without taking account of whether each of said tire data sets has been transmitted from said mounted tire or said non-mounted tire, when none of said tire data sets can be determined to have been transmitted from said non-mounted tire, and wherein said data processor processes said tire data sets, by taking account of whether each of said tire data sets has been transmitted from said mounted tire or said non-mounted tire, when one of said tire data sets can be determined to have been transmitted from said non-mounted tire.

27. A vehicle tire information processing apparatus for processing tire information relating to a plurality of tires of a vehicle which include a mounted tire mounted on an axle of the vehicle and a non-mounted tire carried by the vehicle, said apparatus comprising:

tire state detectors which are provided in the respective tires and each of which detects a state of a corresponding one of said tires;

transmitters which are provided in the respective tires and which transmit tire data sets, as said tire information, each containing at least one tire-state data element representative of the detected state of a corresponding one of said tires;

a receiver which is provided in a body of the vehicle and which receives said tire data sets transmitted by said transmitters; and a pressure-data processor which processes an air pressure data included in said at least one tire-state data element, wherein said pressure-data processor includes:

an air-pressure abnormality determining portion which effects a determination as to whether an air pressure of each of said tires is lower than a predetermined minimum value or not; and an informing device which informs a vehicle operator of a result of said determination in one of different manners that is selected depending upon whether said result of said determination relates to said mounted tire or said non-mounted tire, wherein said informing device is provided by a sound emitter emitting a sound having at least one of loudness and melody which are changeable depending upon whether said result of said determination relates to said mounted tire or said non-mounted tire.

28. A vehicle tire information obtaining apparatus according to claim 13, wherein said tire information sorter includes a threshold-value determining portion which determines said threshold value during running of the vehicle.

29. A vehicle tire information obtaining apparatus according to claim 1, wherein said tire-state-basis determining portion of said non-mounted-tire information separator determines whether each of said tire data sets received by said receiver has been transmitted from said non-mounted tire or not, by taking account of an operating environment of each of said tires.

30. A vehicle tire information obtaining apparatus according to claim 5, further comprising:
- a running-state detector which detects a running state of the vehicle,
- wherein said running-state basis determining portion determines whether each of said tire data sets received by said receiver has been transmitted from said non-mounted tire or not, on the basis of said running state detected by said running-state detector, in addition to said at least one tire-state data element.

31. A vehicle tire information obtaining apparatus for obtaining tire information relating to a plurality of tires of a vehicle which include a mounted tire mounted on an axle of the vehicle and a non-mounted tire carried by the vehicle, said apparatus comprising:
- tire state detectors which are provided in the respective tires and each of which detects a state of a corresponding one of said tires;
- transmitters which are provided in the respective tires and which transmit tire data sets, as said tire information, each containing at least one tire-state data element representative of the detected state of a corresponding one of said tires;
- a receiver which is provided in a body of the vehicle and which receives said tire data sets transmitted by said transmitters; and
- a non-mounted-tire information separator which separates one of said tire data sets that has been transmitted from said non-mounted tire, from one of said tire data sets that has been transmitted from said mounted tire,
- wherein said receiver includes a mounted-tire-information receiving antenna which is capable of receiving said one of said tire data sets transmitted from one of said transmitters provided in said mounted tire,
- and wherein said receiver further includes a non-mounted-tire-information receiving antenna which is capable of receiving said one of said tire data sets transmitted from one of said transmitters provided in said non-mounted tire and which is not capable of receiving said one of said tire data sets transmitted from one of said transmitters provided in said mounted tire, so that said non-mounted-tire information separator separates said one of said tire data sets received by said non-mounted-tire-information receiving antenna, from said one of said tire data sets not received by said non-mounted-tire-information receiving antenna.

32. A vehicle tire information processing apparatus for processing tire information relating to a plurality of tires of a vehicle which include a mounted tire mounted on an axle of the vehicle and a non-mounted tire carried by the vehicle, said apparatus comprising:
- tire state detectors which are provided in the respective tires and each of which detects a state of a corresponding one of said tires;
- transmitters which are provided in the respective tires and which transmit tire data sets, as said tire information, each containing at least one tire-state data element representative of the detected state of a corresponding one of said tires;
- a receiver which is provided in a body of the vehicle and which receives said tire data sets transmitted by said transmitters;
- an abnormality determiner which effects a determination as to whether each of said tires is in an abnormal state, on the basis of the tire data sets received by said receiver; and
- an informing device which informs a vehicle operator of a tire abnormality when an affirmative decision in said determination is obtained on the basis of the tire-state data element transmitted from said mounted tire, and which does not inform the vehicle operator of the tire abnormality when the affirmative decision in said determination is obtained on the basis of the tire-state data element transmitted from said non-mounted tire.

33. A vehicle tire information processing apparatus according to claim 32,
- wherein each of said detectors detects a tire temperature of the corresponding one of said tires,
- wherein each of said transmitters transmits, as one of said at least one tire-state data element, a tire temperature data representative of the detected tire temperature of the corresponding one of said tires,
- wherein said receiver receives said tire temperature data transmitted by each of said transmitters,
- wherein said abnormality determiner includes a tire-temperature abnormality determining portion which effects a determination as to whether the tire temperature of each of said tires is higher than a predetermined maximum value or not;
- and wherein said informing device which informs the vehicle operator of a tire-temperature abnormality when an affirmative decision in said determination is obtained on the basis of the tire temperature data included in the tire-state-data element transmitted from said mounted tire, and which does not inform the vehicle operator of the tire-temperature abnormality when the affirmative decision in said determination is obtained on the basis of the tire temperature data included in the tire-state data element transmitted from said non-mounted tire.

34. A vehicle tire information obtaining apparatus for obtaining tire information relating to a plurality of tires of a vehicle which include a mounted tire mounted on an axle of the vehicle and a non-mounted tire carried by the vehicle, the apparatus comprising:
- tire state detectors which are provided in the respective tires and each of which detects a state of corresponding one of the tires;
- transmitters which are provided in the respective tires and which transmit tire data sets, as the tire information, each containing at least one tire-state data element representative of the detected state of a corresponding one of the tires;
- a receiver which is provided in a body of the vehicle and which receives the tire data sets transmitted by the transmitters; and
- a non-mounted-tire information separator which separates one of the tire data sets that has been transmitted from the non-mounted tire, from one of the tire data sets that has been transmitted from the mounted tire,
- wherein the non-mounted-tire information separator includes a number-basis checking portion which checks whether separation made by the non-mounted-tire information separator is correct, by seeing if a number of the separated tire data set is not larger than a predetermined number.

35. A vehicle tire information obtaining apparatus according to claim 1, wherein the non-mounted-tire information separator is provided in the body of the vehicle.

36. A vehicle tire information obtaining apparatus according to claim 13, wherein the non-mounted-tire information separator is provided in the body of the vehicle.

* * * * *